US005544046A

United States Patent [19]

Niwa

[11] Patent Number: 5,544,046

[45] Date of Patent: Aug. 6, 1996

[54] NUMERICAL CONTROL UNIT

[75] Inventor: Tomomitsu Niwa, Aichi, Japan

[73] Assignee: Mitsubishi Denki Kabushiki Kaisha, Tokyo, Japan

[21] Appl. No.: 942,282

[22] Filed: Sep. 9, 1992

[30] Foreign Application Priority Data

Sep. 17, 1991 [JP] Japan .............................. 3-074367 U
Mar. 18, 1992 [JP] Japan .............................. 4-062143

[51] Int. Cl.$^6$ .......................... G058 19/18; G058 19/408

[52] U.S. Cl. .................... 364/474.01; 364/191; 364/192; 364/474.17; 364/474.22; 364/474.23; 364/474.27

[58] Field of Search .......................... 364/474.01–474.37, 364/191, 192, 193, 188, 189

[56] References Cited

U.S. PATENT DOCUMENTS

| | | | |
|---|---|---|---|
| 3,812,474 | 5/1974 | Linn et al. . | |
| 4,382,215 | 5/1983 | Barlow et al. | 364/474.18 |
| 4,446,525 | 5/1984 | Hoch et al. | 364/474.23 |
| 4,636,938 | 1/1987 | Broome | 364/191 |
| 4,706,002 | 11/1987 | Fukuyama | 364/192 |
| 4,897,799 | 1/1990 | Le Gall et al. . | |
| 4,956,765 | 9/1990 | Iwagaya | 364/192 |
| 5,163,171 | 11/1992 | Seki et al. | 364/474.11 |

FOREIGN PATENT DOCUMENTS

| | | | |
|---|---|---|---|
| 0079388 | 5/1983 | European Pat. Off. . | |
| 0079394 | 5/1983 | European Pat. Off. . | |
| 0177164 | 4/1986 | European Pat. Off. . | |
| 0372086 | 6/1990 | European Pat. Off. . | |
| 0414905 | 3/1991 | European Pat. Off. . | |
| 0428505 | 5/1991 | European Pat. Off. . | |
| 60-229106 | 11/1985 | Japan | 364/474.23 |
| 1-50107 | 2/1989 | Japan | 364/192 |
| 1-127002 | 8/1989 | Japan . | |
| 1-236309 | 9/1989 | Japan | 364/474.22 |
| 1-172133 | 12/1989 | Japan . | |
| 3-116248 | 5/1991 | Japan . | |
| 2054909 | 2/1981 | United Kingdom | 364/474.27 |
| 2057717 | 4/1981 | United Kingdom . | |

OTHER PUBLICATIONS

File Formats For Popular PC Software; Copyright 1986; Jeff Walden pp. 53–58.

Program Display Controller; Patent Abstracts of Japan; Nov. 29, 1988; JP63292327.

Numerical Control Device; Patent Abstracts of Japan; Aug. 31, 1985; JP60168206.

Numerical Controller Containing Color Display; Patent Abstracts of Japan; Apr. 24, 1984; JP59072514.

Numerical Controller; Patent Abstracts of Japan; Apr. 09, 1986; JP61068609.

Numberical Controller; Patent Abstracts of Japan; Jul. 15, 1991; JP3163604.

File Control System For NC Program With Transfer History Information; Nov. 9, 1988; JP63271608.

File Generation Managment System; Patent Abstracts of Japan Aug. 2, 1990; JP 2196349.

Outputting Method of NC Data; Patent Abstracts of Japan; May 20/1992; JP4146042.

Fault Checking Method of Industrial Robot; Patent Abstracts of Japan; JP61009708.

Numerical Controller; Patent Abstracts of Japan; Jul. 5, 1984; JP59116809.

*Primary Examiner*—Roy N. Envall, Jr.
*Assistant Examiner*—Steven R. Garland
*Attorney, Agent, or Firm*—Sughrue, Mion, Zinn, Macpeak & Seas; Richard C. Turner

[57] ABSTRACT

A numerical control unit (NCU) uses character codes to communicate with an external input/output apparatus. Further, internal NCU data is stored in an array format corresponding to a display format. Further, while one set of data is being executed by the NCU, another set may be corrected by the user. Further, program data may be specified as variables rather than actual numerical values. Still further, memo data is provided to describe each piece of data. Finally, input program data is directly sent to a buffer where it is used to control a machining operation.

26 Claims, 54 Drawing Sheets

| | 1 | 2 | 3 |
|---|---|---|---|
| 1 | −12.345 | 23.456 | 0.000 |
| 2 | −100.100 | 10.123 | |
| 3 | 55.123 | 100.234 | |
| 4 | 0.000 | 0.000 | |
| 5 | | | |
| 6 | | | |
| 7 | | | |
| 8 | | | |
| 9 | | | |
| 10 | 0.000 | 0.000 | 0.000 |
| | (X) | (Z) | (C) |

```
* H(7,10,3), L;
(7,1,1)=-12.345;
(7,1,2)=23.456;
(7,1,3)=0.000;
(7,2,1)=-100.100;
(7,2,2)=10.123;
(7,2,3)=0.000;
(7,3,1)=55.123;
(7,3,2)=100.234;
(7,3,3)=0.000;
.
.
.
.
.
(7,10,1)=0.000;
(7,10,2)=0.000;
(7,10,3)=0.000;
* END;
```

```
[MODI DATA]                              1/5

  1.  (7, 5, 2) = 0, 111.222
  2.  (7, 3, 1) = 55.123, 64.872
  3.  (5, 2, 3) = 19.816, 21.054
  4.  (3, 1, 6) = 15.3, 22.7
  5.              .
  6.              .
  7.              .
  8.              .
  9.              .
 10.              .

  ALL    SORT    EDIT    COPY    I/O
```

```
[MODI DATA]                              1/2

  1.  (7, 5, 2) = 0, 111.222
  2.  (7, 3, 1) = 55.123, 64.872
  3.  (7, 3, 3) = 15.816, 21.311
  4.  (7, 2, 6) = 0, 213.163
  5.              .
  6.              .
  7.              .
  8.              .
  9.              .
 10.              .

  ALL    SORT    EDIT    COPY    I/O
```

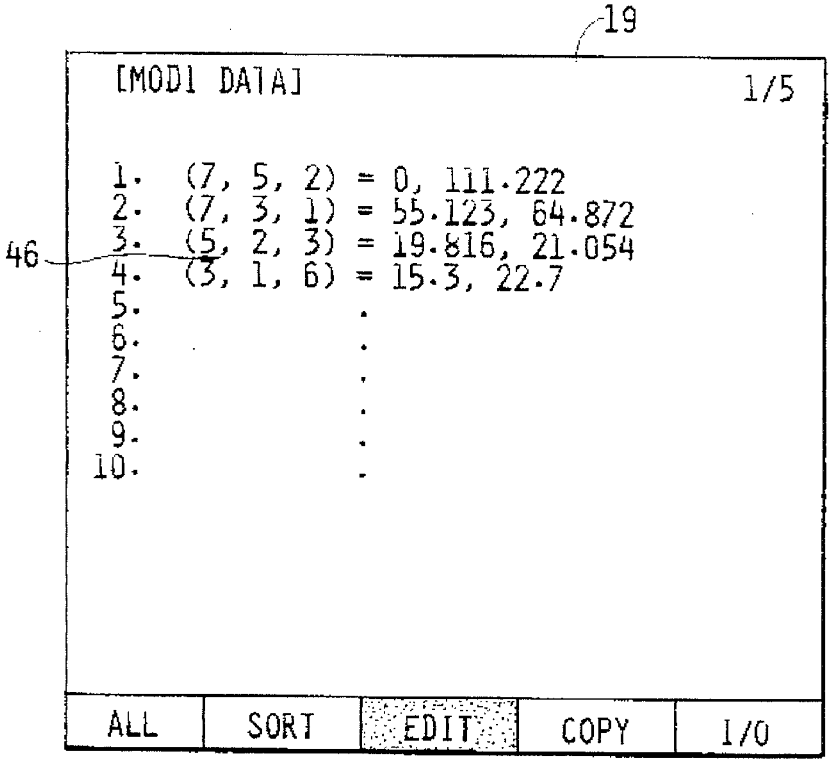

FIG. 16A

```
 ┌─────────────────────────────────────19──┐
 │ [MODI DATA]                        1/5  │
 │                                         │
 │   1. (7, 5, 2) = 0, 111.222             │
 │   2. (7, 3, 1) = 55.123, 64.872         │
46─┤   3. (5, 2, 3) = 19.816, 21.054        │
 │   4. (3, 1, 6) = 15.3, 22.7             │
 │   5.           .                        │
 │   6.           .                        │
 │   7.           .                        │
 │   8.           .                        │
 │   9.           .                        │
 │  10.           .                        │
 │                                         │
 │                                         │
 │ │ ALL │ SORT │ EDIT │ COPY │ I/O │      │
 └─────────────────────────────────────────┘
```

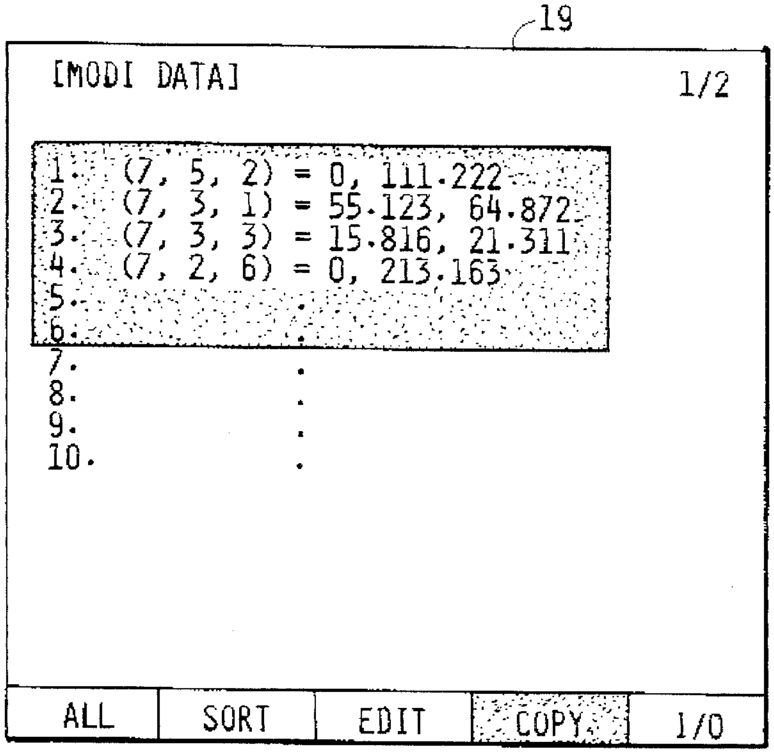

FIG. 16B

```
 ┌─────────────────────────────────────19──┐
 │ [MODI DATA]                        1/2  │
 │                                         │
 │  ╔═════════════════════════════════╗    │
 │  ║ 1. (7, 5, 2) = 0, 111.222       ║    │
 │  ║ 2. (7, 3, 1) = 55.123, 64.872   ║    │
 │  ║ 3. (7, 3, 3) = 15.816, 21.311   ║    │
 │  ║ 4. (7, 2, 6) = 0, 213.163       ║    │
 │  ║ 5.           .                  ║    │
 │  ║ 6.           .                  ║    │
 │  ╚═════════════════════════════════╝    │
 │   7.           .                        │
 │   8.           .                        │
 │   9.           .                        │
 │  10.           .                        │
 │                                         │
 │ │ ALL │ SORT │ EDIT │ COPY │ I/O │      │
 └─────────────────────────────────────────┘
```

FIG. 25

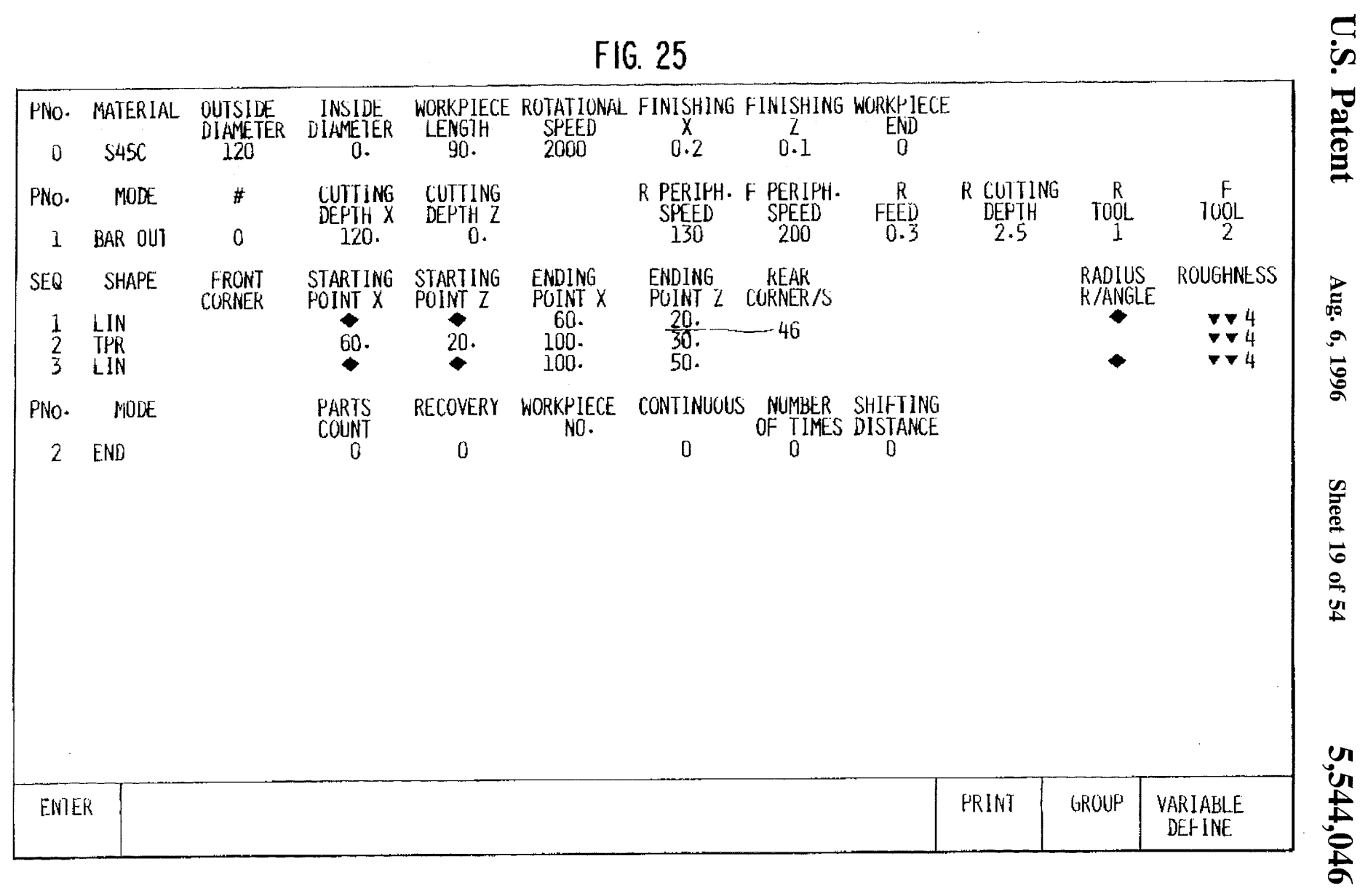

| | | | | | | | | | | | |
|---|---|---|---|---|---|---|---|---|---|---|---|
| PNo. | MATERIAL | OUTSIDE DIAMETER | INSIDE DIAMETER | WORKPIECE LENGTH | ROTATIONAL SPEED | FINISHING X | FINISHING Z | WORKPIECE END | | | |
| 0 | S45C | 120 | 0. | 90. | 2000 | 0.2 | 0.1 | 0 | | | |
| PNo. | MODE | # | CUTTING DEPTH X | CUTTING DEPTH Z | | R PERIPH. SPEED | F PERIPH. SPEED | R FEED | R CUTTING DEPTH | R TOOL | F TOOL |
| 1 | BAR OUT | 0 | 120. | 0. | | 130 | 200 | 0.3 | 2.5 | 1 | 2 |
| SEQ | SHAPE | FRONT CORNER | STARTING POINT X | STARTING POINT Z | ENDING POINT X | ENDING POINT Z | REAR CORNER/S | | | RADIUS R/ANGLE | ROUGHNESS |
| 1 | LIN | | ◆ | ◆ | 60. | 20. | 46 | | | ◆ | ▼▼4 |
| 2 | TPR | | 60. | 20. | 100. | 30. | | | | | ▼▼4 |
| 3 | LIN | | ◆ | ◆ | 100. | 50. | | | | ◆ | ▼▼4 |
| PNo. | MODE | | PARTS COUNT | RECOVERY | WORKPIECE NO. | CONTINUOUS | NUMBER OF TIMES | SHIFTING DISTANCE | | | |
| 2 | END | | 0 | 0 | | 0 | 0 | 0 | | | |

| ENTER | | PRINT | GROUP | VARIABLE DEFINE |
|---|---|---|---|---|

FIG. 26

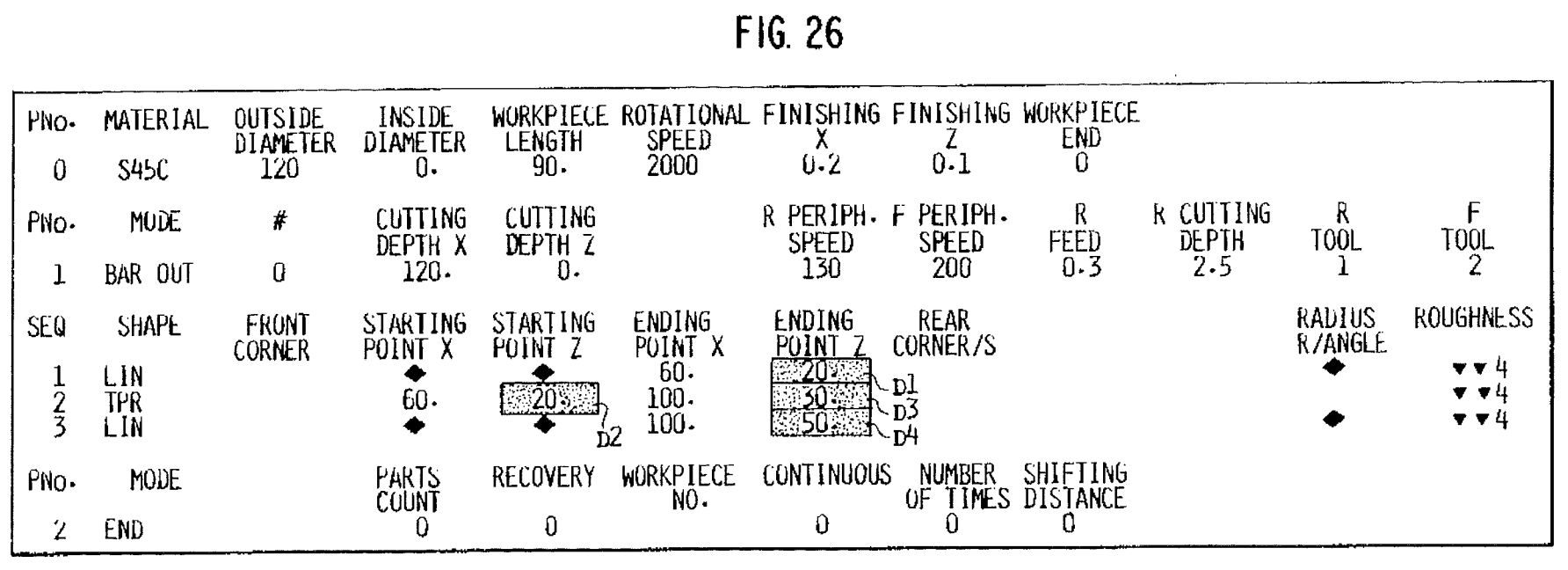

| PNo. | MATERIAL | OUTSIDE DIAMETER | INSIDE DIAMETER | WORKPIECE LENGTH | ROTATIONAL SPEED | FINISHING X | FINISHING Z | WORKPIECE END |
|---|---|---|---|---|---|---|---|---|
| 0 | S45C | 120 | 0. | 90. | 2000 | 0.2 | 0.1 | 0 |

| PNo. | MODE | # | CUTTING DEPTH X | CUTTING DEPTH Z | R PERIPH. SPEED | F PERIPH. SPEED | R FEED | R CUTTING DEPTH | R TOOL | F TOOL |
|---|---|---|---|---|---|---|---|---|---|---|
| 1 | BAR OUT | 0 | 120. | 0. | 130 | 200 | 0.3 | 2.5 | 1 | 2 |

| SEQ | SHAPE | FRONT CORNER | STARTING POINT X | STARTING POINT Z | ENDING POINT X | ENDING POINT Z | REAR CORNER/S | RADIUS R/ANGLE | ROUGHNESS |
|---|---|---|---|---|---|---|---|---|---|
| 1 | LIN | | ◆ | ◆ | 60. | 20. (D1) | | ◆ | ▼▼4 |
| 2 | TPR | | 60. | 20. (D2) | 100. | 30. (D3) | | | ▼▼4 |
| 3 | LIN | | ◆ | ◆ | 100. | 50. (D4) | | ◆ | ▼▼4 |

| PNo. | MODE | PARTS COUNT | RECOVERY | WORKPIECE NO. | CONTINUOUS | NUMBER OF TIMES | SHIFTING DISTANCE |
|---|---|---|---|---|---|---|---|
| 2 | END | 0 | 0 | | 0 | 0 | 0 |

FIG. 27

| | | | | | | | | | | | |
|---|---|---|---|---|---|---|---|---|---|---|---|
| PNo. | MATERIAL | OUTSIDE DIAMETER | INSIDE DIAMETER | WORKPIECE LENGTH | ROTATIONAL SPEED | FINISHING X | FINISHING Z | WORKPIECE END | | | |
| 0 | S45C | 120 | 0. | 90. | 2000 | 0.2 | 0.1 | 0 | | | |
| PNo. | MODE | # | CUTTING DEPTH X | CUTTING DEPTH Z | | R PERIPH. SPEED | F PERIPH. SPEED | R FEED | R CUTTING DEPTH | R TOOL | F TOOL |
| 1 | BAR OUT | 0 | 120. | 0. | | 130 | 200 | 0.3 | 2.5 | 1 | 2 |
| SEQ | SHAPE | FRONT CORNER | STARTING POINT X | STARTING POINT Z | ENDING POINT X | ENDING POINT Z | REAR CORNER/S | | | RADIUS R/ANGLE | ROUGHNESS |
| 1 | LIN | | ◆ | ◆ | 60. | 20. | | | | ◆ | ▾▾4 |
| 2 | TPR | | 60. | 20. | 100. | 30. | | | | | ▾▾4 |
| 3 | LIN | | ◆ | ◆ | 100. | 50. | | | | ◆ | ▾▾4 |
| PNo. | MODE | | PARTS COUNT | RECOVERY | WORKPIECE NO. | CONTINUOUS | NUMBER OF TIMES | SHIFTING DISTANCE | | | 64 |
| 2 | END | | 0 | 0 | | 0 | 0 | 0 | | | |

FIG. 29

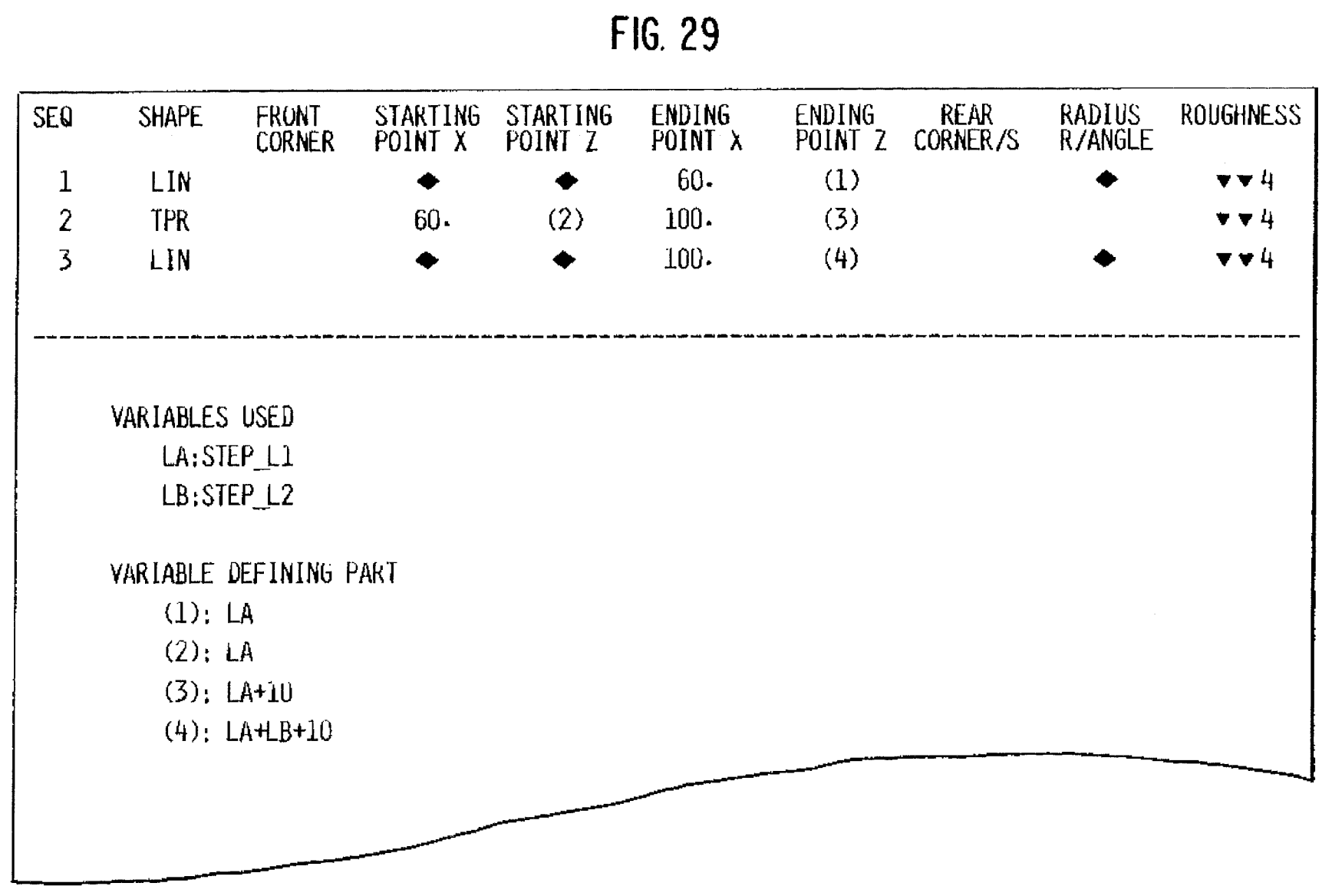

| SEQ | SHAPE | FRONT CORNER | STARTING POINT X | STARTING POINT Z | ENDING POINT X | ENDING POINT Z | REAR CORNER/S | RADIUS R/ANGLE | ROUGHNESS |
|---|---|---|---|---|---|---|---|---|---|
| 1 | LIN | | ◆ | ◆ | 60. | (1) | | ◆ | ▼▼4 |
| 2 | TPR | | 60. | (2) | 100. | (3) | | | ▼▼4 |
| 3 | LIN | | ◆ | ◆ | 100. | (4) | | ◆ | ▼▼4 |

VARIABLES USED
LA:STEP_L1
LB:STEP_L2

VARIABLE DEFINING PART
(1): LA
(2): LA
(3): LA+10
(4): LA+LB+10

FIG. 31

| | | | | | | | | | | | | |
|---|---|---|---|---|---|---|---|---|---|---|---|---|
| PNo. | MATERIAL | OUTSIDE DIAMETER | INSIDE DIAMETER | WORKPIECE LENGTH | ROTATIONAL SPEED | FINISHING X | FINISHING Z | WORKPIECE END | | | | |
| 0 | S45C | 80. | 0. | 155. | 2000 | 0.2 | 0.1 | 5. | | | | |
| PNo. | MODE | | | | | R PERIPH. SPEED | F PERIPH. SPEED | R FEED | R CUTTING DEPTH | R TOOL | F TOOL | |
| 1 | EDG FCE | | | | | 110 | 200 | 0.3 | 2. | 1 | 2 | |
| SEQ | | | STARTING POINT X | STARTING POINT Z | ENDING POINT X | ENDING POINT Z | | | | | ROUGHNESS | |
| 1 | | | 80. | 5. | 0. | 0. | | | | | ▼▼3 | |
| PNo. | MODE | # | CUTTING DEPTH X | CUTTING DEPTH Z | | R PERIPH. SPEED | F PERIPH. SPEED | R FEED | R CUTTING DEPTH | R TOOL | F TOOL | |
| 2 | BAR OUT | 0 | 80. | 0. | | 130 | 200 | 0.3 | 2.5 | 3 | 4 | |
| SEQ | SHAPE | FRONT CORNER | STARTING POINT X | STARTING POINT Z | ENDING POINT X | ENDING POINT Z | REAR CORNER/S | | | RADIUS R/ANGLE | ROUGHNESS | |
| 1 | LIN | C5 | ◆ | ◆ | 50. | L1+10 | | | | ◆ | ▼▼3 | |
| 2 | LIN | C5 | ◆ | ◆ | 70. | L2 | | | | ◆ | ▼▼3 | |
| 3 | " ⊔ " | | 70 | L2 | 80. | 125 | | | | 50 | ▼▼3 | |
| PNo. | MODE | # | QUANTITY | PITCH | GROOVE WIDTH | FINISHING ALLOWANCE | R PERIPH. SPEED | F PERIPH. SPEED | FEED | CUTTING DEPTH | R TOOL | F TOOL |
| 3 | GRV OUT | 0 | 1 | 0 | 10 | | | 120 | 0.08 | 2 | | 5 |
| SEQ | | FRONT CORNER | STARTING POINT X | STARTING POINT Z | ENDING POINT X | ENDING POINT Z | REAR CORNER | | | ANGLE | ROUGHNESS | |
| 1 | | | 50. | L1+10 | 40. | L1+10 | | | | | | |
| PNo. | MODE | # | CHAMFER | LEAD | ANGLE | NUMBER OF BARS | HEIGHT | NUMBER OF TIMES | PERIPH. SPEED | CUTTING DEPTH | TOOL | |
| 4 | THR OUT | 0 | 0 | 2. | 60 | 1 | 1.299 | 10 | 120 | 0.3 | 6 | |
| SEQ | | | STARTING POINT X | STARTING POINT Z | ENDING POINT X | ENDING POINT Z | | | | | | |
| 1 | | | 50. | 0. | 50. | L1+3 | | | | | | |
| PNo. | MODE | PARTS COUNT | RECOVERY | WORKPIECE NO. | CONTINUOUS | NUMBER OF TIMES | SHIFTING DISTANCE | | | | | |
| 5 | END | 0 | 0 | 0 | 0 | 0 | 0 | | | | | |

FIG. 34

| | | | | | | | | | | | |
|---|---|---|---|---|---|---|---|---|---|---|---|
| PNo. | MATERIAL | OUTSIDE DIAMETER | INSIDE DIAMETER | WORKPIECE LENGTH | ROTATIONAL SPEED | FINISHING X | FINISHING Z | WORKPIECE END | | | |
| 0 | S45C | 80 | 0. | 155. | 2000 | 0.2 | 0.1 | 5. | | | |
| PNo. | MODE | | | | | R PERIPH. SPEED | F PERIPH. SPEED | R FEED | R CUTTING DEPTH | R TOOL | F TOOL |
| 1 | EDG FCE | | | | | 110 | 200 | 0.3 | 2. | 1 | 2 |
| SEQ | | | STARTING POINT X | STARTING POINT Z | ENDING POINT X | ENDING POINT Z | | | | | ROUGHNESS |
| 1 | | | 80. | 5. | 0. | 0. | | | | | ▾▾3 |
| PNo. | MODE | # | CUTTING DEPTH X | CUTTING DEPTH Z | | R PERIPH. SPEED | F PERIPH. SPEED | R FEED | R CUTTING DEPTH | R TOOL | F TOOL |
| 2 | BAR OUT | 0 | 80. | 0. | | 130 | 200 | 0.3 | 2.5 | 3 | 4 |
| SEQ | SHAPE | FRONT CORNER | STARTING POINT X | STARTING POINT Z | ENDING POINT X | ENDING POINT Z | REAR CORNER/S | | | RADIUS R/ANGLE | ROUGHNESS |
| 1 | LIN | C5 | ◆ | ◆ | 50. | LL+10 | | | | ◆ | ▾▾3 |
| 2 | LIN | @D2 | ◆ | ◆ | 70. | @D1 | | | | ◆ | ▾▾3 |
| 3 | " ⌴ " | | 70. | @D1 | 80. | 125. | | | | 50. | ▾▾3 |

| | | | | | | | | | | | | |
|---|---|---|---|---|---|---|---|---|---|---|---|---|
| PNo. | MODE | # | QUANTITY | PITCH | GROOVE WIDTH | FINISHING ALLOWANCE | R PERIPH. SPEED | F PERIPH. SPEED | FEED | CUTTING DEPTH | R TOOL | F TOOL |
| 3 | GRV OUT | 0 | 1 | 0 | 10 | ◆ | ◆ | 120 | 0.08 | 2. | ◆ | 5 |

| | | | | | | | | | | | |
|---|---|---|---|---|---|---|---|---|---|---|---|
| SEQ | | FRONT CORNER | STARTING POINT X | STARTING POINT Z | ENDING POINT X | ENDING POINT Z | REAR CORNER | | | ANGLE | ROUGHNESS |
| 1 | | | 50. | LL+10 | 40. | LL+10 | | | | | |
| PNo. | MODE | # | CHAMFER | LEAD | ANGLE | NUMBER OF BARS | HEIGHT | NUMBER OF TIMES | PERIPH. SPEED | CUTTING DEPTH | TOOL |
| 4 | THR OUT | 0 | 0 | 2. | 60 | 1 | 1.299 | 10 | 120 | 0.3 | 6 |
| SEQ | | | STARTING POINT X | STARTING POINT Z | ENDING POINT X | ENDING POINT Z | | | | | |
| 1 | | | 50. | 0. | 50. | LL+3 | | | | | |
| PNo. | MODE | PARTS COUNT | RECOVERY | WORKPIECE NO. | CONTINUOUS | NUMBER OF TIMES | SHIFTING DISTANCE | | | | |
| 5 | END | 0 | 0 | 0 | 0 | 0 | 0 | | | | |

| | @D1 (T17) | @D2 (T17) | | | | |
|---|---|---|---|---|---|---|
| T18 — TP1 | 60 | 5 | | | | |
| T18 — TP2 | 70 | 5 | | | | |
| T18 — TP3 | 80 | 5 | | | | |
| T18 — TP4 | 100 | 7 | | | | |
| T18 — TP5 | 120 | 8 | | | | |
| | | | | | | |
| | | | | | | |

| PNo. | MATERIAL | OUTSIDE DIAMETER | INSIDE DIAMETER | WORKPIECE LENGTH | WORKPIECE ROTATIONAL SPEED | FINISHING X | FINISHING Z | FINISHING WORKPIECE END | | CALL |
|---|---|---|---|---|---|---|---|---|---|---|
| 0 | — 46 | | | | | | | | | SHAPE DISPLAY |
| | | | | | | | | | | NUMERICAL VALUE DISPLAY |
| | | | | | | | | | DIGITIZE | |
| | | | | | | | | | | |
| CHARACTER OUTPUT | | | | | | | | | | |

FIG. 41

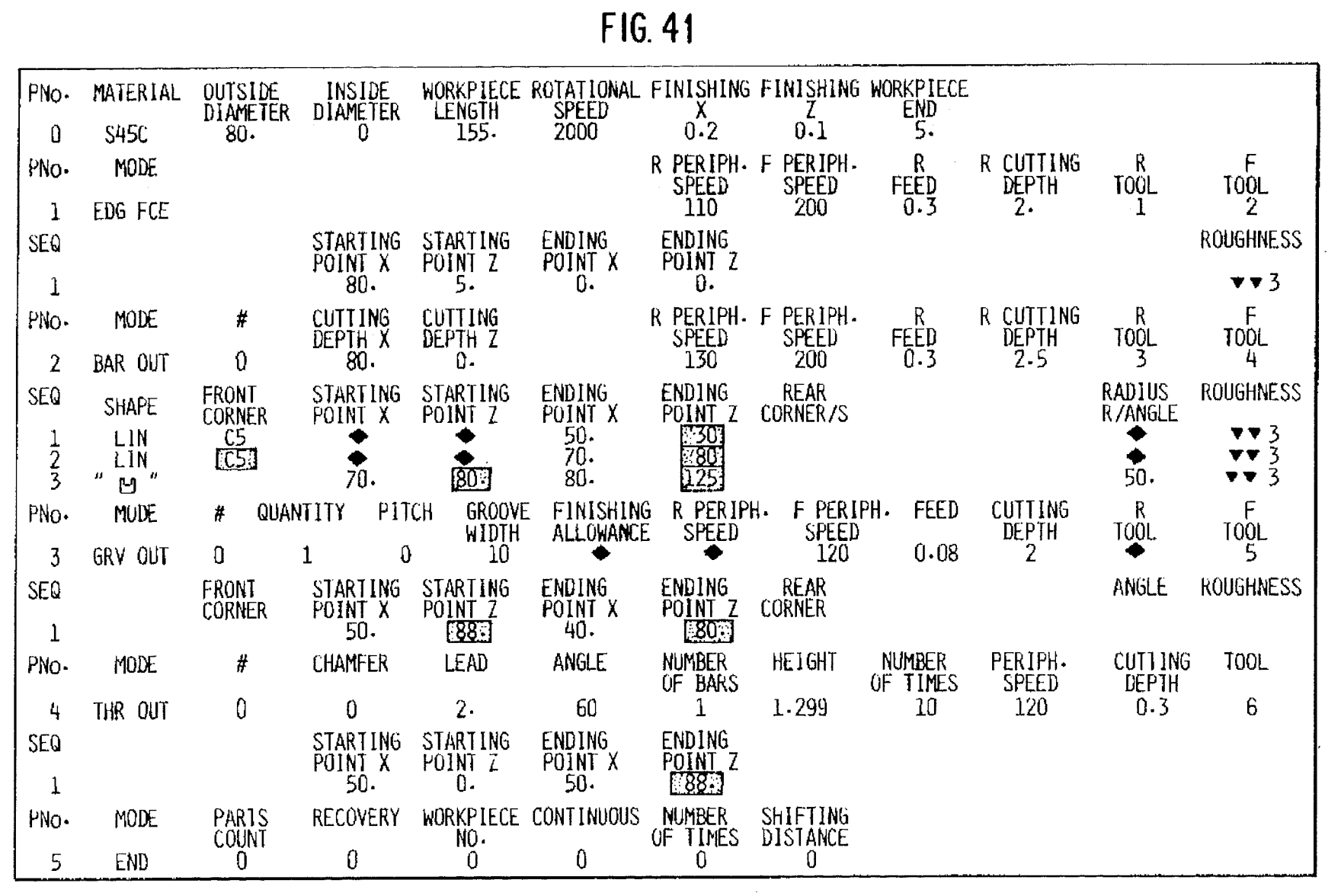

| PNo. | MATERIAL | OUTSIDE DIAMETER | INSIDE DIAMETER | WORKPIECE LENGTH | ROTATIONAL SPEED | FINISHING X | FINISHING Z | WORKPIECE END |
|---|---|---|---|---|---|---|---|---|
| 0 | S45C | 80. | 0 | 155. | 2000 | 0.2 | 0.1 | 5. |

| PNo. | MODE | R PERIPH. SPEED | F PERIPH. SPEED | R FEED | R CUTTING DEPTH | R TOOL | F TOOL |
|---|---|---|---|---|---|---|---|
| 1 | EDG FCE | 110 | 200 | 0.3 | 2. | 1 | 2 |

| SEQ | STARTING POINT X | STARTING POINT Z | ENDING POINT X | ENDING POINT Z | ROUGHNESS |
|---|---|---|---|---|---|
| 1 | 80. | 5. | 0. | 0. | ▼▼3 |

| PNo. | MODE | # | CUTTING DEPTH X | CUTTING DEPTH Z | R PERIPH. SPEED | F PERIPH. SPEED | R FEED | R CUTTING DEPTH | R TOOL | F TOOL |
|---|---|---|---|---|---|---|---|---|---|---|
| 2 | BAR OUT | 0 | 80. | 0. | 130 | 200 | 0.3 | 2.5 | 3 | 4 |

| SEQ | SHAPE | FRONT CORNER | STARTING POINT X | STARTING POINT Z | ENDING POINT X | ENDING POINT Z | REAR CORNER/S | RADIUS R/ANGLE | ROUGHNESS |
|---|---|---|---|---|---|---|---|---|---|
| 1 | LIN | C5 | ◆ | ◆ | 50. | 30. | | ◆ | ▼▼3 |
| 2 | LIN | C5 | ◆ | ◆ | 70. | 80. | | ◆ | ▼▼3 |
| 3 | " ◡ " | | 70. | 80. | 80. | 125. | | 50. | ▼▼3 |

| PNo. | MODE | # | QUANTITY | PITCH | GROOVE WIDTH | FINISHING ALLOWANCE | R PERIPH. SPEED | F PERIPH. SPEED | FEED | CUTTING DEPTH | R TOOL | F TOOL |
|---|---|---|---|---|---|---|---|---|---|---|---|---|
| 3 | GRV OUT | 0 | 1 | 0 | 10 | ◆ | ◆ | 120 | 0.08 | 2 | ◆ | 5 |

| SEQ | FRONT CORNER | STARTING POINT X | STARTING POINT Z | ENDING POINT X | ENDING POINT Z | REAR CORNER | ANGLE | ROUGHNESS |
|---|---|---|---|---|---|---|---|---|
| 1 | | 50. | 88. | 40. | 80. | | | |

| PNo. | MODE | # | CHAMFER | LEAD | ANGLE | NUMBER OF BARS | HEIGHT | NUMBER OF TIMES | PERIPH. SPEED | CUTTING DEPTH | TOOL |
|---|---|---|---|---|---|---|---|---|---|---|---|
| 4 | THR OUT | 0 | 0 | 2. | 60 | 1 | 1.299 | 10 | 120 | 0.3 | 6 |

| SEQ | STARTING POINT X | STARTING POINT Z | ENDING POINT X | ENDING POINT Z |
|---|---|---|---|---|
| 1 | 50. | 0. | 50. | 88. |

| PNo. | MODE | PARTS COUNT | RECOVERY | WORKPIECE NO. | CONTINUOUS | NUMBER OF TIMES | SHIFTING DISTANCE |
|---|---|---|---|---|---|---|---|
| 5 | END | 0 | 0 | 0 | 0 | 0 | 0 |

FIG. 42

```
W1100;
P0,"S45C",80.0,0.0,155.0,2000,0.2,0.1,5.0;
P1,"EDG","FCE",110,200,0.3,2.0,1.2;
S1,80.0,5.0,0.0,0.0,"Z3";
P2,"BAR","OUT",0,80.0,0.0,130,200,0.3,2.5,3.4;
S1,"LIN",5,  ,  ,50.0,45.0,,,"Z3";
S2,"LIN",5,  ,  ,70.0,70.0,,,"Z3";
S3,"⊔",  ,70.0,70.0,80.0,125.0,,,"Z3";
P3,"GRV","OUT",0,1,0,10.0,,,120,0.08,2.0,,5;
S1,,50.0,45.0,40.0,45.0,,,,;
P4,"THR","OUT",0,0,2.0,60.0,1,1,299,10,120,0.3,6;
S1,50.0,0.0,50.0,38.0;
P5,"END",0,0,0,0,0,0;
%
```

FIG. 43

```
W1100;
P0,@1="S45C",@2=80.0,@3=0.0,@4=155.0,@5=2000,@6=0.2,@7=0.1,@8=5.0;
P1,@1="EDG",@2="FCE",@3=110,@4=200,@5=0.3,@6=2.0,@7=1,@8=2;
S1,@1=80.0,@2=5.0,@3=0.0,@4=0.0,@5="Z3";
P2,@1="BAR",@2="OUT",@3=0,@4=80.0,@5=0.0,@6=130,@7=200,@8=0.3,
   @9=2.5,@10=3,@11=4;
S1,@1="LIN",@2=5.0,@5=50.0,@6=45.0,@9="Z3";
S2,@1="LIN",@2=5.0,@5=70.0,@6=70.0,@9="Z3";
S3,@1=" ⊔ ",@3=70.0,@4=70.0,@5=80.0,@6=125.0,@9="Z3";
P3,@1="GRV",@2="OUT",@3=0,@4=1,@5=0,@6=10.0,@9=120,@10=0.08,
   @11=2.0,@13=5;
S1,@2=50.0,@3=45.0,@4=40.0,@5=45.0;
P4,@1="THR",@2="OUT",@3=0,@4=0,@5=2.0,@6=60.0,@7=1,@8=1.299,@9=10,
   @10=120,@11=0.3,@12=6;
S1,@1=50.0,@2=0.0,@3=50.0,@4=38.0;
P5,@1="END",@2=0,@3=0,@4=0,@5=0,@6=0,@7=0;
%
```

| 82 | 83 | 84 | 85 | 86 | 87 | 88 | 89 |
|---|---|---|---|---|---|---|---|
| . | . | . | . | . | . | . | |
| . | . | . | . | . | . | . | |
| . | . | . | . | . | . | . | |
| . | . | . | . | . | . | . | |
| . | . | . | . | . | . | . | |
| 3 | 5 | 2 | 0 | 20000 | 300 | CLX | CLEARANCE VALUE IN X-AXIS DIRECTION |

48

```
-- (1, 1) --    -- (1, 2) --    -- (1, 3) --
-- (2, 1) --    -- (2, 2) --    -- (2, 3) --
-- (3, 1) --    -- (3, 2) --    -- (3, 3) --
-- (4, 1) --    -- (4, 2) --    -- (4, 3) --
-- (5, 1) --    CLX  1520       -- (5, 3) --
-- (6, 1) --    -- (6, 2) --    -- (6, 3) --
-- (7, 1) --    -- (7, 2) --    -- (7, 3) --
-- (8, 1) --    -- (8, 2) --    -- (8, 3) --
```

75, 46, 76, 78

CLEARANCE VALUE IN X-AXIS DIRECTION
TOLERANCE  0~20000   STANDARD VALUE  300

77

FIG. 50
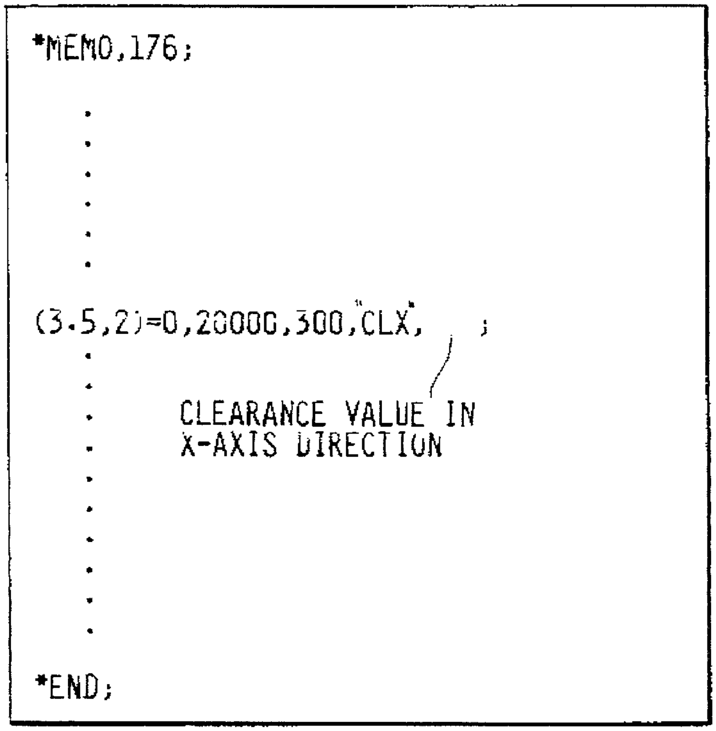
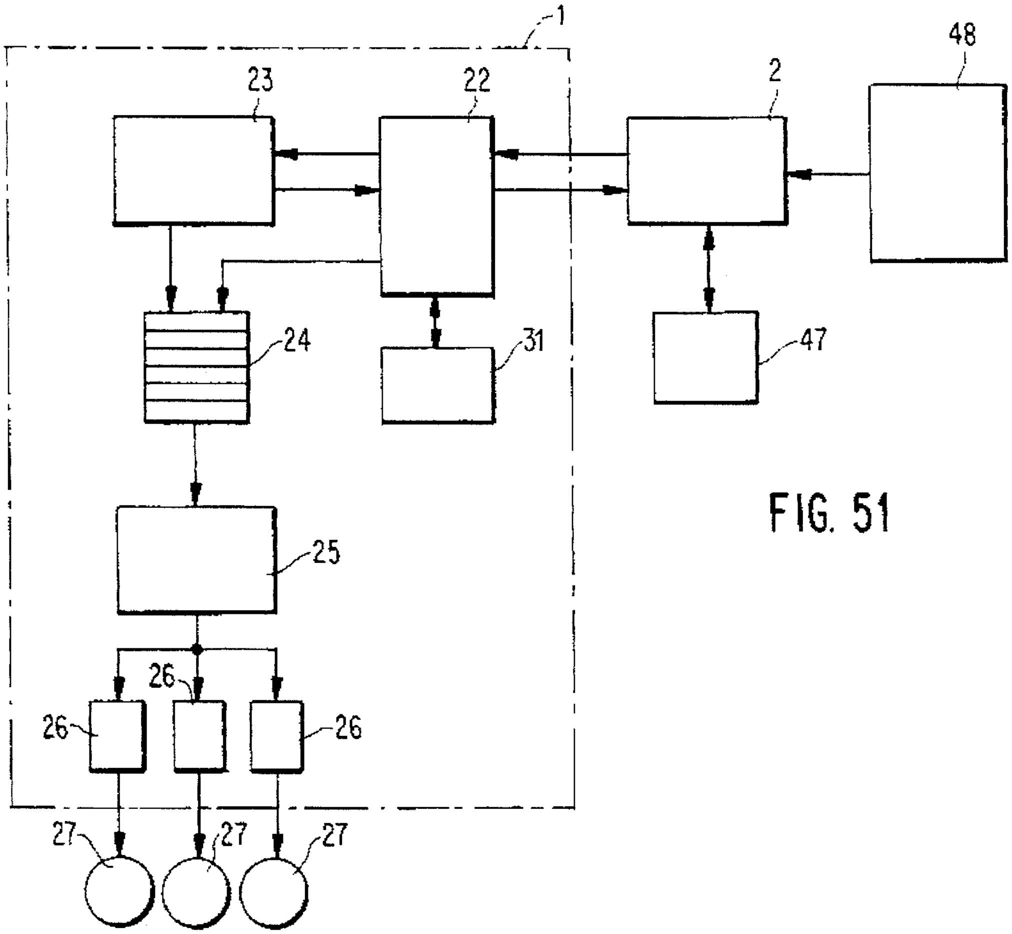
FIG. 51

HEADER PART 2+2+2 BYTE

DATA PART (2+4) BYTE*30

CODE PART (2 BYTE)

DATA PART (4 BYTE)

HEADER PART

DATA PART

"EOB"

EFFECTIVE DATA PART

"EOB" DATA

| 0x00 | 0x0A | 0x00 | 0x00 | 0x00 | 0x00 |

FIG. 54A
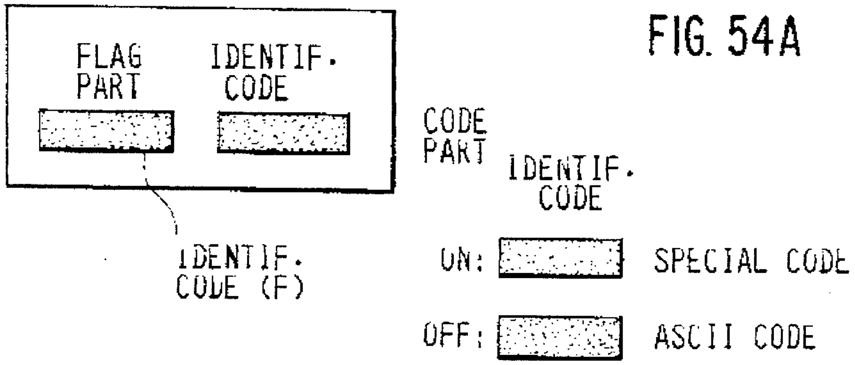
FIG. 54B
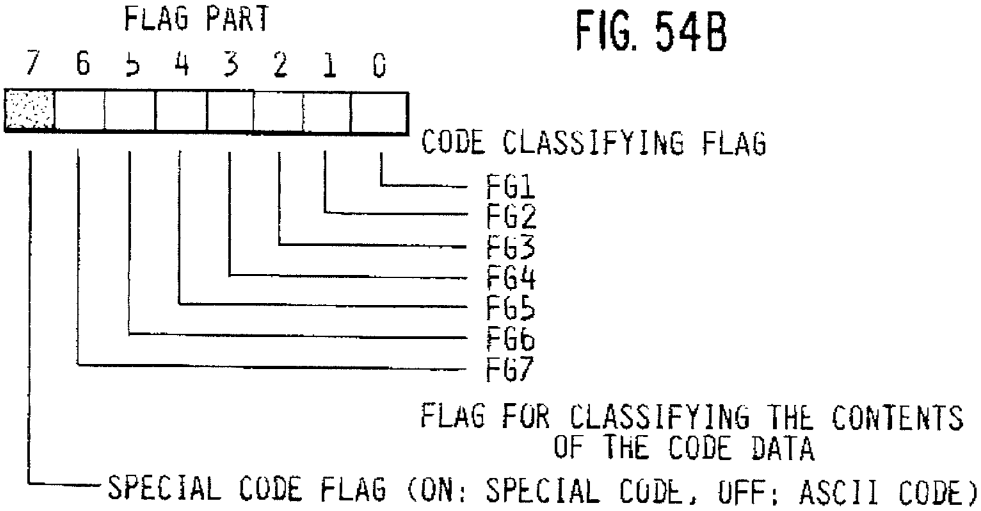
FIG. 55
ASCII CODE (CAPITALIZED ALPHABET)
| | | | | | | |
|---|---|---|---|---|---|---|
| A | B | C | D | E | F | G |
| 0x41 | 0x42 | 0x43 | 0x44 | 0x45 | 0x46 | 0x47 |
| H | I | J | K | L | M | N |
| 0x48 | 0x49 | 0x4A | 0x4B | 0x4C | 0x4D | 0x4E |
| O | P | Q | R | S | T | U |
| 0x4F | 0x50 | 0x51 | 0x52 | 0x53 | 0x54 | 0x55 |
| V | W | X | Y | Z | EOB | |
| 0x56 | 0x57 | 0x58 | 0x59 | 0x5A | 0x0A | |
NOTE: EOB : END OF BLOCK

FIG. 56A

| CODE | CONTENTS |
|---|---|
| 01 | WORKPIECE NO. |
| 02 | PROCESS NO. + ROUGHING OR FINISHING |
| 03 | MACHINING MODE + MACHINING SECTION |
| 04 | WAITING PROGRAM NO. (PROGRAM NO. EXECUTED IN WAITING) |
| 05 | CURRENT TOOL ADDRESS (THIS TOOL SHOULD CURRENTLY BE MOUNTED) |
| 06 | TOOL-USED ADDRESS (ADDRESS OF THE TOOL USED FOR THIS PROCESS) |
| 07 | TOOL-TO-BE-USED ADDRESS (ADDRESS OF THE TOOL TO BE USED NEXT) |
| 08 | FILE SYSTEM INFORMATION (SEEK POINTER + CHARACTER POINTER) |
| 09 | TOOL-TO-BE-USED-FOR-NEXT-PROCESS ADDRESS (ADDRESS OF THE TOOL TO BE USED IN THE NEXT PROCESS) |
| 0A | ASCII EOB CODE (INDICATES THE END OF EFFECTIVE DATA) |
| 0B | NEXT PROCESS NO. + ROUGHING OR FINISHING |
| 0C | NEXT-PROCESS MACHINING MODE + MACHINING SECTION |
| | |
| 10 | CIRCULAR ARC LENGTH (LENGTH OF THE CIRCULAR ARC WHEN G02 OR G03 COMMAND IS GIVEN) |
| 11 | CHAMFER DISTANCE (CHAMFERING DISTANCE FOR THREADING WHEN G32 COMMAND IS GIVEN) |
| 12 | CHAMFER ANGLE (CHAMFERING ANGLE FOR THREADING WHEN G32 COMMAND IS GIVEN) |
| 13 | NUMBER-OF-BARS OFFSET ANGLE (NUMBER-OF-BARS OFFSET ANGLE FOR THREADING WHEN G32 COMMAND IS GIVEN) |
| 14 | NOSE-RADIUS COMPENSATION VALUE (VALUE IN Z-AXIS DIRECTION) |
| 15 | NOSE-RADIUS COMPENSATION VALUE (VALUE IN X-AXIS DIRECTION) |
| 16 | TURRET POCKET NO. IS OUTPUTTED |
| 17 | TOOL COMPENSATION NO. IS OUTPUTTED |

FIG. 56B

| CODE | CONTENTS |
|---|---|
| 18 | COMPENSATION (OTHER THAN NOSE-RADIUS COMPENSATION), ON/OFF IN Z-AXIS DIRECTION |
| 19 | COMPENSATION (OTHER THAN NOSE-RADIUS COMPENSATION), ON/OFF IN X-AXIS DIRECTION |
| | |
| 1C | NOSE-RADIUS COMPENSATION VALUE OF OTHER-SIDE HEAD (VALUE IN Z-AXIS DIRECTION) |
| 1D | NOSE-RADIUS COMPENSATION VALUE OF OTHER-SIDE HEAD (VALUE IN X-AXIS DIRECTION) |
| 1E | TURRET POCKET NO. OF OTHER-SIDE HEAD |
| | |
| 20 | BLOCK CONTROL DATA (CONTROL FLAG FOR EACH BLOCK) |
| 21 | MEASUREMENT CONTROL CODE |
| 22 | G-MODAL DATA (DEDICATED TO EIA AND FOR DISPLAY) |
| | |
| 28 | COMPENSATION OF OTHER-SIDE HEAD (OTHER THAN NOSE-RADIUS COMPENSATION), ON/OFF IN Z-AXIS DIRECTION |
| 29 | COMPENSATION OF OTHER-SIDE HEAD (OTHER THAN NOSE-RADIUS COMPENSATION), ON/OFF IN X-AXIS DIRECTION |
| | |
| 30 | MAXIMUM OUTSIDE DIAMETER OF WORKPIECE (SET VALUE OF COMMON DATA FOR AUTOMATIC PROGRAM) |
| 31 | MINIMUM INSIDE DIAMETER OF WORKPIECE (SET VALUE OF COMMON DATA FOR AUTOMATIC PROGRAM) |
| 32 | SPINDLE CLAMP SPEED UPPER LIMIT (SET VALUE OF COMMON DATA FOR AUTOMATIC PROGRAM) |
| 33 | SPINDLE CLAMP SPEED UPPER LIMIT (DEDICATED TO EIA) |
| CODES NOS. 41 THROUGH 5A ARE RESERVED FOR ASCII CODES (CAPITAL LETTERS). (THEY CANNOT BE USED FOR SPECIAL CODES). | |

CODE VALUES USE HEXADECIMAL NUMBERS.

| | | |
|---|---|---|
| 8004 | 00080001 | ← HEADER PART |
| 0047 | 00000001 | G01 |
| 005A | FFFF8C60 | Z-29600 |
| 0058 | 000076C0 | X30400 |
| 0046 | 00001A37 | F6711 |
| 000A | 00000000 | EOB |

FIG. 57C

```
800400080001
004700000001
0050FFFF8C60
0058000076C0
004600001A37
000A0000000048;
```

```
[NOSE-R]                              PARAM 3.1/4

   #         (R)              (R)             (P)
   1        5.000            0.045             3
   2       10.000            0.099             8
   3        6.000            0.099             2
   4        0.000            0.000             3
   5        0.000            0.000             3
   6        0.000            0.000             3
   7        0.000            0.000             3
   8        0.000            0.000             3
   9        0.000            0.000             3
  10        0.000            0.000             3

     # ( ) R (      ) R (      ) P (      )
```

| T-OFSET | T-DATA | NOSE-R | PLC-SW | MENU |

```
[PROGRAM FILE]                     IN/OUT 5. 1/1

PROGRAM ENTRY        8        REMAIN        32
CHARACTER         1500        REMAIN     16000
<PROGRAM>   <CHR>   <ST>   <COMMENT>
       90     123          TEST CUT  NO. 12
      100
      200
      300
      400
      500

     O(      ■) COMMENT(                          )
```

| INPUT | OUTPUT | ERASE | COPY | FILE |

FIG. 69 PRIOR ART

| | | | | | | | | | | | | |
|---|---|---|---|---|---|---|---|---|---|---|---|---|
| PNo. | MATERIAL | OUTSIDE DIAMETER | | INSIDE DIAMETER | WORKPIECE LENGTH | ROTATIONAL SPEED | FINISHING X | FINISHING Z | WORKPIECE END | | | |
| 0 | S45C | 80. | | 0 | 155. | 2000 | 0.2 | 0.1 | 5. | | | |
| PNo. | MODE | | | | | | R PERIPH. SPEED | F PERIPH. SPEED | R FEED | R CUTTING DEPTH | R TOOL | F TOOL |
| 1 | EDG FCE | | | | | | 110 | 200 | 0.3 | 2. | 1 | 2 |
| SEQ | | | | STARTING POINT X | STARTING POINT Z | ENDING POINT X | ENDING POINT Z | | | | | ROUGHNESS |
| 1 | | | | 80. | 5. | 0. | 0. | | | | | ▼▼3 |
| PNo. | MODE | # | | CUTTING DEPTH X | CUTTING DEPTH Z | | R PERIPH. SPEED | F PERIPH. SPEED | R FEED | R CUTTING DEPTH | R TOOL | F TOOL |
| 2 | BAR OUT | 0 | | 80. | 0. | | 130 | 200 | 0.3 | 2.5 | 3 | 4 |
| SEQ | SHAPE | FRONT CORNER | | STARTING POINT X | STARTING POINT Z | ENDING POINT X | ENDING POINT Z | REAR CORNER/S | | | RADIUS R/ANGLE | ROUGHNESS |
| 1 | LIN | C5 | | ◆ | ◆ | 50. | 45. | | | | ◆ | ▼▼3 |
| 2 | LIN | C5 | | ◆ | ◆ | 70. | 70. | | | | ◆ | ▼▼3 |
| 3 | " ⊔ " | | | 70. | 70. | 80. | 125 | | | | 50. | ▼▼3 |
| PNo. | MODE | # | QUANTITY | PITCH | GROOVE WIDTH | FINISHING ALLOWANCE | R PERIPH. SPEED | F PERIPH. SPEED | FEED | CUTTING DEPTH | R TOOL | F TOOL |
| 3 | GRV OUT | 0 | 1 | 0 | 10 | ◆ | ◆ | 120 | 0.08 | 2. | ◆ | 5 |
| SEQ | | FRONT CORNER | | STARTING POINT X | STARTING POINT Z | ENDING POINT X | ENDING POINT Z | REAR CORNER | | | ANGLE | ROUGHNESS |
| 1 | | | | 50. | 45. | 40. | 45. | | | | | |
| PNo. | MODE | # | | CHAMFER | LEAD | ANGLE | NUMBER OF BARS | HEIGHT | NUMBER OF TIMES | PERIPH. SPEED | CUTTING DEPTH | TOOL |
| 4 | THR OUT | 0 | | 0 | 2. | 60 | 1 | 1.299 | 10 | 120 | 0.3 | 6 |
| SEQ | | | | STARTING POINT X | STARTING POINT Z | ENDING POINT X | ENDING POINT Z | | | | | |
| 1 | | | | 50. | 0. | 60. | 88 | | | | | |
| PNo. | MODE | PARTS COUNT | | RECOVERY | WORKPIECE NO. | CONTINUOUS | NUMBER OF TIMES | SHIFTING DISTANCE | | | | |
| 5 | END | 0 | | 0 | 0 | 0 | 0 | 0 | | | | |

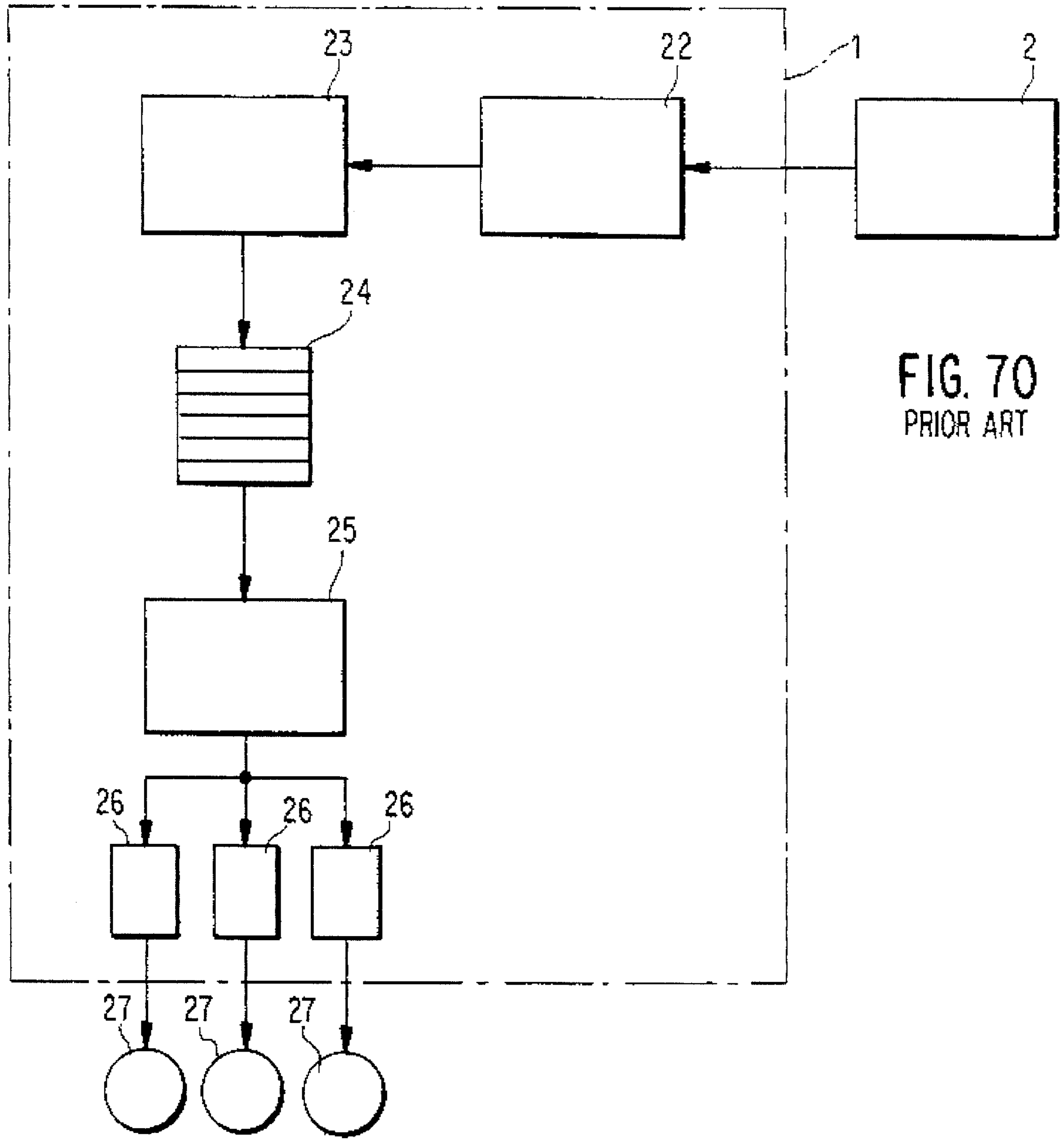
FIG. 70
PRIOR ART
FIG. 71 PRIOR ART
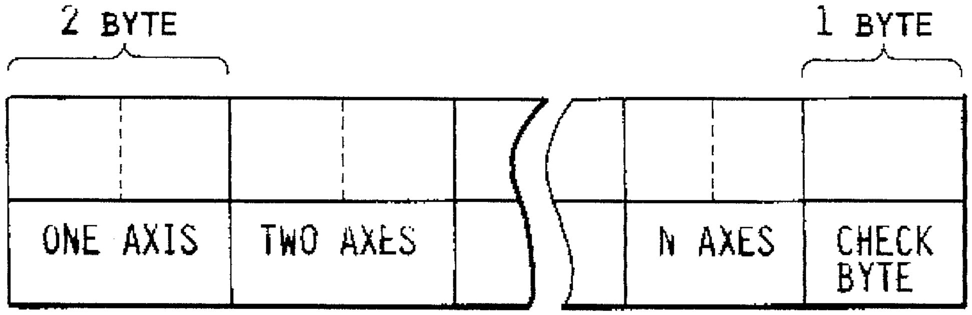

NUMERICAL CONTROL UNIT

BACKGROUND OF THE INVENTION

The present invention relates to a numerical control unit which controls a machine tool to form a workpiece as commanded by input instructions.

A conventional numerical control unit will now be described in accordance with FIGS. 60–71.

FIG. 60 shows a block diagram of the main section of an NC (numerical control) unit, in which 1 is an NC unit, and 2 is an external input/output unit connected to the NC unit 1. The input/output unit 2 is for sending and receiving data used by the NC unit 1. The NC unit 1 comprises a processor (CPU) 10, ROM 14 and RAM 15 for storing a control program, a display unit (CRT) 19 and its controller (GDC) 18, a video RAM (VRAM) 17 for storing the data to be displayed, a keyboard (KEY) 21 and its controller 20, a nonvolatile memory (RAM for battery backup) 16 for storing various parameters and offset data, and axis control sections 11 for controlling each axis (X-axis, Y-axis and Z-axis) of a machine for machining a workpiece, a PMC unit 12 for transferring data to or from external units (a large-current board and console on a machine) by executing the predetermined sequential processing, and I/O unit 13, and an input/output controller 22 for transferring data to or from the external input/output unit 2. Each of elements 10, 11, 12, 14, 15, 16, 17, 18, 20 and 22 is connected by a busline 4.

FIG. 61 shows a block diagram of various pieces of data which are stored in the nonvolatile RAM 16 of the NC unit 1. Tool data in the RAM 16 is comprised of elements 91, 92 and 93 and is set off by a dotted line in FIG. 61. This tool data is data associated with a tool (not illustrated) mounted on a machine (not illustrated) to be controlled by the NC unit. Specifically, tool shape data 91 is the data related to the shape of the tool, tool compensation data 92 is the data relating to the nose-radius compensation value of a tool, and tool offset data 93 is the data for setting the offset value showing the mounting position of a tool. Cutting condition data 94 involves data for setting a value used for an automatic determination of the cutting condition.

The dotted line in FIG. 61 surrounding elements 95 and 96 relates to machining program data and it is there that information is stored concerning the specific programs used by the NC unit to execute the numerical control which results in the machining of a workpiece by the tool. Machining program data consists of an area 95 for storing machining programs described by EIA language and an area 96 is for storing machining programs described by an automatic program.

Further, arrangement data 97 is included in the memory 16, and this data includes type-of-chuck data used for each machining operation and also includes data for a Z offset showing the end position of a workpiece. Parameter area 98 includes various parameters used for the NC unit 1.

Of all the data stored in the RAM 16 described above in the conventional NC unit, only the EIA machining program 95 is stored in the form of character codes (ASCII). The other data is stored in other various forms, such as binary form.

FIG. 62 shows an operation board of an NC unit, which consists of a CRT 19 and a keyboard 21. The user operates the various keys on the keyboard 21 in order to input various data to the NC unit. The CRT 19 is used to display information to the operator. FIGS. 63–66 show various pieces of data displayed on the CRT 19. Specifically, FIG. 63 shows a "POSITION" screen showing the information for the present position, or the like, of a tool. FIG. 64 is a "TOOL DATA" screen showing offset data for a tool. FIG. 65 is an "NOSE-R" screen showing data for the nose radius of a tool. Finally, FIG. 66 is a "PROGRAM FILE" screen showing the information for the machining programs stored in the NC unit.

FIG. 67 is a diagram for explaining how data stored in the nonvolatile memory 16 is displayed on the CRT 19. In FIG. 67, it is assumed that numerical values in parentheses indicate rows and columns displayed on the CRT 19. That is, "–(5, 3)–" indicates the data displayed on the fifth row in the third column of the CRT 19.

In general, each piece of data is stored in the nonvolatile memory 16 of the NC unit 1 in a specific area according to the type of data. That is, one type of data, double-precision real-number type data (TYPE-L), is collected and stored in one part of the memory 16 as shown in the bottom portion of FIG. 67. The numeral 28 represents this portion of the memory 16, specifically, the portion that includes TYPE-L data. As another example, another type of data, double-precision integral-number type data (TYPE-N) is also collected and stored in another part of the memory as shown by the numeral 29 in the bottom part of FIG. 67.

Therefore, in the conventional NC unit, each piece of data is usually stored in the nonvolatile memory 16 according to its data type and therefore data is not stored in a manner corresponding to the order in which it will be displayed on the CRT 19. Therefore, when data is to be displayed on the CRT 19, it must be rearranged first after it is read out of the memory 16 so that it may be arranged on the CRT 19 in order according to the numbers shown in parentheses in the top part of FIG. 67. This rearranging operation takes time and thus limits the efficiency of the conventional NC unit.

The data for an NC unit normally includes the following types: double-precision real-number type: 8-byte data capable of handling 15-digit real numbers; real-number type: 4-byte data capable of handling 7-digit real numbers; double-precision integral-number type: 4-byte data capable of handling 8-digit integers; and integral-number type: 2-byte data capable of handling 4-digit integers. Thus, with the conventional NC unit, much rearranging of data needs to be performed in order to display the data on the CRT 19.

Data is conventionally transferred to or from an NC unit by an interface such as an RS232C interface. For the EIA machining program 95 discussed earlier, data is generally inputted or outputted in the form of character codes, since character codes can easily be inputted or outputted. Although the machining program 95, as well as compensation value data 92 or the parameter data 98 of the NC unit 1, is capable of being inputted and outputted to and from the NC unit 1 in the form of character codes, other data has conventionally not been input/output in the form of character codes.

Recently, an NC unit has been developed in which automatic ("canned") machining programs 96 (FIG. 61) are increasingly used, these programs being stored in the nonvolatile RAM 16. FIG. 68 shows a machining diagram to be worked on according to the automatic machining program. FIG. 69 shows the automatic program for machining the workpiece shown in FIG. 68. The internal data of the automatic program shown in FIG. 69 has a special data structure, which does not involve the use of character codes. Therefore, to input or output the automatic program data 96, the data stored in the NC unit 1 is directly inputted or outputted in a form which is not the character code form.

Therefore, a problem existed in the prior art in that only certain types of data were inputted to or outputted from the NC unit 1 in the form of character codes which are easily handled by the external input/output unit 2.

The manner in which the restricted class of data is input/output to/from the NC unit 1 in the form of character codes will now be described. For example, the tool compensation value data 92 can be inputted or outputted in the form of character codes as shown below, (similarly to the EIA machining program 95).

```
G01L11 P_X_Z_Y_R_Q;
```

where,

P: is the offset number

X_: is the X-axis offset value

Z_: is the Z-axis offset value

Y_: is the Y-axis Offset value

R_: is the nose radius compensation value

Q_: is the assumed tip position

The tool compensation value 92 can be set or corrected by the command G10.

An example will now be given of how the parameter data 98 can be inputted or outputted in the form of character codes.

```
G10L50;
N_R_;
N_P_R_;
.
.
.
N_R_;
G11;
```

where,

G10L50: parameter input mode (G11 is the parameter input mode cancel)

N_: is the parameter number

P_: is the axis number (for axis-type parameter)

R_: is the parameter value.

In conventional NC units, a DNC function was used in order to transfer data between the NC unit 1 and the external input/output unit 2. However, according to the DNC function, it is necessary to develop exclusive software for the NC unit 1 and external input/output unit 2 because data is inputted or outputted by using an exclusive protocol, such a protocol not involving the character code format.

Now, the conventional method of processing data using a machining program will be described. FIG. 70 is a block diagram showing the outline of the processing by the program of the conventional NC unit 1. In FIG. 70, numeral 2 is the above-described external input/output unit which can be a controller for a floppy disk, IC card, and cassette tape or unit for communication with a computer system. Numeral 22 is an input/output controller in the NC unit 1, 23 is a machining program analyzing section, 24 is a data buffer, 25 is a machine controlling section, 26 is a servo controlling section and 27 represents servomotors.

A machining program is inputted from the external input/output unit 2 to the NC unit 1. The machining program may temporarily be stored in the memory 16 of the NC unit 1 or is directly sent to the analyzing section 23.

The purpose of the machining program analyzing section 23 is to analyze the machining program and check for errors in the machining program and to send the analysis results to the data buffer 24. The data buffer 24 temporarily stores the analysis results of the machining program. The machining controlling section 25 sequentially fetches the analysis results from the data buffer 24 to control a machine according to the analysis results. In the machine controlling section 25, an interpolation operation is executed, and the interpolation results are sent to the servo controlling section 26 where the servomotor 27 of each axis is servo controlled. In this way, the NC unit 1 can properly control a machine tool to machine a workpiece according to the machining program which has been input to the NC unit 1 by the input/output unit 2.

When the NC control unit is to machine a die for use in molding, a machining program may be generated, for example, by an off-line CAM (computer aided manufacturing) system or the like. In this case, measurement data involving a large number of commands of very short moving distances is generated because the machining program consists of data made by estimating a complex tool locus with microline segments. Therefore, in this instance, a great volume of data is transferred to the NC unit 1 by the input/output CAM system 2. The NC unit processing speed cannot match the speed at which the great volume of data is entering the NC unit.

Specifically, the program analyzing section 23 must first perform a specific analysis of the data before the analysis results can be sent to the data buffer 24. In the meantime, the machine controlling section 25 has sequentially processed all of the analysis results stored in the buffer 24 and the buffer is empty. When the buffer becomes empty, the machine controlling section has no more data to fetch from the buffer and thus the machining operation temporarily stops. This affects a workpiece to be machined and also the machining time increases. Therefore, a method of transferring binary-format data as shown in FIG. 71 is proposed in which tool moving distances of 4 msec and 8 msec are expressed by binary data to execute high-speed processing according to the moving-distance data for the specified number of axes. The number of axes to be commanded is specified by parameters.

According to the conventional method of FIG. 71, the data for one block consists of (2*N+1) bytes. N is the number of axes to be controlled. The moving distance of each axis is commanded with 2 bytes. A negative moving distance is commanded with the complement of 2. A check byte is obtained by adding the (2*N) bytes other than the check byte and discarding the overflow of 8 bits or more out of the total value.

Also, another method of realizing high-speed processing by limiting the format of a machining program inputted from an external unit 2 has been proposed in which a high-speed block can be commanded in the machining program. Only the following factors can be specified in this block:

the moving distance of the X-axis

Y: the moving distance of the Y-axis

Z: the moving distance of the Z-axis

F: the cutting (feed) speed

All pieces of data in this block are processed through linear interpolation (G01). A command format is specified as follows:

```
.
.
.
G05P01; —start of high-speed machining
X_Y_Z_;
.
.
.
G05P00; —end of high-speed machining
.
.
```

According to these conventional methods, however, the number of factors which can be specified in the blocks are limited (see FIG. 71). Further, the complicated process of linear interpolation must be carried out.

Another problem which existed in the prior art NC units will now be discussed. Some NC units 1 have the function of allowing data relating to a future machining operation to be input and set during actual machining. This is known as a background function since the operator is allowed to input and set data, for example, to be used in a future machining operation, while present actual machining is being carried out in the foreground. Certain types of data, for example, tool compensation values and parameter values which affect the machining currently executed, however, cannot be corrected according to the background function. This is because it is dangerous to correct the data used for machining, such as parameters and tool information, during actual machining. Therefore, in the prior art, data to be corrected is restricted.

However, when it is necessary to correct internal data which relates to a future process, the data is conventionally corrected after the present machining is completed. Thus, a problem exists in that a subsequent machining operation cannot be executed during correction of data and thus downtime increases.

To solve this problem, a method involving two memories is proposed in Japanese Utility Model Laid-open No. 1-127002. For this method, however, double memory area is necessary. Because recent NC units require a lot of data, this method greatly decreases the serviceability ratio of memory, causing the cost to greatly increase.

Also, in prior art NC units, it is impossible to compare data values before and after correction. For parameters, a method of storing data before it is corrected and displaying data values from the latest one before correction is proposed in Japanese Utility Model Laid-open No. 1-172133. However, this method only displays and stores the data before correction. Thus, direct comparison between the old and new values is not possible.

Because the machining program for an NC unit 1 is generally large, it is handled as a file. For file processing, a conventional method of recovering the original version of an erased or updated file is proposed in Japanese Patent Laid-open No. 3-116248. For this conventional method, however, the system for managing the file must greatly be remodeled in order to be able to recover the original file.

In many situations workpieces are to be machined which are approximately the same shape but which vary slightly as to the length of certain measurements. In the prior art it was necessary to correct the machining program for each different workpiece, or to separately enter various machining programs, one for each workpiece. The machining programs are almost the same. Therefore, time and memory is wasted.

With respect to shape data, there is a known parametric-shape defining method for defining the shape data by using variables. For this method, however, it is frequently necessary to define data by using an exclusive language. Therefore, the parametric shape cannot be defined unless the operator masters this exclusive language.

Further, in conventional NC units, when data was displayed on the CRT 19, the data was only displayed by using numerals and abbreviations. For example, abbreviations such as "X, Z, C, R, r and P" were used. A problem exists in that the operator may not understand what the abbreviations stand for unless he looks up the definitions of the abbreviations in a manual, or unless he is intensely familiar with the use of the NC unit.

Moreover, in conventional NC units, it cannot be detected whether abnormal data (i.e., a value which is greatly removed from the normal range of values for that piece of data) is input.

SUMMARY OF THE INVENTION

An object of the present invention is to provide an improved numerical control unit (NC unit) which will solve the above-mentioned problems which existed with respect to conventional NC units.

The invention involves a numerical control unit set-up in the following configurations.

A numerical control unit which receives data from an external input/output unit, said numerical control unit having a character code converting circuit which (a) receives data to be output from the numerical control unit to the external input/output unit and converts the data into character code data, and (b) receives data input from said external input/output unit to said numerical control unit and converts the data from character code data into a machine code.

A numerical control unit used for automatically machining a workpiece based on a program stored in said unit, characterized in that data pertaining to a future machining job can be edited by a user while said unit is performing a present machining job.

A numerical control unit in which programs comprising a list of instructions for performing a desired machining of a workpiece are stored in memory, further characterized in that a backup version of a program is created when a program is to be edited and the backup version is freely editable while an original version is being executed by said unit.

A numerical control unit comprising machining program generating means for generating a machining program in which all values in the program relating to machining operations are actual numerical values;

specifying means for specifying certain ones of said values to be described by variables instead of by said actual numerical values;

defining means for defining a variable; and replacing means for replacing the certain ones of said values specified by said specifying means with variables defined using said defining means.

A numerical control unit comprising storage means for storing operation data;

input means for inputting memo data corresponding to tolerance limits of said operation data; and display means for displaying said memo data.

A numerical control unit which receives a program for machining a workpiece from an external input/output apparatus, said unit comprising storage means for storing program data which has been input to said unit from said input/output apparatus. Buffer means for directly receiving the data input to said unit from said input/output apparatus;

machining controlling means for controlling a machining operation based on the program data stored in said buffer means;

wherein said program data is input from said input/output apparatus in a form so that it can be directly stored in said buffer means.

BRIEF DESCRIPTION OF THE DRAWINGS

FIGS. 16A–16B show examples of displaying history data;

FIG. 25 shows a machining program;

FIG. 26 shows a screen display of a machining program after being converted into variables;

FIG. 27 shows a screen display showing specifications of entered parts;

FIG. 29 shows an example of printing out entered data;

FIG. 31 shows a machining program;

FIG. 34 shows a machining program;

FIG. 41 shows a machining program;

FIG. 42 shows a diagram for explaining input/output data of the automatic program of the present invention;

FIG. 43 shows a diagram for explaining input/output data of the automatic program of the present invention;

FIG. 50 shows an example of outputting character codes;

FIG. 51 shows a block diagram of the main sections showing the outline of the machining program processing of the NC unit according to the present invention;

FIGS. 54A–54B show the data format in a data buffer;

FIG. 55 shows an ACCII code list;

FIG. 56A–56B show a special code list;

FIG. 57A–57B show the internal structure of analysis results;

FIG. 69 shows automatic-program data;

FIG. 70 shows a block diagram of main sections showing the outline of the machining program processing of an NC unit; and FIG. 71 shows a conventional binary format.

DETAILED DESCRIPTION OF THE PREFERRED EMBODIMENTS

The preferred embodiments of the present invention will now be described in conjunction with the above-mentioned figures.

Figure 1:
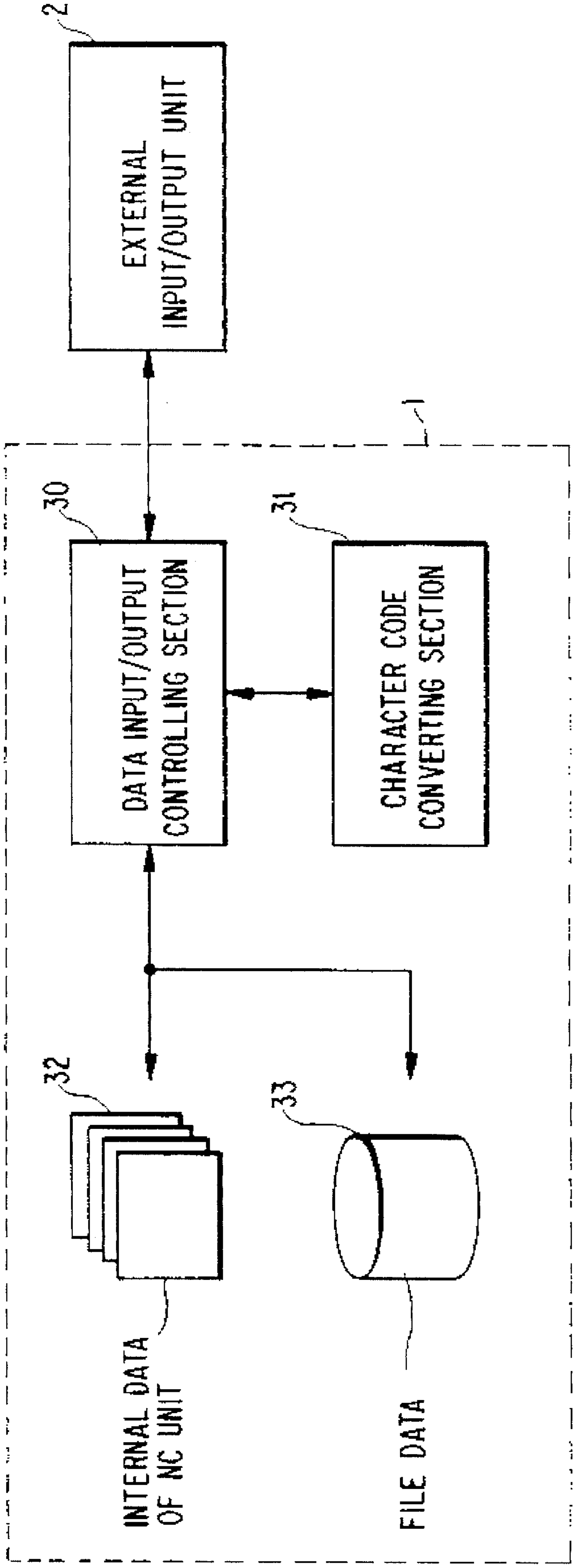
FIG. 1 shows a block diagram of main data input/output sections of the present invention.

FIG. 1 is a block diagram showing a general construction of the NC unit according to the present invention. FIG. 1 explains the input/output of data between an NC unit 1 and an external input/output unit 2. The unit 2 can be a paper tape reader, paper tape puncher, cassette, floppy disk drive, personal computer generally sold, or any one of input/output units capable of connecting with the NC unit. The input/output unit 2 generally uses an interface such as an RS232C. However, the interface is not restricted to the RS232C.

Numeral 32 is an area where each piece of data in the NC unit 1 is stored, such data is normally stored in the nonvolatile memory 16 discussed above with respect to FIG. 60. Numeral 33 represents data managed as a file for storing programs, such as machining programs or the like. These are also stored in the nonvolatile memory 16.

All Communication Takes Place in Character Code Format

Numeral 30 is a section for controlling the input/output of data between the NC unit 1 and the external input/output unit 2. A character-code converting section 31 is connected to the data input/output controlling section 30, and has the function of converting data which is in a form other than character code format into character codes.

Thus, data which comes into the NC unit 1 by means of the external input/output unit 2, can be of character code format. That is, the converter 31 can convert the incoming character code format data into other forms of data, such as binary data, more easily handled by the NC unit 1. Also, when data is to be output from the NC unit 1 to the unit 2, the converting section 31 can convert data which is not of the character code format into the character code format before it is sent to the unit 2.

The unit 2 finds the data very easy to handle if it is in the character code format, because any type of computer system can easily handle character code format (ASCII code). Further, with character code format data, a user of a PC is allowed to manipulate data in the NC unit very easily. Further, if a hard disk is located in the PC (external input/output unit 2) instead of inside of the numerical control unit 1, it is much cheaper to have the data be present in character code form.

Still further, many NC units use their own format of data. Therefore, a user would have to learn the new format of an NC unit if he purchases one which uses a different data format. However, according to the present invention, due to the fact that all data is transformed into character code data before it is sent to the input/output unit 2, there is no longer a need to learn a format of data on a product-by-product basis.

Array Data Format

Figures 2, 3:
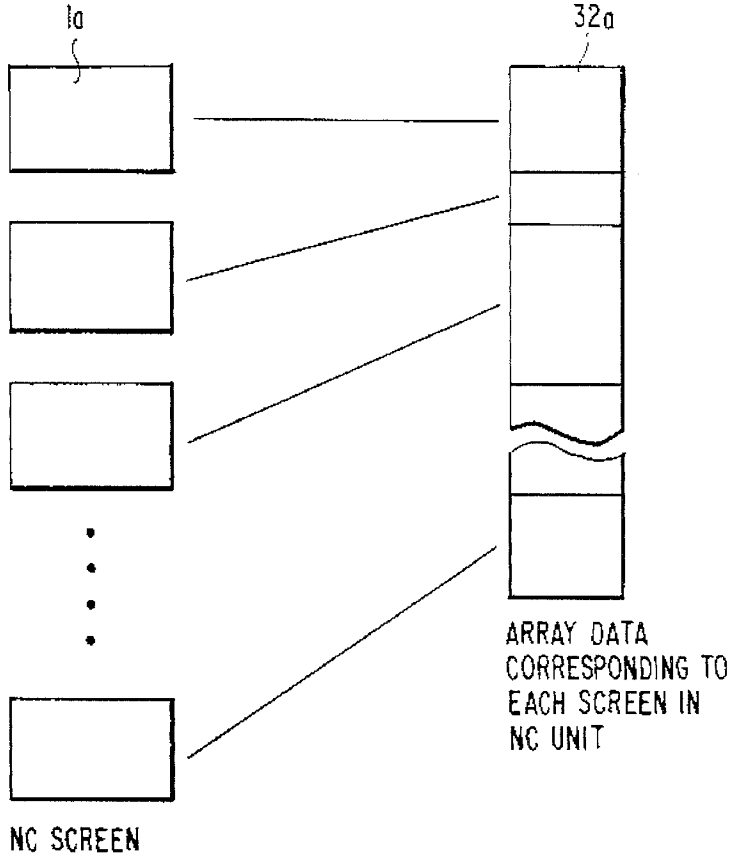
FIG. 2 shows a diagram for explaining the internal data of the NC unit of the present invention.
FIG. 3 shows a diagram for explaining the internal data of the NC unit of the present invention.
Figure 60:
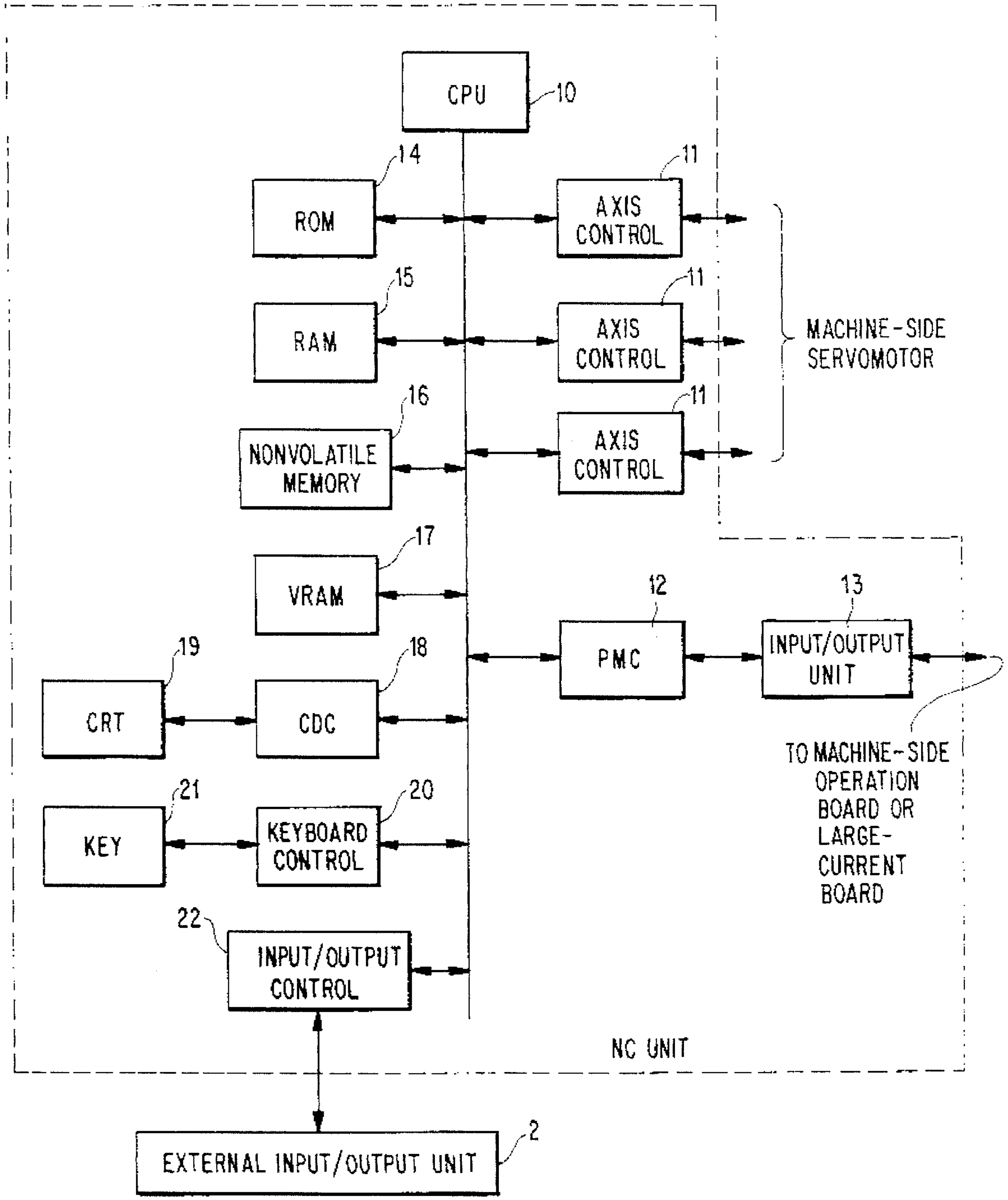
FIG. 60 shows a block diagram of main sections of an NC unit.
Figure 61:
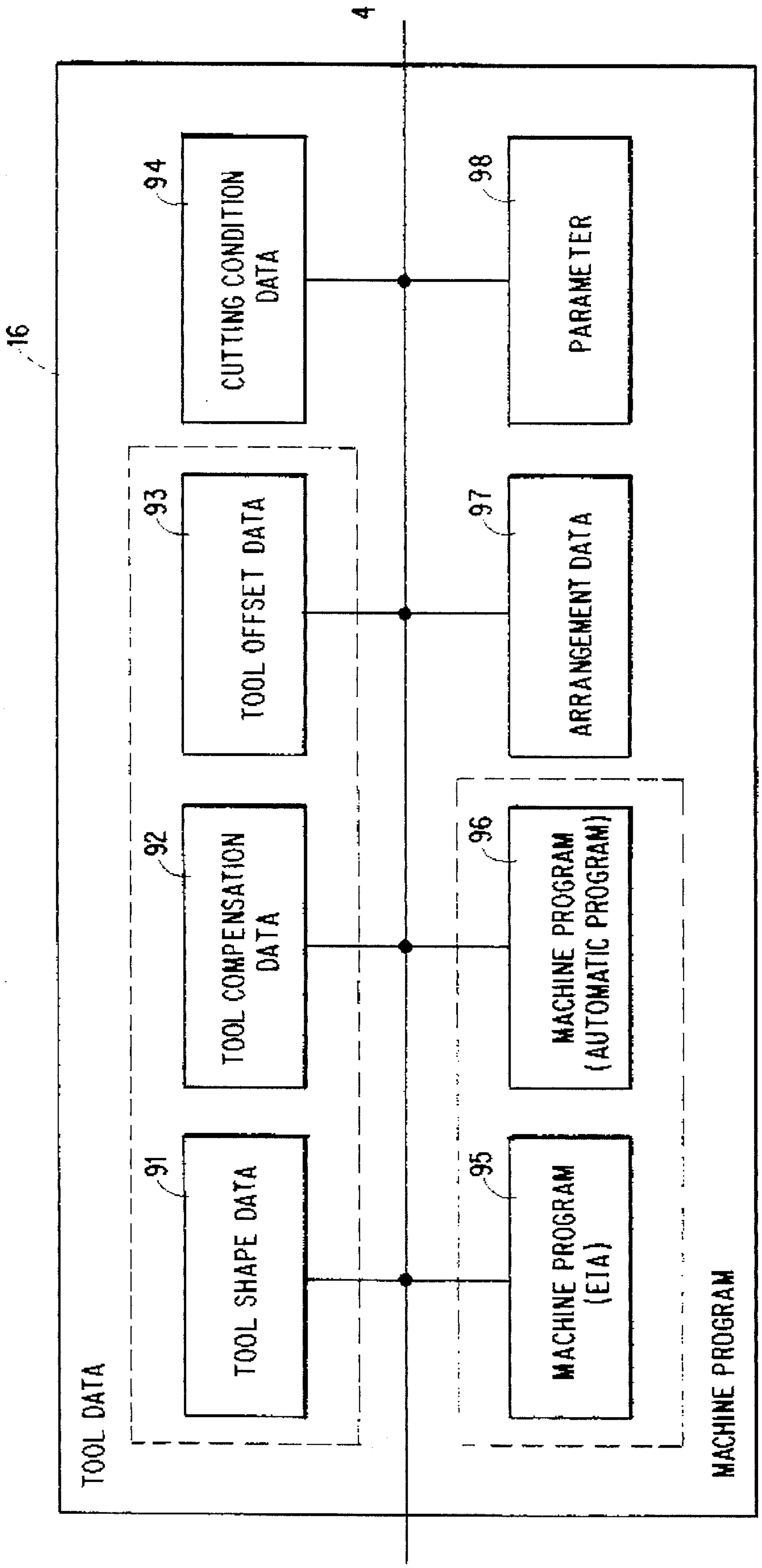
FIG. 61 shows a block diagram of the data in an NC unit.
Figure 62:
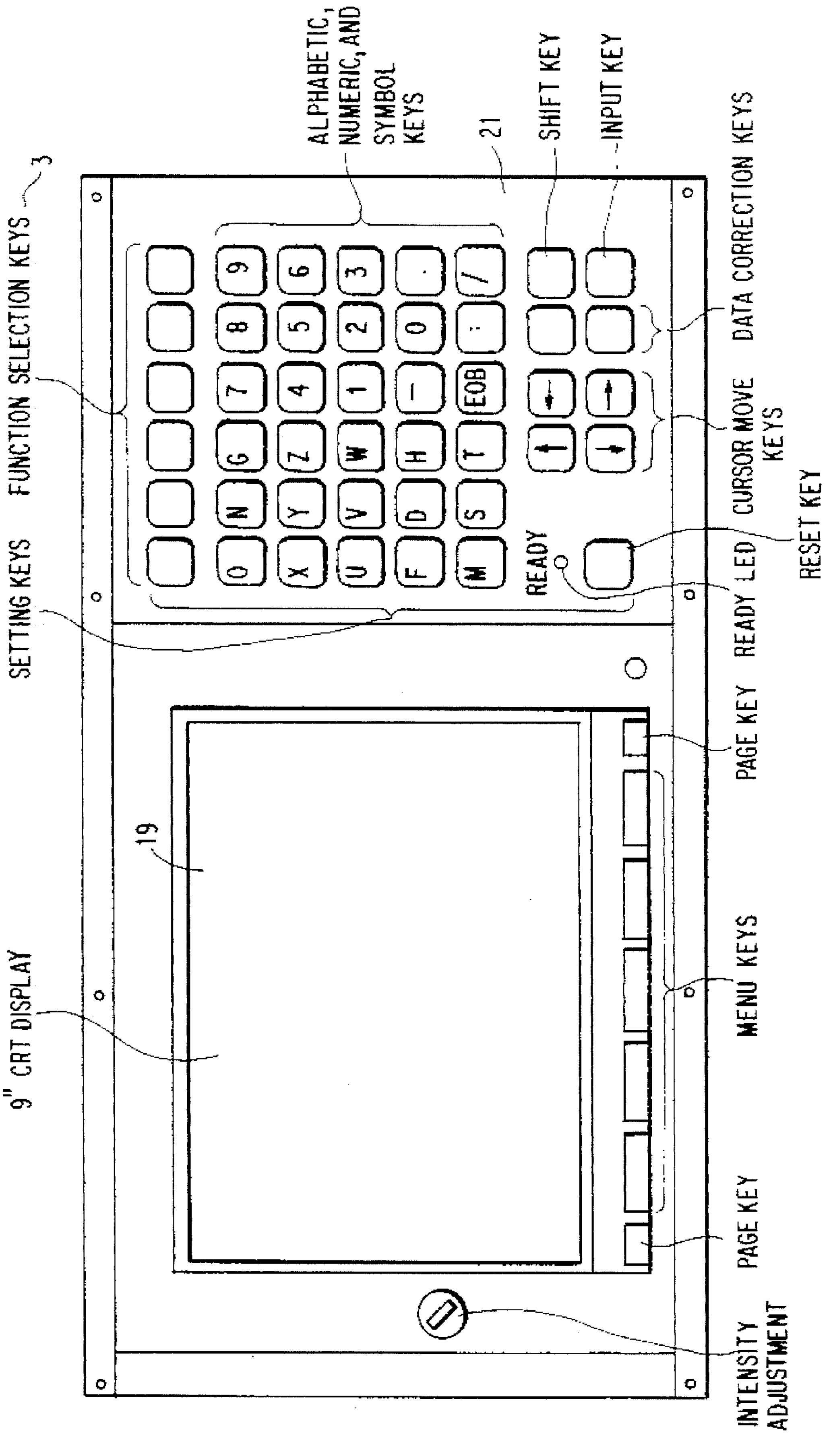
FIG. 62 shows a conventional operation board.

The data in the area 32 of FIG. 1 is stored in the memory 16 of FIG. 60 according to an array-data format corresponding to each screen of the NC unit 1 which is displayed on the CRT 19, as shown in FIG. 2. Specifically, as shown in FIG. 2, reference numeral **32*a* represents the data stored in the memory 16, and reference numeral 1*a* represents various NC screens which are displayed individually on a CRT 19. As shown in FIG. 2, a specific area of the data 32*a* corresponds directly to each screen 1*a***.

Figure 4:
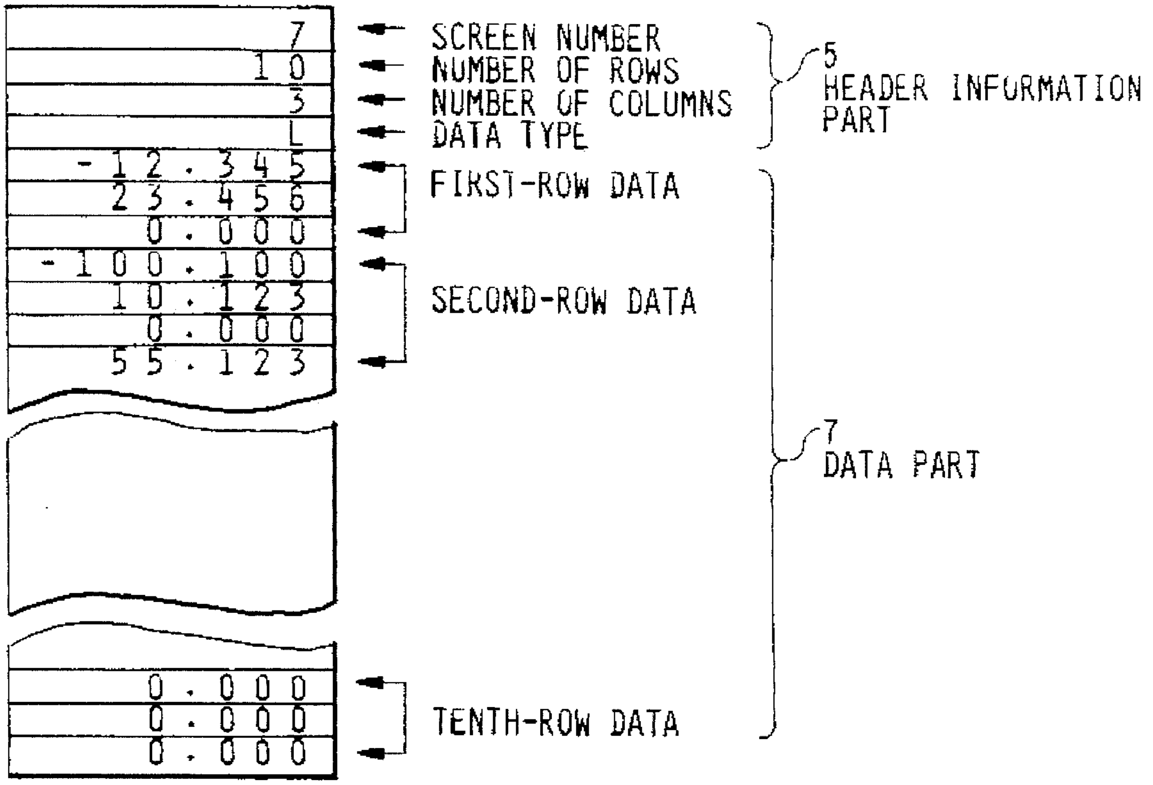
FIG. 4 shows a block diagram of the internal data of the NC unit of the present invention.
Figure 64:
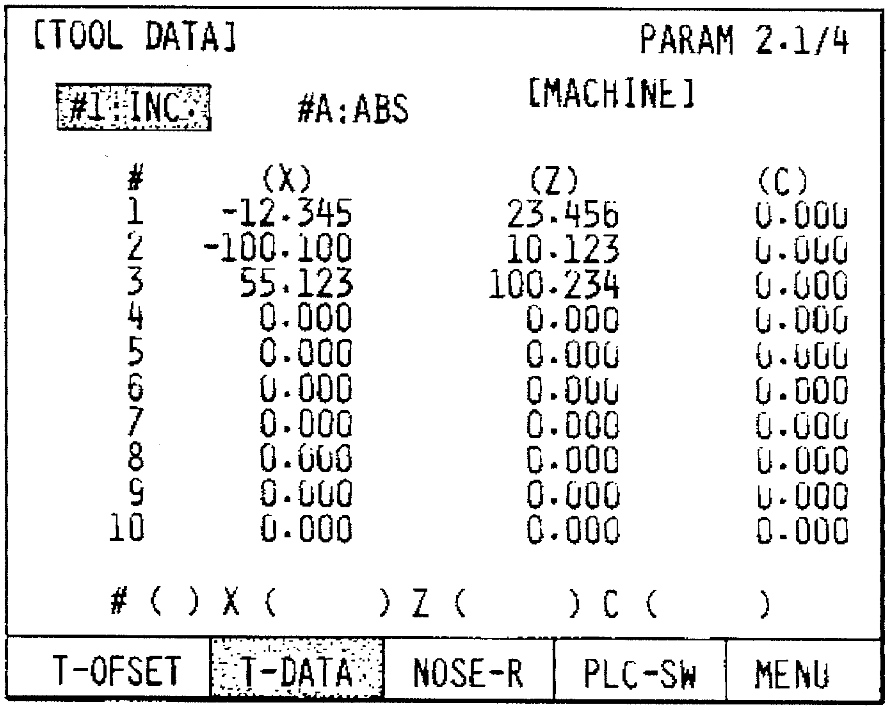
FIG. 64 shows a diagram for explaining a conventional screen display (TOOL DATA)
Figure 65:
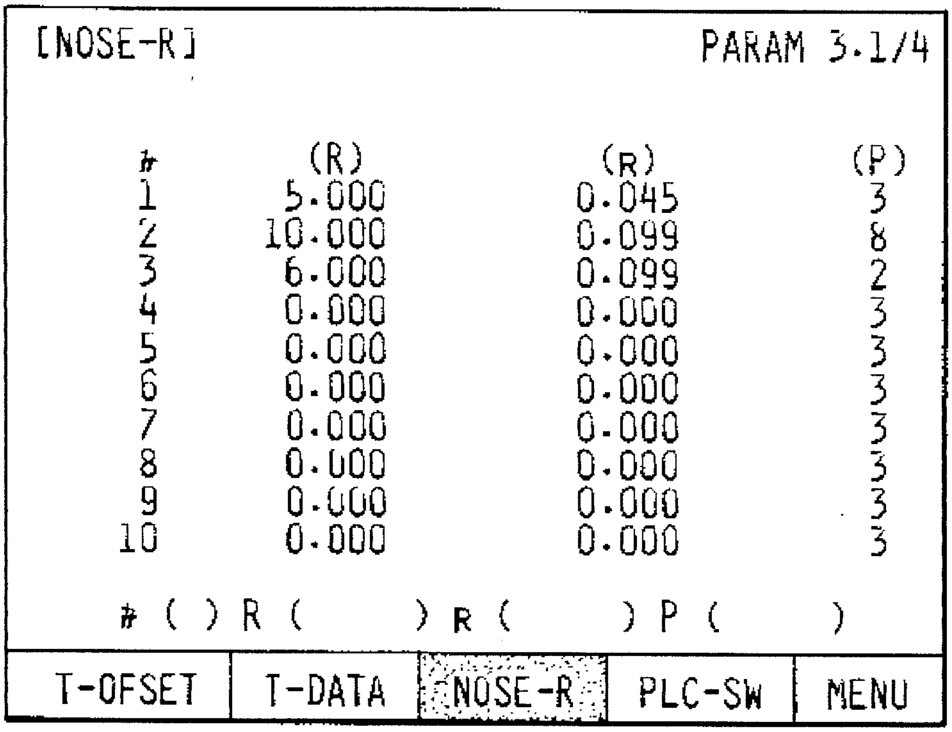
FIG. 65 shows a diagram for explaining a conventional screen display (NOSE-R)

FIG. 4 shows examples of how data **32*a* is stored in the memory 16 of the NC unit. The "TOOL DATA" shown in FIG. 64 is shown stored as data 32*a* in FIG. 4 according to the array data format of the invention. The data is considered as array data consisting of 10 rows and 3 columns and stored as internal data 32*a* according to the specific format shown in FIG. 4. Specifically, each screen data stored as data 32*a* consists of a header information part 5 and a data part 7. The header information part 5 consists of a screen number, the number of rows, and the number of columns of the array of the data part 7, and data type. The data type refers to the particular type of data involved; for example, in FIG. 4 the data is designated in the header part as type L corresponding to double-precision real-number type data. In this way, screen numbers may be used as index numbers for calling up particular data from the internal data 32*a* stored in the memory 16**. Although screen numbers are used as index numbers for screens for the described embodiment, it is possible to use numbers according to the classification of screens. For example, it is possible to use "T1", "T2", "T3" . . . as screen numbers for a screen related to tool information and "P1", "P2", "P3" . . . as screen numbers for a screen related to parameters.

In short, in order to call up a certain piece of information from the NC unit internal memory 16, it is only necessary to specify a screen number, corresponding to a particular screen which will be displayed on the CRT unit 19. For example, as shown in FIG. 4, the screen number is indicated as screen no. 7 (see header section 5). The header 5 further specifies that there are 10 rows and 3 columns in the array format and that the data type is data type L. FIG. 3 further shows the array format as it would look displayed on the CRT 19. The total number of pieces of data in the data part can be obtained by multiplying the number of rows by the number of columns.

The various types of data types are classified, for example, as follows:

L: double-precision real-number data

S: real-number data

D: double-precision integral-number data

N: integral-number data

Figures 6, 7:
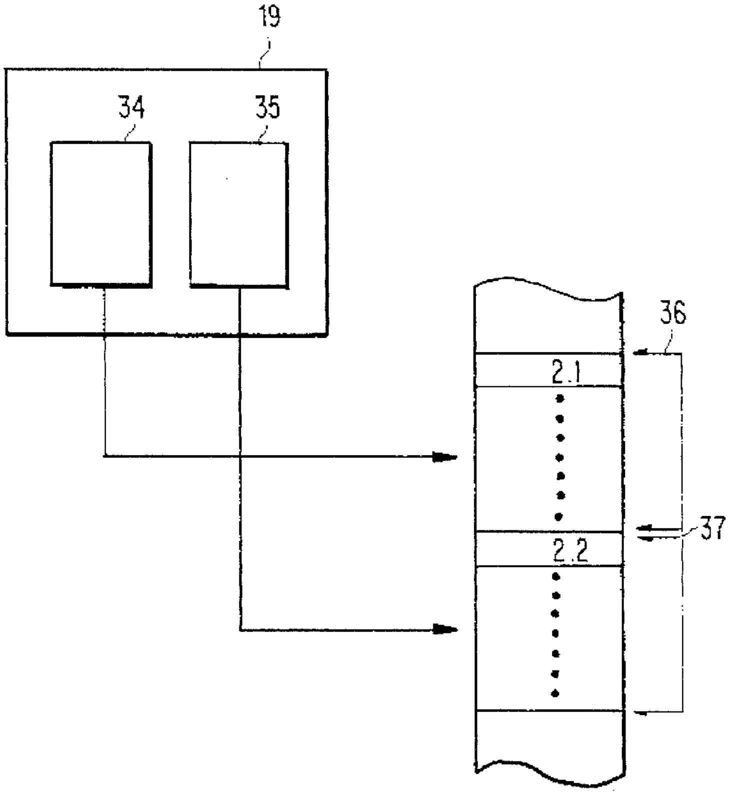
FIG. 6 shows a diagram for explaining input/output data of the present invention.
FIG. 7 shows a diagram for explaining the internal data of the NC unit of the present invention.

For this embodiment, an example is shown in which all pieces of data for one screen are handled as one array data value. However, to simultaneously display different types of data on one screen, it is possible to store the data by dividing it into a plurality of array data values, right-half data values and left-half data values. In this case, it is also possible to classify screen numbers by giving the numeral, for example, "2.1" to the array showing the left-half data and "2.2" to the array showing the right-half data. In FIG. 7, reference numeral 34 shows the left-half data displayed on the CRT 19 and 35 shows the right-half data displayed on it. Numeral 36 represents array data corresponding to the left-half display as it is stored in memory and reference numeral 37 represents stored array data corresponding to the right-half display data 35.

In FIG. 4, an example is shown of storing data in the data part in the order of (1, 1), (1, 2), (1, 3), (2, 1), (2, 2), and so on. However, it is also possible to store data in the data part in the order of (1, 1), (2, 1) . . . , (10, 1), (10, 2), and so on.

Figure 5:
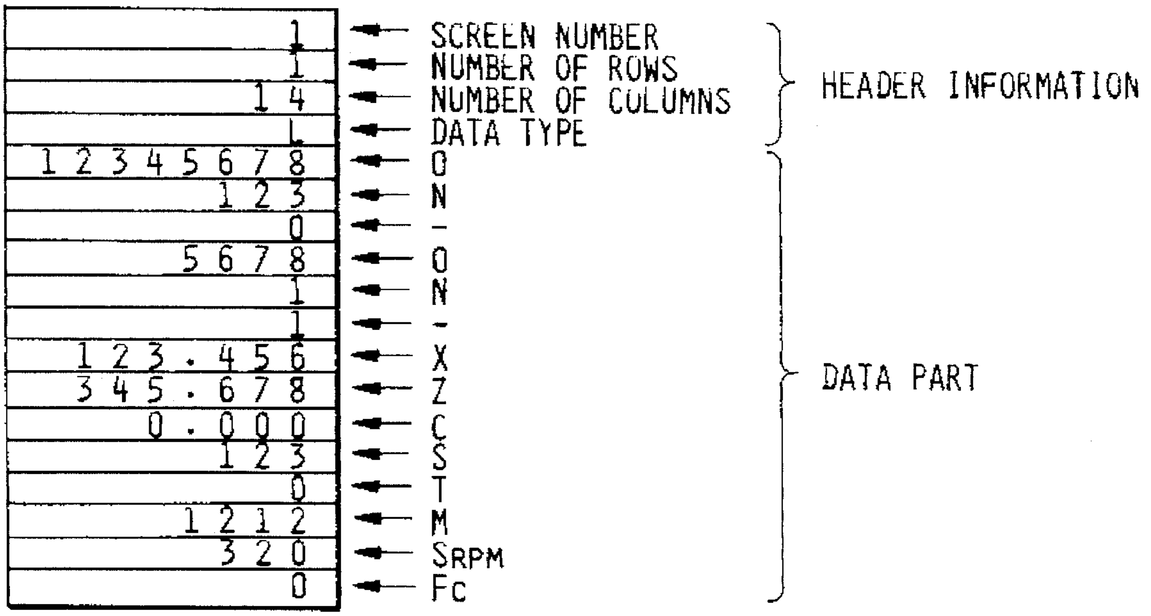
FIG. 5 shows a block diagram of the internal data of the NC unit of the present invention.
Figure 63:
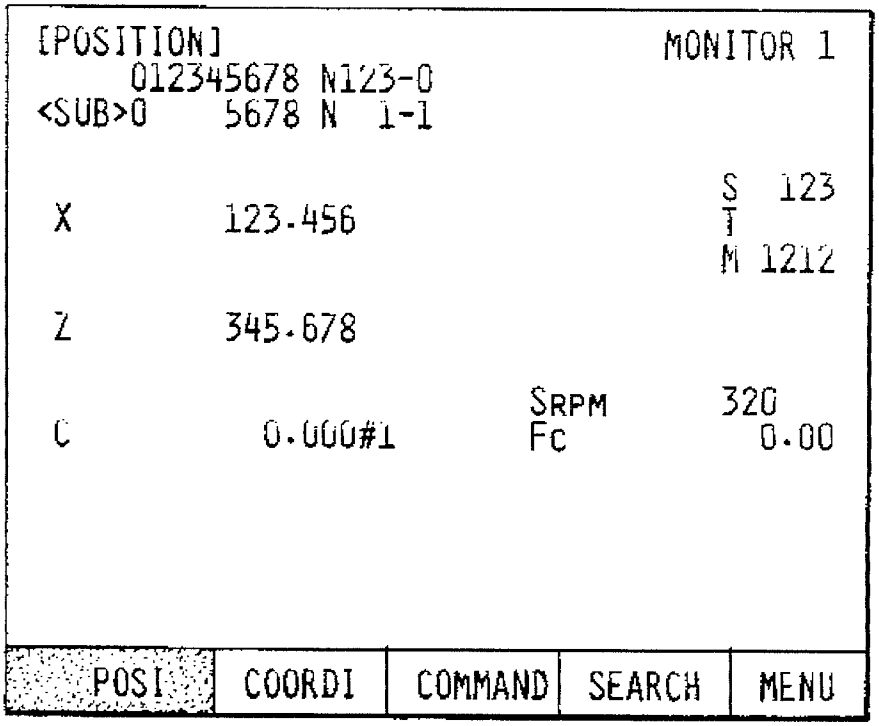
FIG. 63 shows a diagram for explaining a conventional screen display (POSITION)

Sometimes it may be difficult to display data as an array, for example, when displaying the "POSITION" screen shown in FIG. 63 which displays the present position of a tool. In these cases, it is possible to store data according to the format shown in FIG. 5 as a one-dimensional array.

Each piece of data is shown by a header including a screen number, number of rows, and number of columns. For example, the data "55.123" corresponding to the array position #3, <X> in FIG. 64 is shown as follows:

(7, 3, 1)=55.123

In the above expression, 7 indicates the screen number, 3 indicates the row number, and 1 indicates the column number.

The array data in FIG. 4 is converted into the character codes shown in FIG. 6, or the array data shown in FIG. 4 is obtained by converting the character codes in FIG. 6. Therefore, the NC unit can communicate with the external input/output unit 2 using strictly the character code format.

In FIG. 6, *H(7, 10, 3), L; indicates header information and *END; indicates the end of data. As described above, the present invention makes it possible to output the data 32 in the NC unit to an external input/output unit and vice versa in the form of character codes as shown in FIG. 6.

Although the array-data structure in FIG. 4 is shown for the above embodiment, the data structure is not restricted to the exact structure shown in FIG. 4.

By storing data in the NC unit using the screen, row and column numbers, as described above, each piece of data is thus uniquely specified by three coordinates. Since the type of data is also specified in the header, a software conversion, which is necessary in order to display the stored data on the screen, becomes easy. Specifically, a different type of software conversion is required based on the type of data. By specifying the data type in the header, the proper software can be used in order to convert, thus allowing for easy processing.

Further, because the data is transformed into character code format, as shown in FIG. 6, the data becomes easy to print out. Further, a word processor of a personal computer (PC) can handle the NC machining data very easily. Editing or storing NC data, therefore, becomes greatly simplified.

BACKGROUND CORRECTION

The NC unit is also able to make certain corrections to data while other data is being operated on by the NC unit. That is, a user can indicate to the NC unit changes in data which the user wishes to make, such changes relating to a future use of the NC unit. For example, the user wishes to make a correction to data relating to a future machining operation to be carried out after the present machining operation. The user makes this correction to the future machining operation while a present machining operating is being carried out.

The invention causes the screen 19 to be highlighted at the particular location at which the user wishes to make a correction, so as to provide for easy visualization of the correction location. When cutting is finished for a present machining operation, the user pushes the program number for the next cutting program and the changes entered earlier by the user are automatically carried out at this time. The highlighting stays on so if the user has made a mistake in making changes, it is very easy to find.

Figure 8:
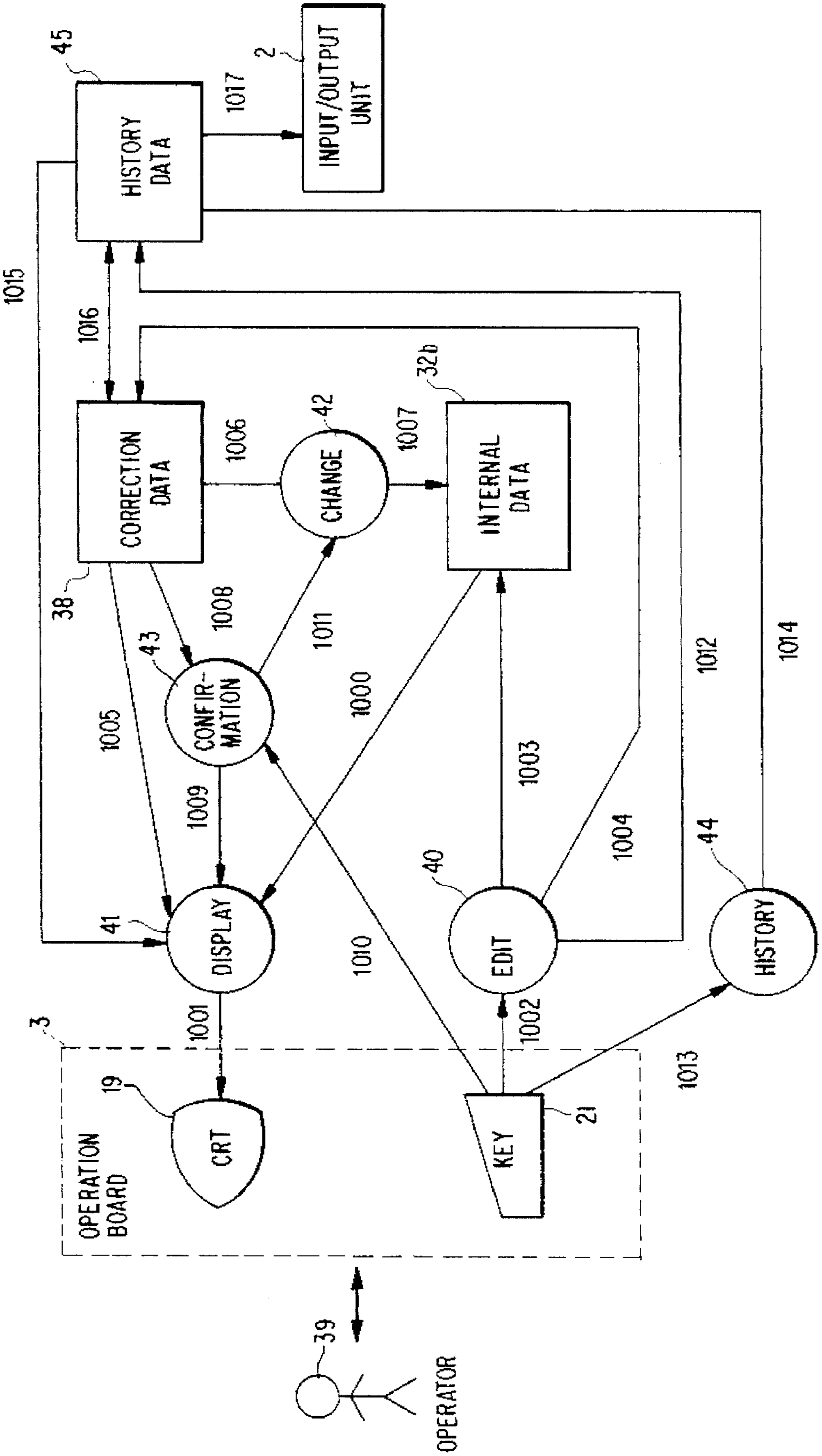
FIG. 8 shows a flow chart related to data input/output of the present invention.

FIG. 8 shows a block diagram for showing the direction of data flow when an operator 39 edits data 32*b* in an NC unit 1 by operating an operation board 3 on the NC unit 1. The operator 39 edits data by operating a keyboard 21 while viewing the data displayed on a CRT 19 of the operation board 3. The data to be displayed on the CRT 19 is fetched out of the internal data 32*b* (Route 1000) and processed by a display preparing section 41 so that it can be displayed on the CRT 19 via Route 1001.

Figure 9:
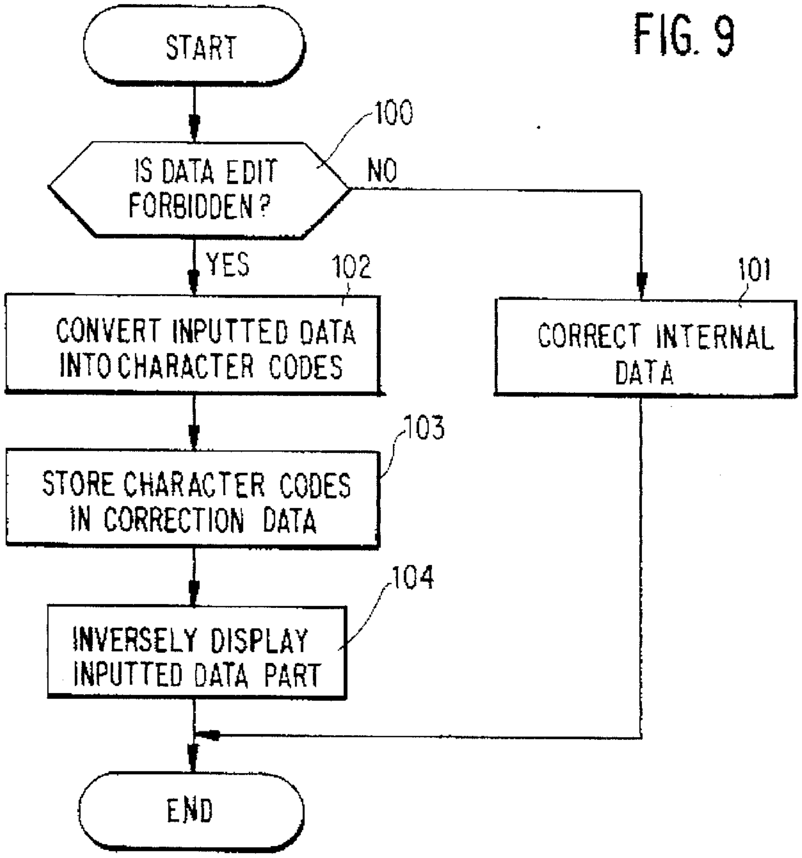
FIG. 9 shows a flow chart for data correction of the present invention.

When the user wishes to make a correction, the data inputted through the keyboard 21 by the operator 39 is sent to an editing section 40 via Route 1002. There, it is checked (at step 100 of the flow chart of FIG. 9) to see whether editing of data is forbidden. Situations in which data editing is forbidden exist when it is dangerous to change the internal data 32*b*, e.g., because the NC unit 1 is actually using the data while executing present machining, according to an automatic operation program. If the editing of data is not forbidden, the internal data is directly edited (step 101 of FIG. 9) by using Route 1003 of FIG. 8. In this case, the contents of the internal data 32*b* are immediately changed according to the wishes of the operator 39.

In situations when editing of data is forbidden, correction information is converted into character codes (step 102). For example, if the operator wishes to change (set) the data in FIG. 64 in the fifth row and second column from 0 to 111.222, the character codes (7, 5, 2)=0,111.222; are generated. This shows that the data 0 at the fifth row and second column of the seventh screen is corrected to 111.222. That is, the data in parentheses in the character code format indicates the display position on the screen (7 indicates the screen number, 5 indicates the row number, 2 indicates the column number), and the numbers to the right of the equals sign indicate data values before and after correction. That is, 0 indicates the data before correction and 111.222 indicates the data after correction.

Then, the generated character codes are stored in the corrected-data storing area 38 via Route 1004 in FIG. 8. At this point, the edited data part is highlighted on the screen (step 104) so that the corrected part can easily be recognized. To display data on a screen, the display controlling section 41 fetches the internal data 32*b* via Route 1000 and the corrected data 38 via Route 1005 and synthesizes these pieces of data to generate the data to be displayed on the CRT 19. That is, corrected results are displayed on the CRT 19.

Figure 12:
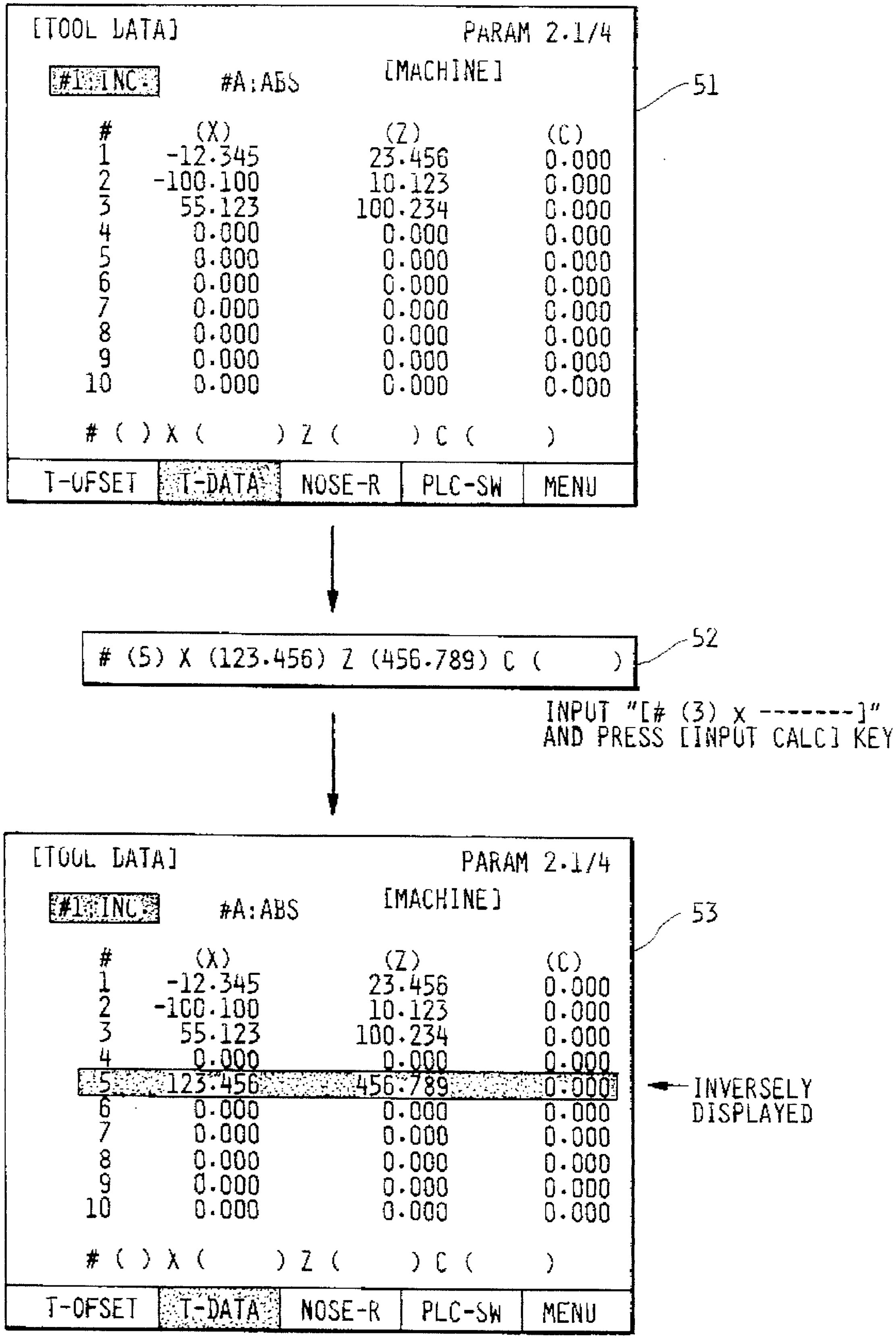
FIG. 12 shows a diagram for explaining the operation related to data correction of the present invention.

FIG. 12 shows an example of the above-described procedure in which the data 123.456 at location X (column 1) of #5 (row 5) of the TOOL DATA screen is the new value after correction and 0 is the old value. Further, the data 456.789 at location Z (column 2) of #5 (row 5) is a new value and 0 is the old value before correction. The screen 51 of FIG. 12 is the screen before data is corrected. There, it can be seen that the location X#5 and Z#5 are both 0. When the operator inputs "#(5)X(123.456)Z(456.789)C( )" as shown in the screen 52 and presses the INPUT key to command input of data, corrected data is highlighted as shown on the screen 53 to show that the data is temporarily corrected. Since the NC unit is most likely carrying out a present machining operation, the data is not actually changed in the data storage area 32*b* to the new values, but is only corrected on the screen for the user to observe. Once the NC unit finishes carrying out the present machining operation, the data will actually be changed in memory 32*b*.

Figure 13:
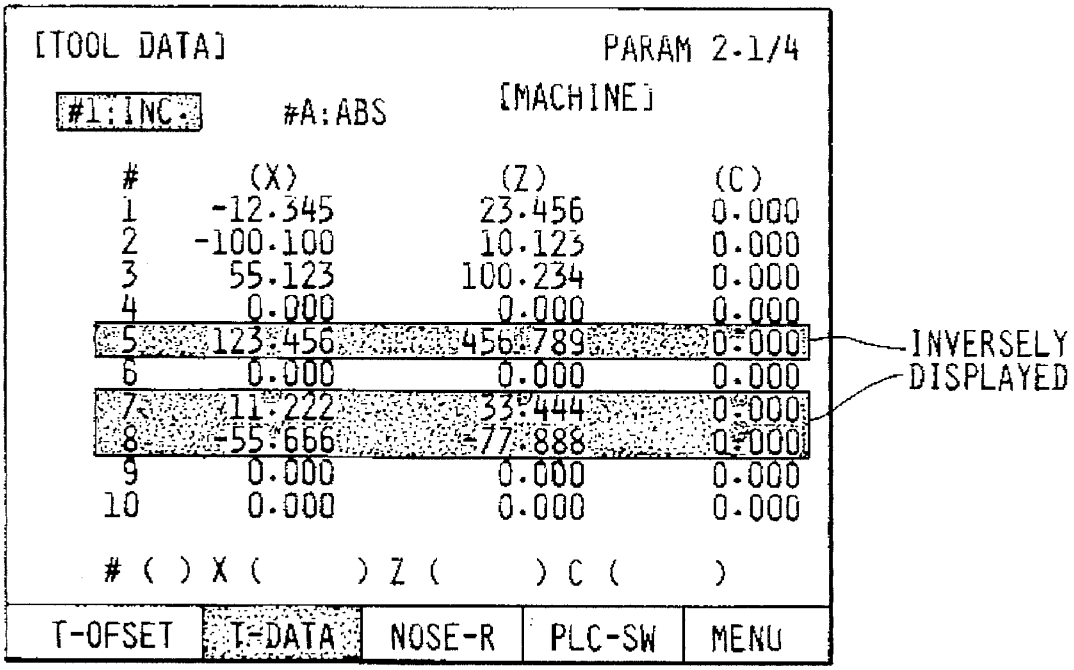
FIG. 13 shows a diagram for explaining screen display related to data correction of the present invention.

When a plurality of pieces of data are corrected on one screen, all corrected parts are highlighted as shown in FIG. 13.

Figure 10:
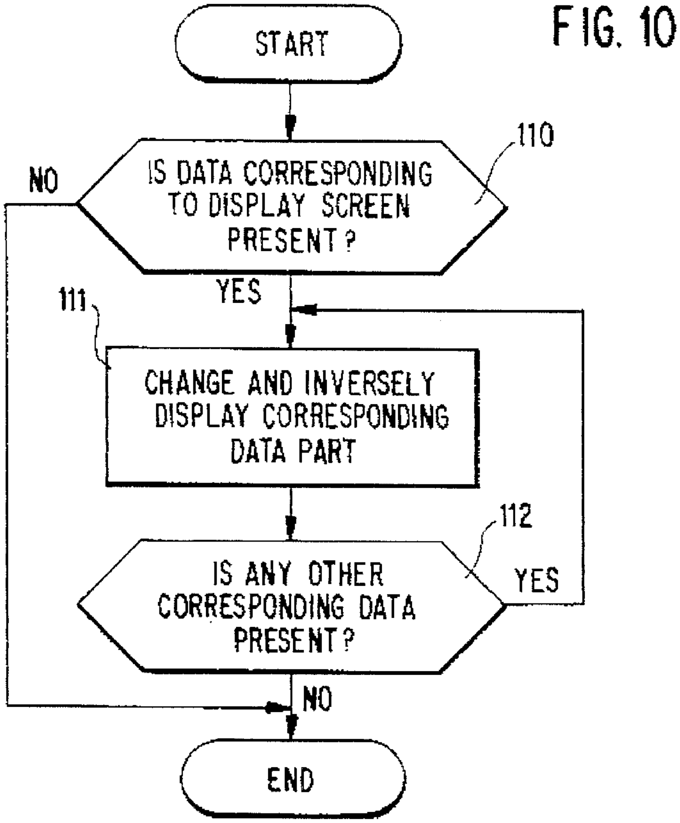
FIG. 10 shows a flow chart related to screen display of correction data of the present invention.

FIG. 10 is a flow chart for showing the processing for highlighting only the corrected data. First, it is checked whether there is any corrected data stored in the corrected data storing area 38 (step 110), such corrected data corresponding to the screen currently displayed on the CRT 19. If not, no highlighting takes place. If so, the corresponding data part on the screen is changed to the corrected data value and highlighted (step 111). Then, at step 112 it is checked whether data corresponding to any other screen is present in the corrected data storing area 38 (step 112). If so, the data is immediately corrected and highlighted (step 111). This operation is repeated until data in the corrected data storing area 38 runs out.

When it is no longer forbidden to edit data, the corrected data is taken out of the corrected data storing area 38 along Route 1006 of FIG. 8 and sent to the changing section 42 which corrects the internal data 32*b* according to the corrected data (Route 1007). Then, the corrected data storing area automatically erases the data that was stored therein.

In this way, the operator 39 is allowed to view on the CRT 19 the corrections which he wishes to make highlighted on the CRT 19 before the changes actually take place in the internal data area 32*b* during situations when data editing is forbidden. Once data editing is no longer forbidden, the corrected data storing area contents 38 are transferred to the internal data 32*b* by means of the changing section 42, thus completing the data correction operation.

The above examples show the case in which the operator 39 inputs data with the keyboard 21. However, data may also be input through the external input/output unit 2 when editing of data is forbidden. Specifically, it is possible to temporarily store the inputted data from the input/output unit 2 into the corrected data storing area 38 to similarly process the data after the data editing forbidding state is no longer present.

For the embodiment described above, the corrected data part is highlighted on the display. However, it is also contemplated to use any other method as long as the corrected part can be easily identified. For example, it is possible to use a method in which the corrected part is provided with a mark indicating that data is corrected, or the color of the corrected part may be changed if a color CRT is used.

A history data feature of the background machining operation correction technique will now be described. The circuit shown in FIG. 8 is capable of keeping track in a history data storing area 45 of all the data which has been corrected. When a history storing mode is on, the editing section 40 converts correction information into character codes whenever data is corrected and stores the character codes in the history data storing area 45 along Route 1012. The history data 45 is stored in the form of character codes with the same format as that of the corrected data 38, and the order of the data in the history data storing area 45 is such that data is stored in order of correction. The history data storing area 45 stores the data changes up to its assigned storage capacity. When the amount of data exceeds the storage capacity, data values are erased starting from the oldest one. Therefore, pieces of correction information from the latest to the oldest ones within the range of storage capacity are stored.

The contents of the history data storing area 45 can be displayed on the CRT 19 along Route 1015. It is also possible to display data in order of storage or from the latest one, or to display special data, such as all correction data relating to a particular screen.

Figure 15A:
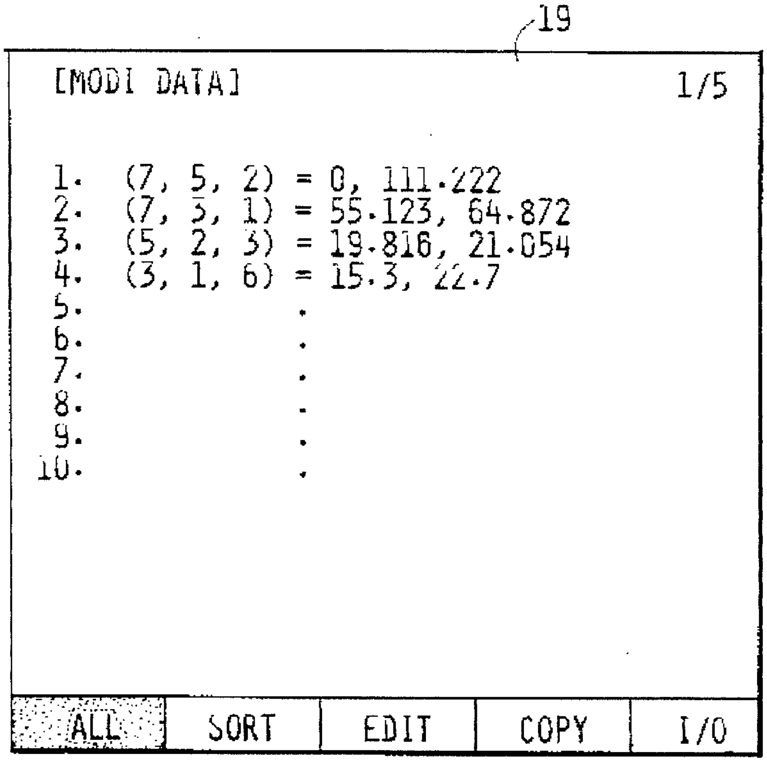
FIGS. 15A–15B show examples of displaying history data.
Figure 15B:
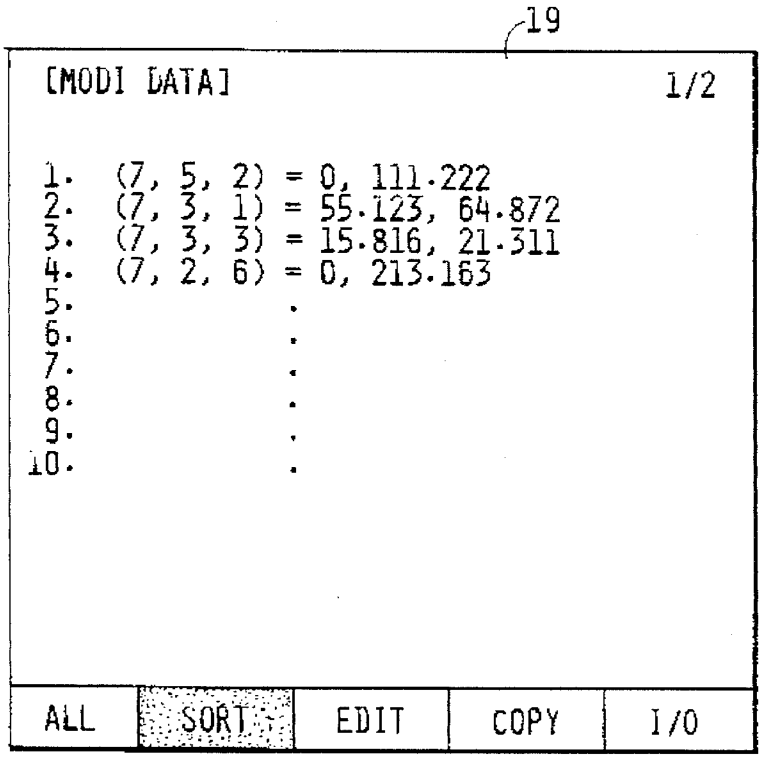

FIG. 15 shows examples of displaying the history data on the CRT 19. The screen 19 in FIG. 15A shows an example of displaying data values starting with the latest one in order and the screen 19 in FIG. 15B shows an example of displaying only the data in the screen 7.

As shown in FIGS. 15A–15B, the array data format described above, in which each piece of data can be specified by giving a screen number, row number and column number provides advantages here in that history data can be easily accessed and displayed FIGS. 15A–15B as shown.

As further shown in FIGS. 15A–15B, the menu display at the bottom of the screen is used to select a type of display operation for the history data 45, in which "ALL" is used to display pieces of the history data 45 from the latest one in order. It is also possible to display the data overflowing from one screen onto another screen.

The display of screen 19 in FIG. 15A shows a numerical value of ⅕ displayed on the top right of the screen. This indicates the n-th screen of "m" screens. The screen 19 of FIG. 15A shows that the numerical value indicates the first screen of five screens. "SORT" at the bottom of the screen 19 in FIG. 15B is another menu item and is used to display only special data, for example, corrected data relating to the seventh screen can be displayed.

The menu data "EDIT" is used to correct history data by placing the cursor 46 shown in FIG. 16A on the incorrect data and making changes using the keyboard. Because editing makes it possible to change a value or erase data, it is possible to correct an erroneously corrected data value or to erase edited data when data which should not be corrected is erroneously corrected. It is also possible to generate the data for recovering corrected data by entering the data by means of keyboard 21. The data travels along Routes 1013 and 1014 to the history data storage area 45 where the history data may be directly edited.

For example, when the data (7, 3, 1)=55.123, 64.872 is present, the data (7, 3, 1) can be recovered in its original format before correction by replacing the data values before and after correction to change them into the data (7, 3, 1)=64.872, 55.123 in transferring it to the corrected data area 38 using the "COPY" function to be described below, in order to change it.

"COPY" is shown in FIG. 16B and is also a part of the menu provided at the bottom of the screen. "COPY" is used to transfer some or all of the contents of the history data 45 to the corrected data area 38 along Route 1016. In this way, if corrected data is not present in the corrected data storing area 38, it can be placed there from the history data area 45 and then sent to the internal data area **32*b* for correction purposes. Thus, if at first changes have been made to a piece of data in area 32, and then additional changes are made to the same pieces of data at a later time, the original change will have been recorded by the history data area 45. This original change can be recovered by transferring the history data to the corrected data storing area 38 using the "COPY" function and then transferring this data to the internal storage area 32*b*** for recovering the initial correction despite the fact that a second correction has been made.

The data to be transferred can be specified as shown in FIG. 16B by highlighting on the screen all of the history data which is desired to be transferred to the corrected data storing area 38. The range of data can be specified by specifying a block of data including the beginning and end of such a block to be copied with the cursor key on the keyboard 21. This is similar to a block function common in word processors. The chosen data is highlighted so that the operator can easily recognize it.

The function "I/O" is also shown in the menu at the bottom of the screens in FIGS. 16A–16B. This function is used to input some or all pieces of history data from an external input/output unit 2 along Route 1017. Further, information from the history data area 45 can be output to the external input/output unit 2 by means of Route 1017. When the data is to be output from the history data area 45 to the external input/output unit 2, it is possible to specify the data to be outputted using the highlighting format similarly to the case described above for the "COPY" function.

When the operator is inputting information concerning corrections to be made to data, the operator can confirm each piece of data as it is being entered to make sure that he is entering the correct information.

Figure 11:
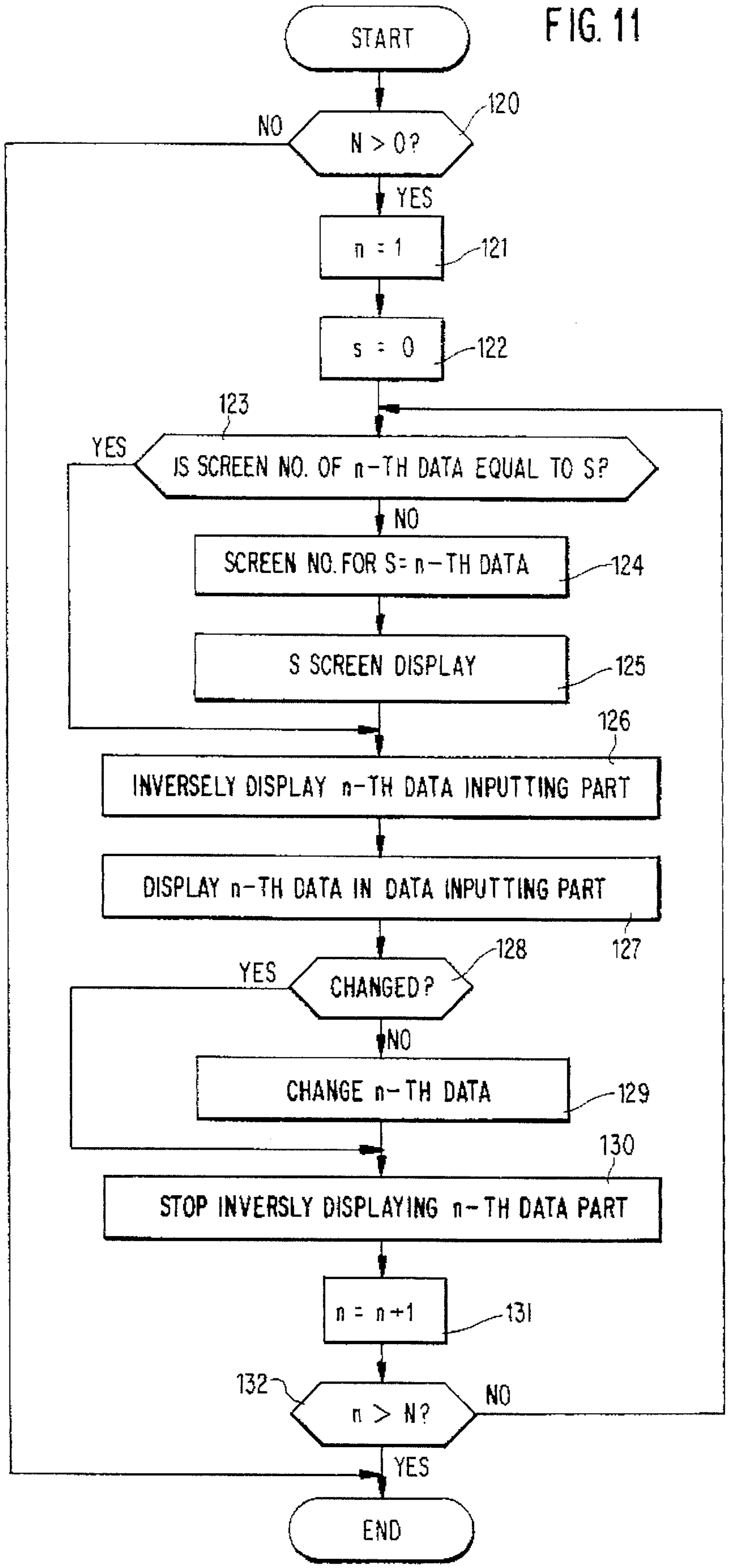
FIG. 11 shows a flow chart related to screen display of correction data of the present invention.

Although the internal data **32*b* is corrected according to the data stored in the corrected data storing area 38 similar to the above-described function, pieces of data may further be confirmed one by one by the operator before they are corrected. The correction method is described below according to the flow chart in FIG. 11. It is first checked whether the corrected data storing area 38 contains any data (step 120). In this case, it is assumed that N indicates the number of corrected data values and n indicates a counter value for the corrected data. The counter value is set to "1" at step 121. The screen number S is initialized to "0" at step 122. It is assumed that S indicates a number of a screen to be displayed on the CRT 19**.

The screen number of the n-th data is compared with the value of S (step 123), in FIG. 8, Route 1008 is used. If the n-th screen number is different from the value of S, the n-th screen number is taken out to set it to S (step 124). The screen with the screen number S is next displayed (step 125). The n-th data part is highlighted at step 126. The highlighted data indicates the data to be corrected. In this case, the highlighted data is the data before correction.

Figure 14:
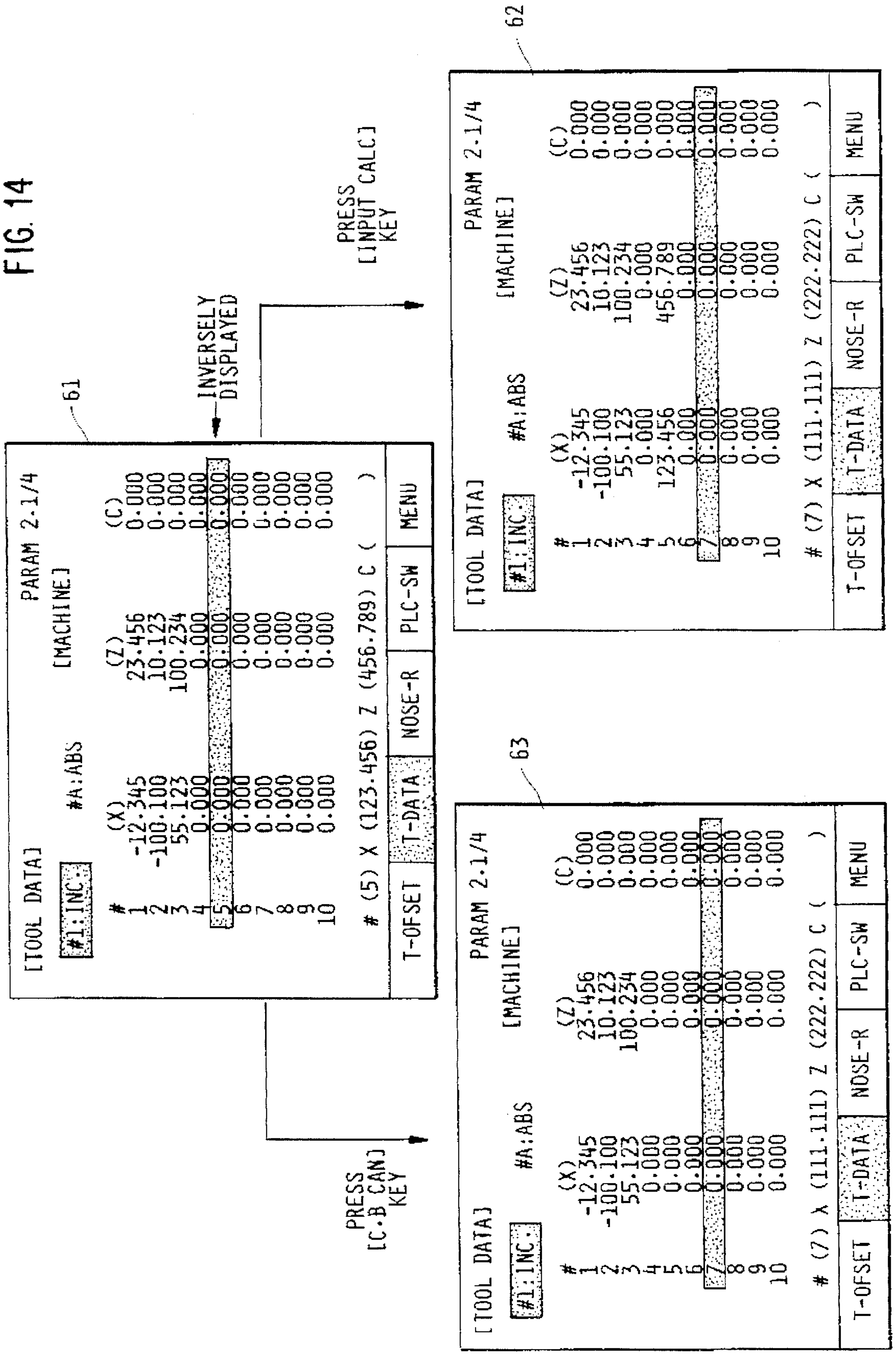
FIG. 14 shows a diagram for explaining the operation related to data correction of the present invention.

The n-th data is displayed in the data inputting section (step 127) of the screen 61 as shown in FIG. 14. That is, in FIG. 14, screen 61 shows the data before correction for the screen number displayed. Row No. 5 is highlighted to indicate that this row is the one presently under correction. The values displayed, however, are the old values. The new values are displayed at the bottom of the screen in the data inputting section. That is, as shown at the bottom of the screen 61 in FIG. 14, the X value is to be changed from 0 to 123.456 and the Z value is to be changed from 0 to 456.789. The C value is not to be changed and therefore there is a blank pair of parentheses in the data inputting section for this value. In this state, the numerical control unit is waiting for the operator to confirm whether he actually wishes to make the change listed in the data inputting section of the screen 61. In FIG. 8, Route 1009 corresponds to this state.

If the operator wishes to confirm the entry and correct the data as indicated in the data inputting section at the bottom of the screen, the operator presses the "INPUT" key on the keyboard 21 of the operation board 3. If the operator does not want to make the change indicated in the data inputting section, the operator presses the "C.B CAN" key on the operation board 3, which is a cancel key. In FIG. 8, Route 1010 is used to relate the input choice of the 39 to the confirmation unit 43.

When correction is requested, the n-th data is corrected (step 129) by the correction section 42 in FIG. 8. Routes 1011 and 1007 are used in FIG. 8. The corrected data is then displayed on the screen (Route 1009) and this situation is shown in FIG. 14 as screen 62. Specifically, screen 62 shows, at row 5, that the value X has changed from 0 to 123.456, and the value Z has changed from 0 to 456.789. Further, screen 62 shows that the next piece of corrected data is placed in the data inputting section of the screen at the bottom. This piece of data relates to the seventh row. Specifically, the value of X in the seventh row is to be changed from 0 to 111.111 and the value of Z is to be changed from 0 to 222.222. Row 7 is now highlighted and the numerical control unit is placed in a waiting state again, and the operator 39 must now decide whether he wishes to make the change to row 7 that is indicated in the data inputting section at the bottom of the screen.

The highlighting is taken off (step 130) and the processing of the next data starts (step 131).

When the key "C.B CAN" is pressed, the operator 39 has indicated that he does not wish to make the change listed in the data inputting section at the bottom of the screen. Therefore, the data in row 5 is not corrected as shown in screen 63 of FIG. 14 and, similar to screen 62 of FIG. 14, the next data to be corrected is displayed in the data inputting section at the bottom of the screen.

When no more correction data to be processed remains, the entire processing is completed. If there is more correction data, processing is repeated starting with step 123 (step 132).

Therefore, the operator 39 can correct the internal data 32 while confirming pieces of corrected data 38 one by one. When the operator corrects the internal data 32 in the NC unit 1, while reconfirming each piece of the data, it is possible to set the data editing forbidding mode before editing the data and correct the data while confirming each piece of the data in the data confirming mode after canceling the data editing forbidding mode. That is, the data correction in the internal data section 32 is not carried out until the data editing forbidding mode is removed. This prevents the harmful situation in which necessary data for a present machining operation is changed during machining. The data editing forbidding mode, data confirming mode and history storing mode may be turned on and off by operating the keyboard 21 of the operation board 3.

Editing of Machine Programs

The machining programs indicate to the numerical control unit which steps to go through in order to process the data relating to the machining operation. The invention allows the operator to edit the machining program while the program is being executed. A backup file is created for a file of data (which includes the machining program) to be corrected, and changes to the backup file may be made while the original file is being executed. In this way, there is no fear of erasing a file since there is always a backup, and corrections can be made to the backup file while the original is being executed, thus providing for efficient use of time.

Figure 17:
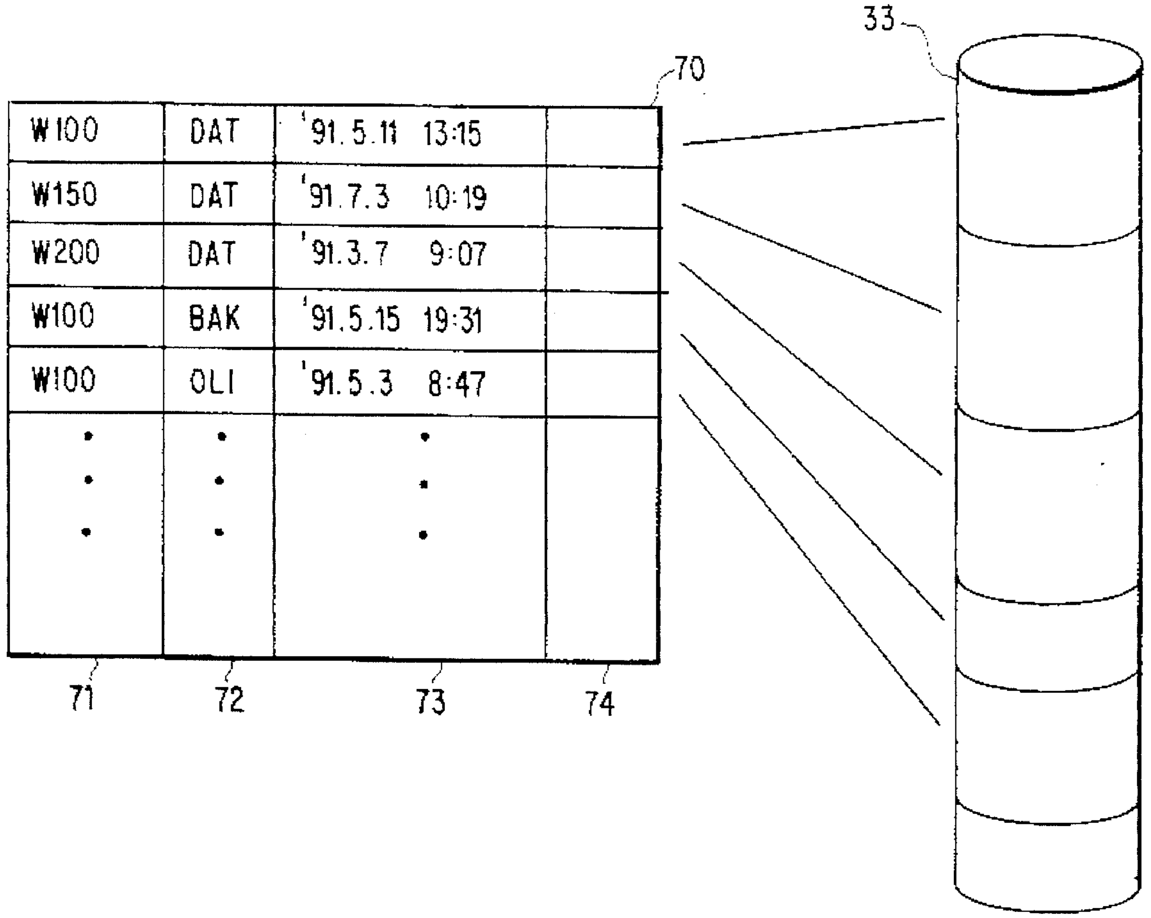
FIG. 17 shows a diagram for explaining file data management of the present invention.

FIG. 17 shows a general structure for explaining this embodiment. In FIG. 17, numeral 70 is a directory table for managing the file data 33 shown in FIG. 1. This file data is used for storing programs. Numeral 71 is the part of the directory table 70 for storing file names, 72 is for storing extension codes, 73 is for storing dates and times associated with the generating or updating of files and 74 is for storing other file managing information.

Figure 66:
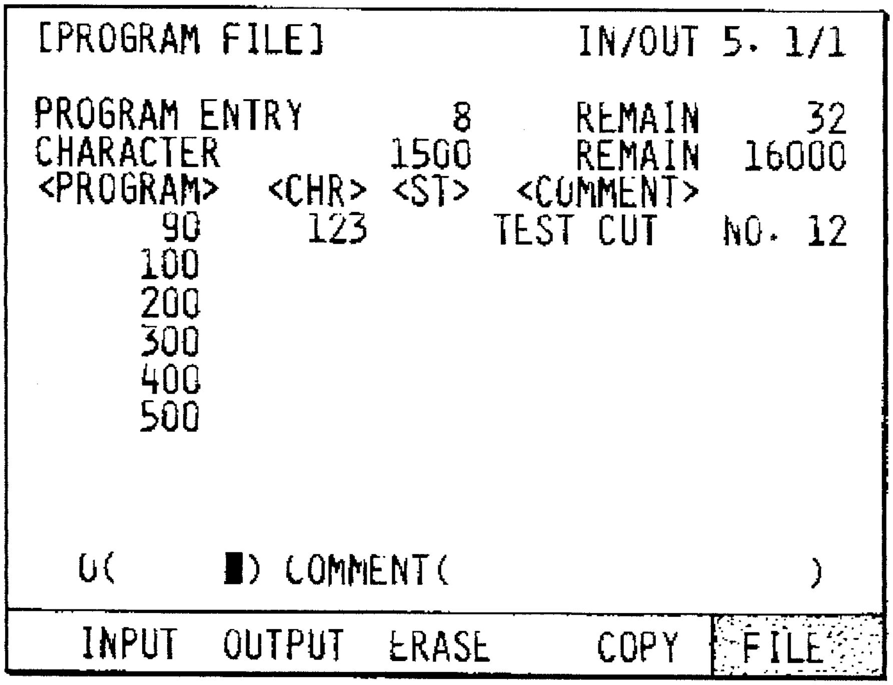
FIG. 66 shows a diagram for explaining a conventional screen display (PROGRAM FILE)
Figure 67:
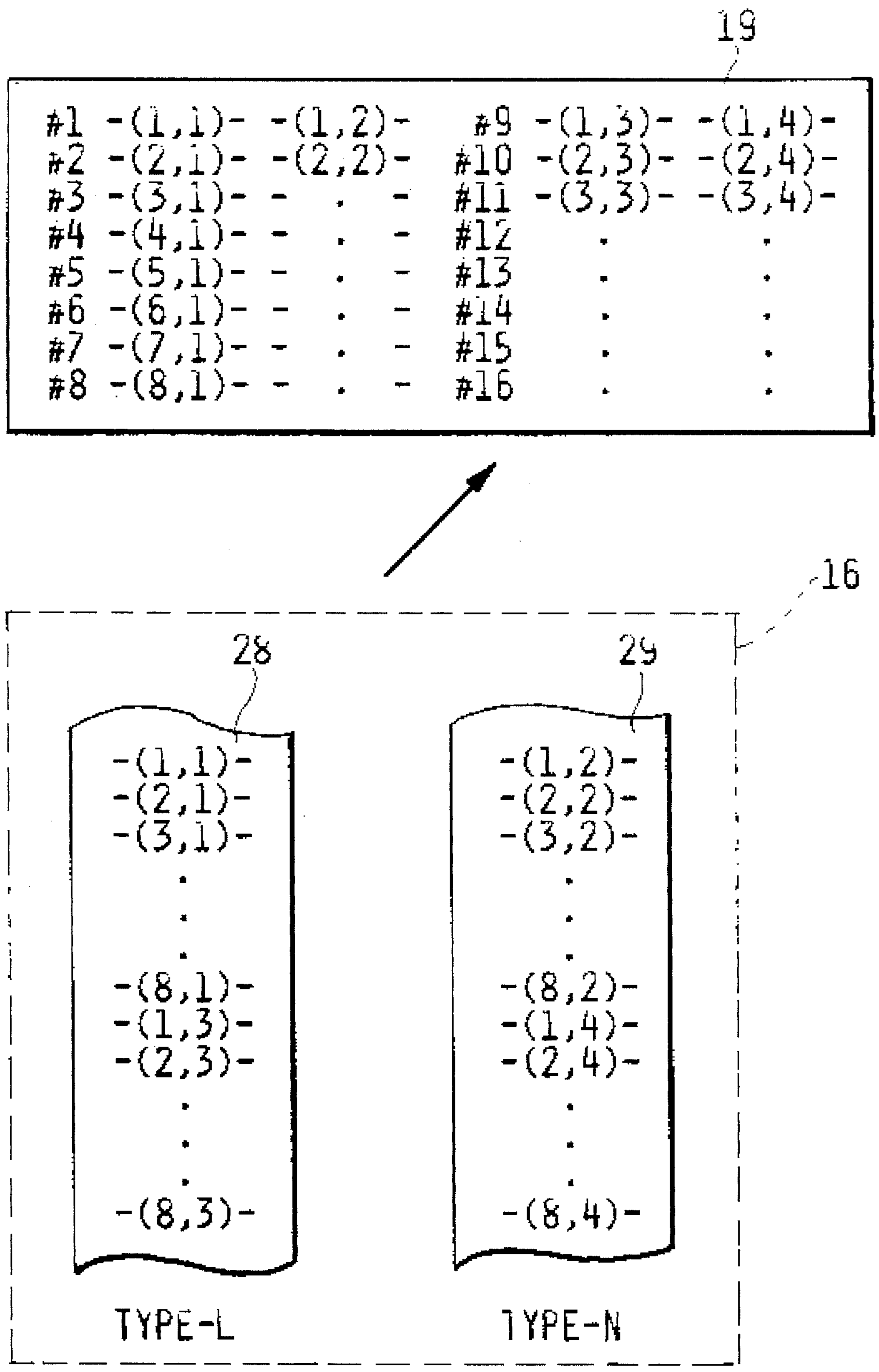
FIG. 67 shows a diagram for explaining the display of data in an NC unit on a CRT.

The extension codes 72 are used to manage a plurality of files with the same file name. That is, a single file name can have more than one extension code. The extension code DAT relates to normal files which are the same as those conventionally used for the NC unit 1. FIG. 66 shows an example of displaying file directory information.

For a general file management system, files are classified by file names and extension codes. Therefore, files with the same file name can be handled as different files when they have different extension codes. The present invention uses the above idea to manage the above files with the same file name by the application-side software using the conventional file management system.

The extension codes 72 are classified into three types:

BAK: Standby file (for editing)

OLn: Updated old file (n=1–9)

DAT: Normal file (for execution)

Figure 18:
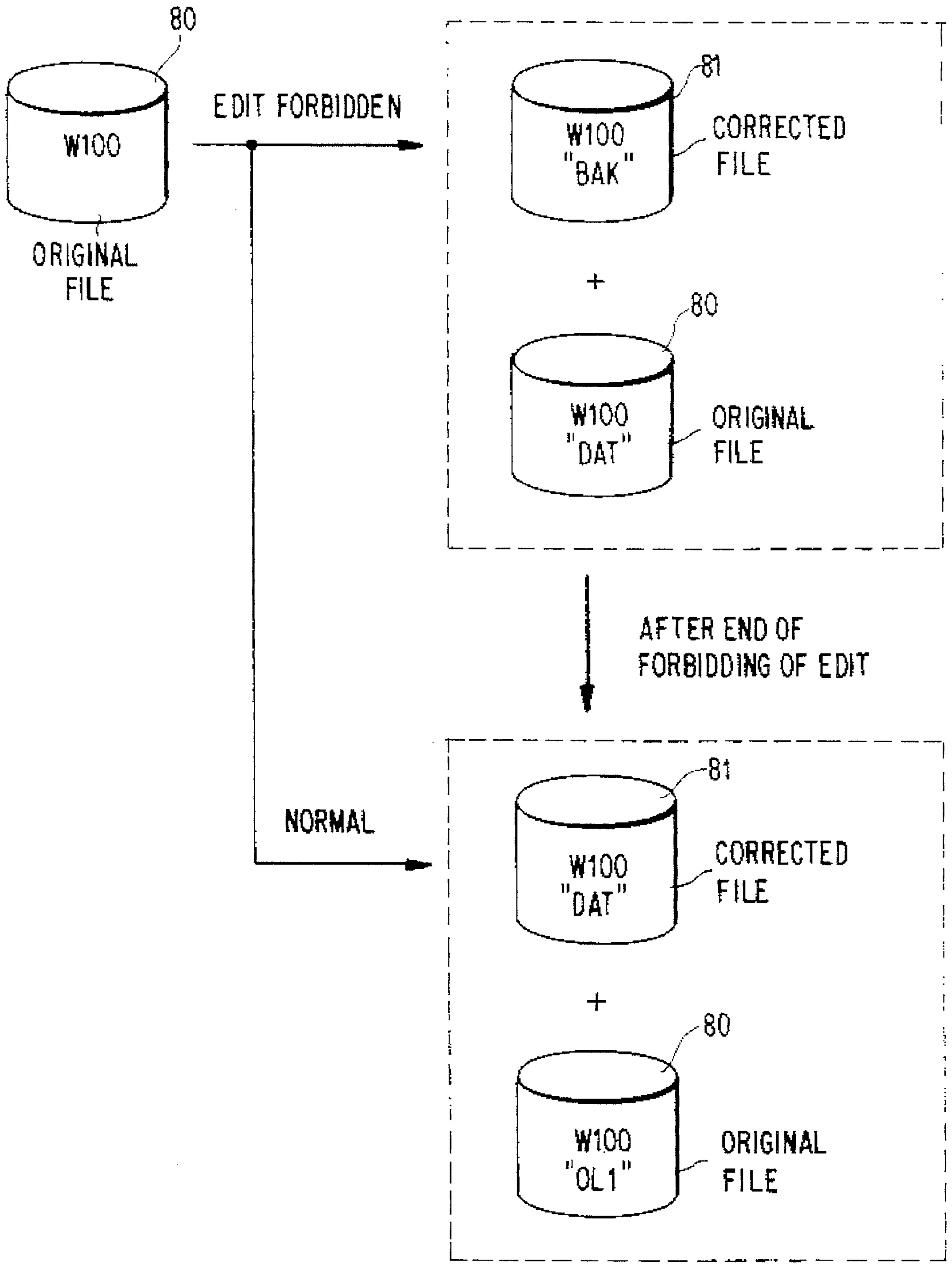
FIG. 18 shows a diagram for explaining file data management the present invention.

FIG. 18 is a diagram for explaining what happens to a file to be updated. The original file is shown by reference numeral 80. It has a file name of W100. To correct the file with the file name W100, for example, a file with the file name W100 and the extension code 72 of BAK is prepared. Because the original W100 (DAT) remains as it is, W100 (BAK) can freely be corrected while normal program execution takes place with respect to file W100 having extension code DAT. If data editing is forbidden, the situation above occurs. W100 (BAK) is shown as reference numeral 81 in the FIG. 18 for the situation where data editing is forbidden.

When the file W100 (DAT) can be edited, that is, when the data editing forbidden mode is canceled, the corrected file is stored by the name of W100 (DAT) (reference numeral 81 in the bottom dotted box of FIG. 18) and the original file is stored by the name of W100 (OL1) (reference numeral 80 in the bottom dotted box of FIG. 18). Thus, whenever a file is edited, the original file is stored as a backup. Therefore, there is no fear that original program data will be lost after it is edited.

In situations when data is edited outside of a data editing forbidding mode, the bottom dotted box in FIG. 18 is reached directly from the starting point in the upper left-hand corner of FIG. 18 and there is no need to go through the top dotted box.

In summary, the file W100 (BAK) generated under the data editing forbidding mode is corrected after the editing forbidding state is canceled and the corrected file is considered as a normal file (extension code DAT), while and the original file is considered as an old file (extension code OLn).

W100 (DAt)→W100 (OL1)

W100 (BAK)→W100 (DAT)

Figure 19:
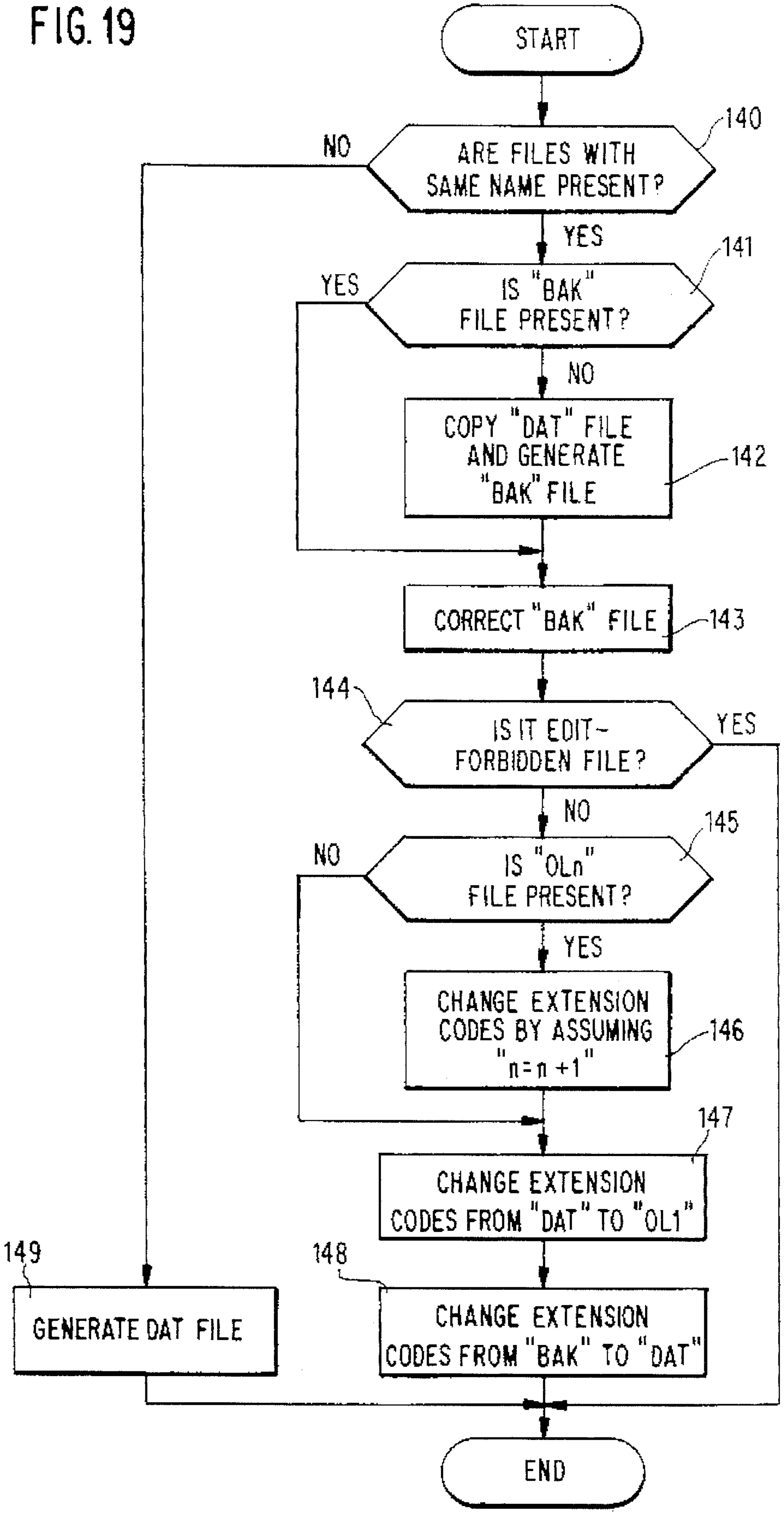

FIG. 19 is a flow chart of file operation showing the processing for correcting a file or reading file data from an external input/output unit 2.

First it is checked if a file with the same file name 71 is present (step 140). If not, the file is stored by giving the extension code 72 of DAT to it (step 149). If so, it is checked if a file with the same file name 71 and the extension codes 72 of BAK is present (step 141). Hereafter, the embodiment will be described by assuming that the file name 71 handles the same file. If the BAK file is not present, the file with the extension code 72 of DAT is copied and handled as a file with the extension code 72 of BAK (step 142).

However, step 142 is unnecessary in situations where file data is read from the external input/output unit 2 or with respect to a system in which all pieces of file data are temporarily transferred to a work area to edit the file and are corrected before being stored in the original file.

When the file with the extension codes 72 of BAK is present, it is capable of being continuously corrected by the operator. Specifically, the BAK file is not used until it becomes the file with the extension code DAT as described above with respect to FIG. 18.

The file with the extension code 72 of BAK is corrected at step 143 by the operator. Then, it is checked whether the file is under the data editing forbidding state (step 144). If so, the processing ends. In this case, the file with the extension code 72 of the BAK is left as it is. If not, it is checked if a file with the extension code 72 of OLn is present (step 145). OLn represents a file having an extension code 72 of OL1, OL2, OL3, . . . and OL9. If so, the value of n of each extension code is increased by 1 as follows:

OL3→OL4

OL2→OL3

OL1→OL2

Then, a file with the extension code 72 of DAT is changed to a file with the extension code 71 of OL1 (step 147). Moreover, a file with the extension code of BAK is changed to a file with the extension codes 72 of DAT (step 148). Thus, the corrected files (BAK) are entered as normal files (DAT).

Figure 20:
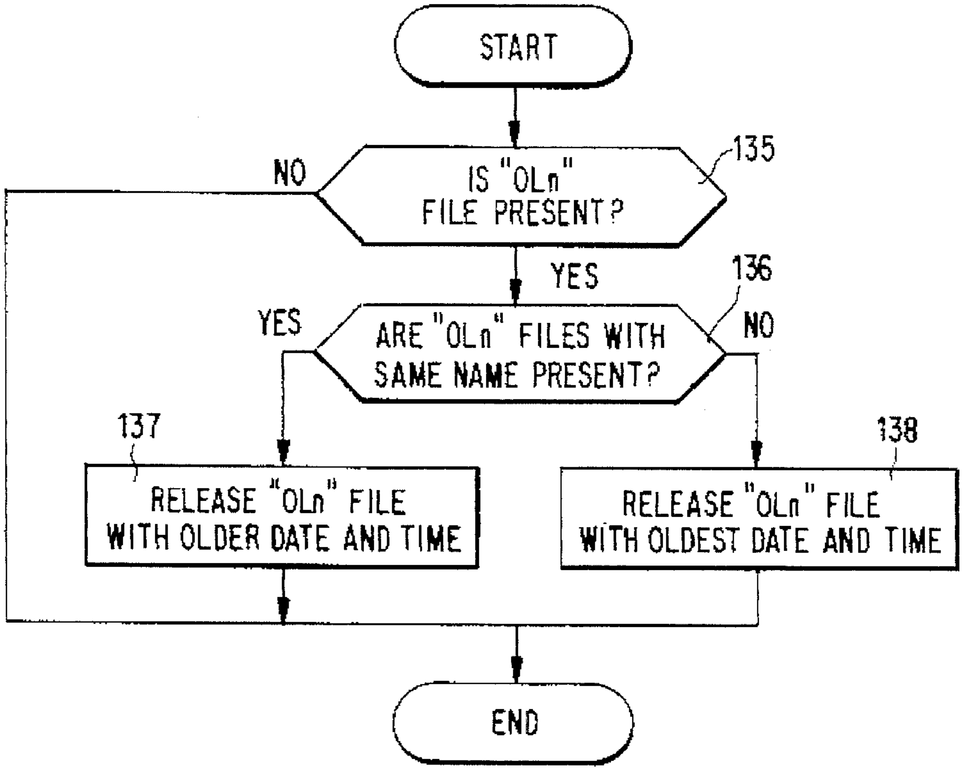
FIG. 20 shows a flow chart related to file release of the present invention.

As a result, the number of files increases on and on and soon the file storage area becomes insufficient. Therefore, older files are released as shown by the flow chart of FIG. 20.

Specifically, it is checked if an OLn file is present (step 135). That is, it is checked whether there are old backup files existing. If not, file release processing ends because there is no old backup file to be released, and there is thus no problem with storing too many old files. If there are old backup files existing, the YES branch is taken from box 135 and it is checked at box 136 whether two or more OLn files with the same file name are present. If so, the file with the oldest generation date and time among the OLn files with the same file name is released (step 137). If not, the file with the oldest generation date and time among all OLn files is released (step 138).

Thus, the file area is efficiently used by releasing unnecessary files according to necessity. That is, the present invention allows the original files to be stored as long as there is still room left in the file storage area so that the original file can be restored when necessary.

Figure 21:
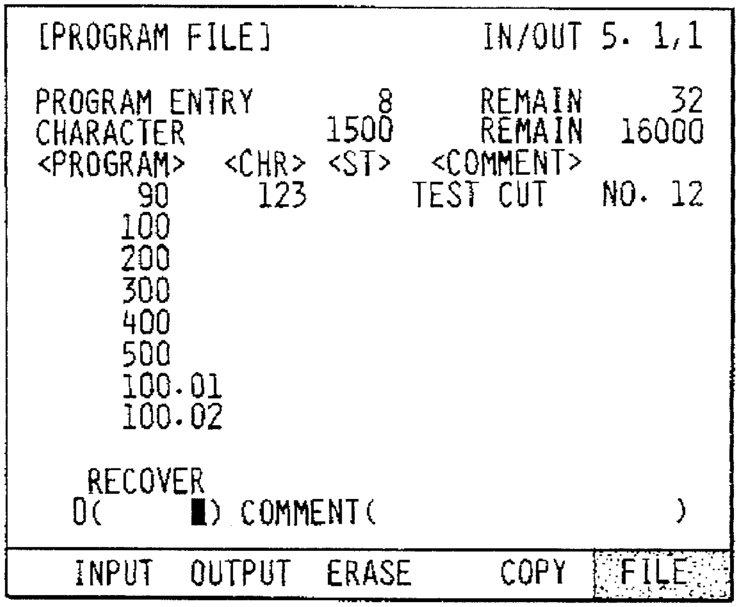
FIG. 21 shows a diagram for explaining screen display of file release in the present invention.
Figure 22:
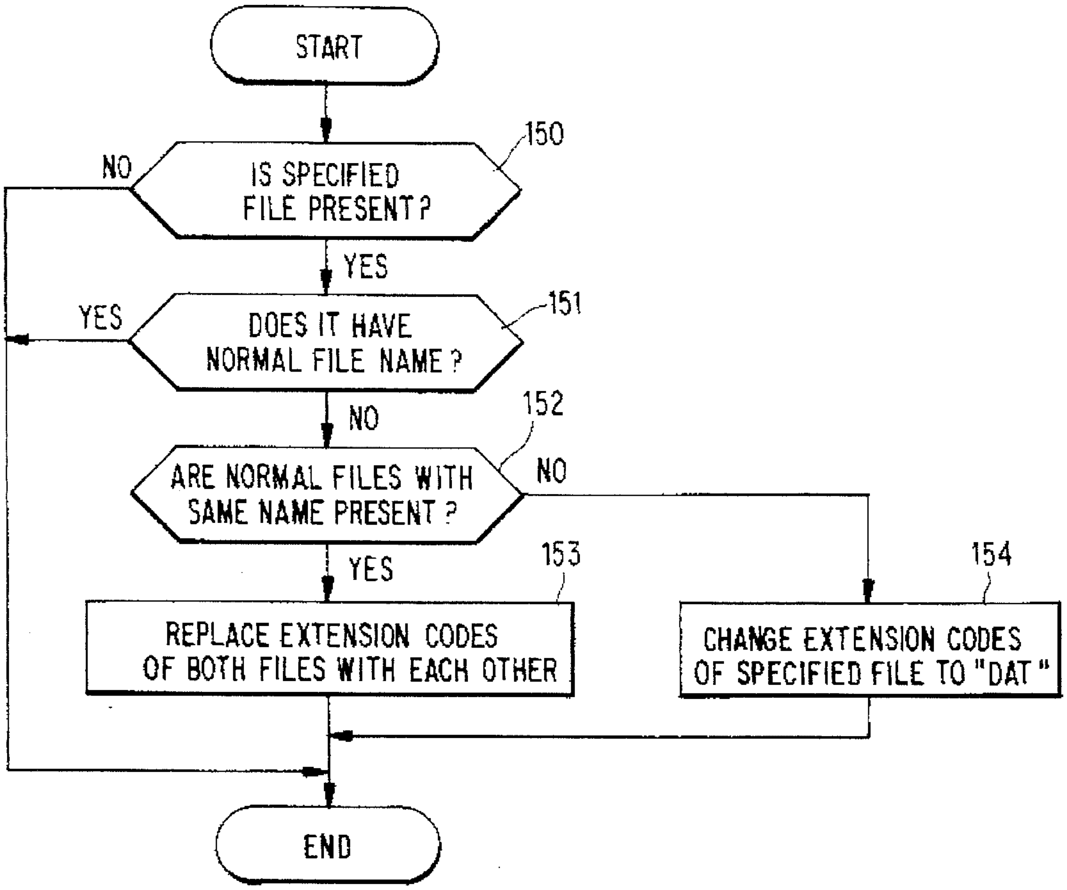
FIG. 22 shows a flow chart related to file recovery of the present invention.

FIG. 21 shows a screen for showing the file directory display in the file recovery display mode. For this display mode, all files including old files (OLn files) are displayed unlike the example shown in FIG. 66. Because the file names including extension codes 72 are displayed, it is possible to confirm all stored files to see which ones are there. In this case, when keyboarding a file name to be recovered, the file is recovered as explained in the flow chart of FIG. 22.

Specifically, it is checked if a specified file name is present at step 150. In this case, the file name includes extension codes 72 displayed in the <PROGRAM> column of the display screen of FIG. 21. If not, the processing ends. If so, it is checked whether the specified file name belongs to a normal file (file with the extension code of DAT) at step 151. If so, the processing ends because it is unnecessary to recover the file. If the file name is specified for an old file (file with the extension code of OLn), it is checked if any other file with the same file name is present (step 152). For example, when W200.OL2 is specified, it is checked if a normal file with the extension code of W200.DAT is present. If so, the extension code of the normal file and that of the specified file are interchanged (step 153). If not, the extension code 72 of the specified file is changed to DAT (step 154). For example, when W200.OL2 is specified and W200.DAT is present, the extension codes 72 are changed as shown below.

W200 (DAT)→W200 (OL2)

W200 (OL2)→W200 (DAT)

Therefore, as described above with respect to FIG. 22, it is possible to recover an erased file and return a corrected file to the state it was in before correction. Though the extension codes 72 to be used are explained using the terms BAK, DAT and OLn (n=1–9) in this embodiment, the extension codes are not so restricted. It is possible to use any name for the extension codes 72.

Setting Workpiece Lengths as Variables

Some of the lengths of a workpiece may be defined as variables when the operator is defining the program which will be used to shape the workpiece. Since some of the workpiece lengths may be set as variables, there is no need to set a completely new program for a workpiece which differs only slightly from another workpiece. Instead, if the two workpieces differ by only one length, that length can be input as a variable length and assigned one value for the program for one workpiece and another value for the program for the other workpiece. This creates a great savings in time and memory.

Figure 23A:
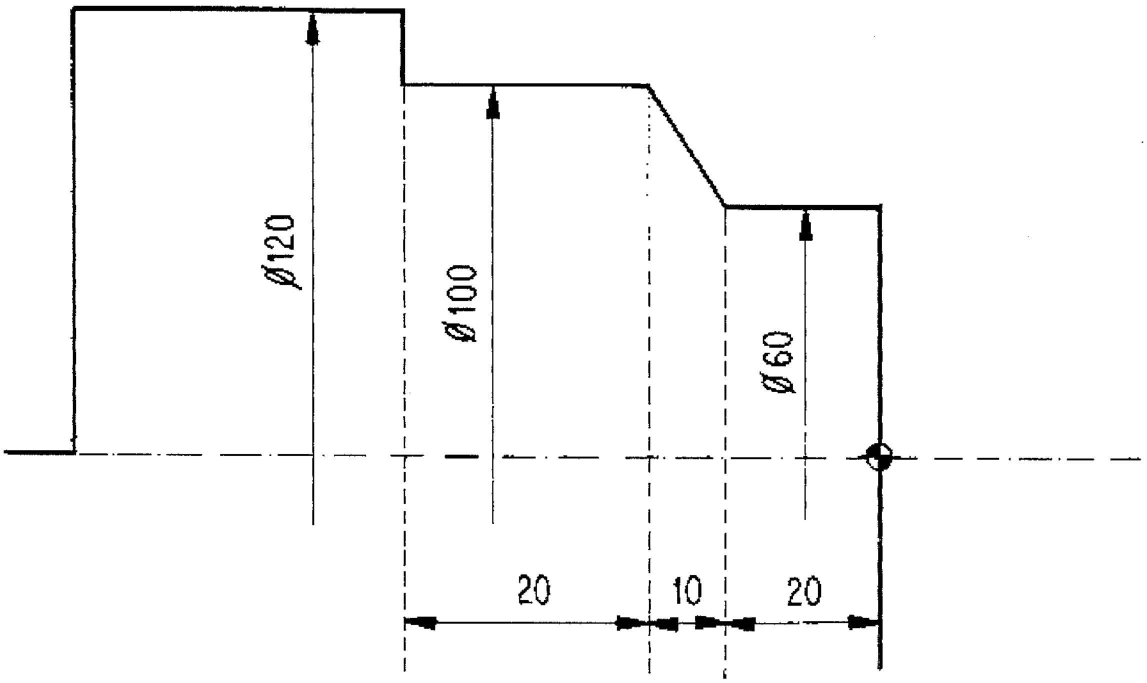
FIGS. 23A–23B show machining diagrams.
Figure 23B:
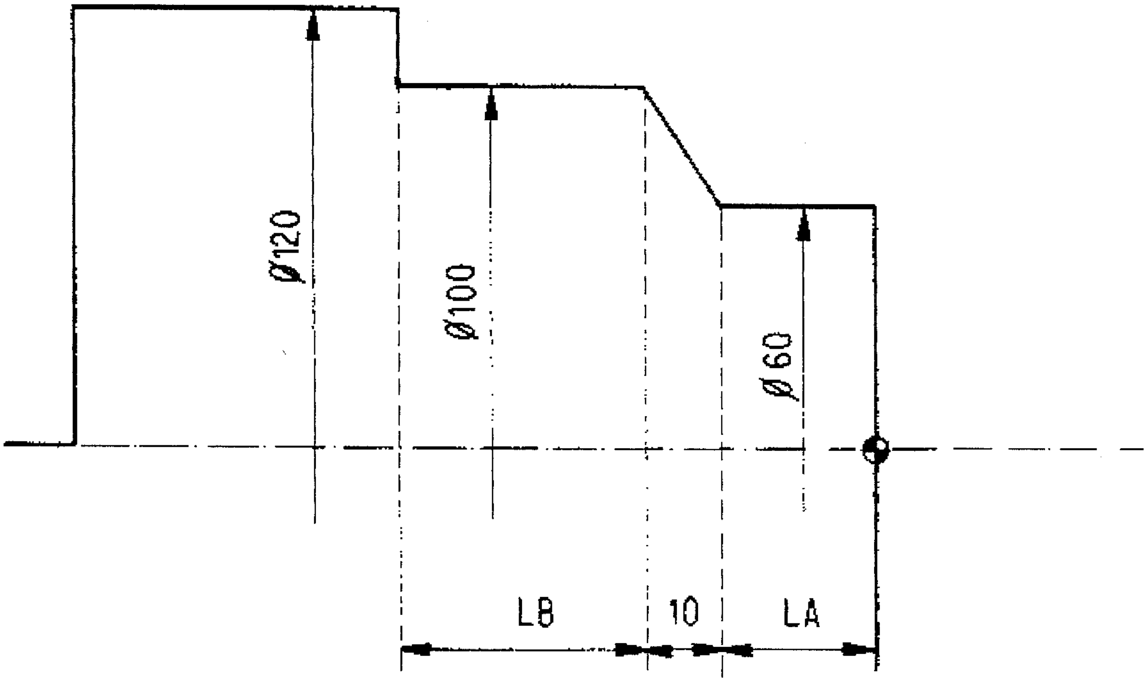

FIG. 23A shows a machining diagram of a workpiece to be machined by a lathe. The horizontal axis in FIGS. 23A–B shows the Z-axis and the vertical axis shows the X-axis. As shown in FIG. 23A the values are all predefined, for example, the lengths 20, 10 and 20 are specifically set forth in the Z-direction. However, with respect to FIG. 23B the lengths LB and LA are defined as variables so that these Z-direction lengths may be altered by the operator.

Figure 24:
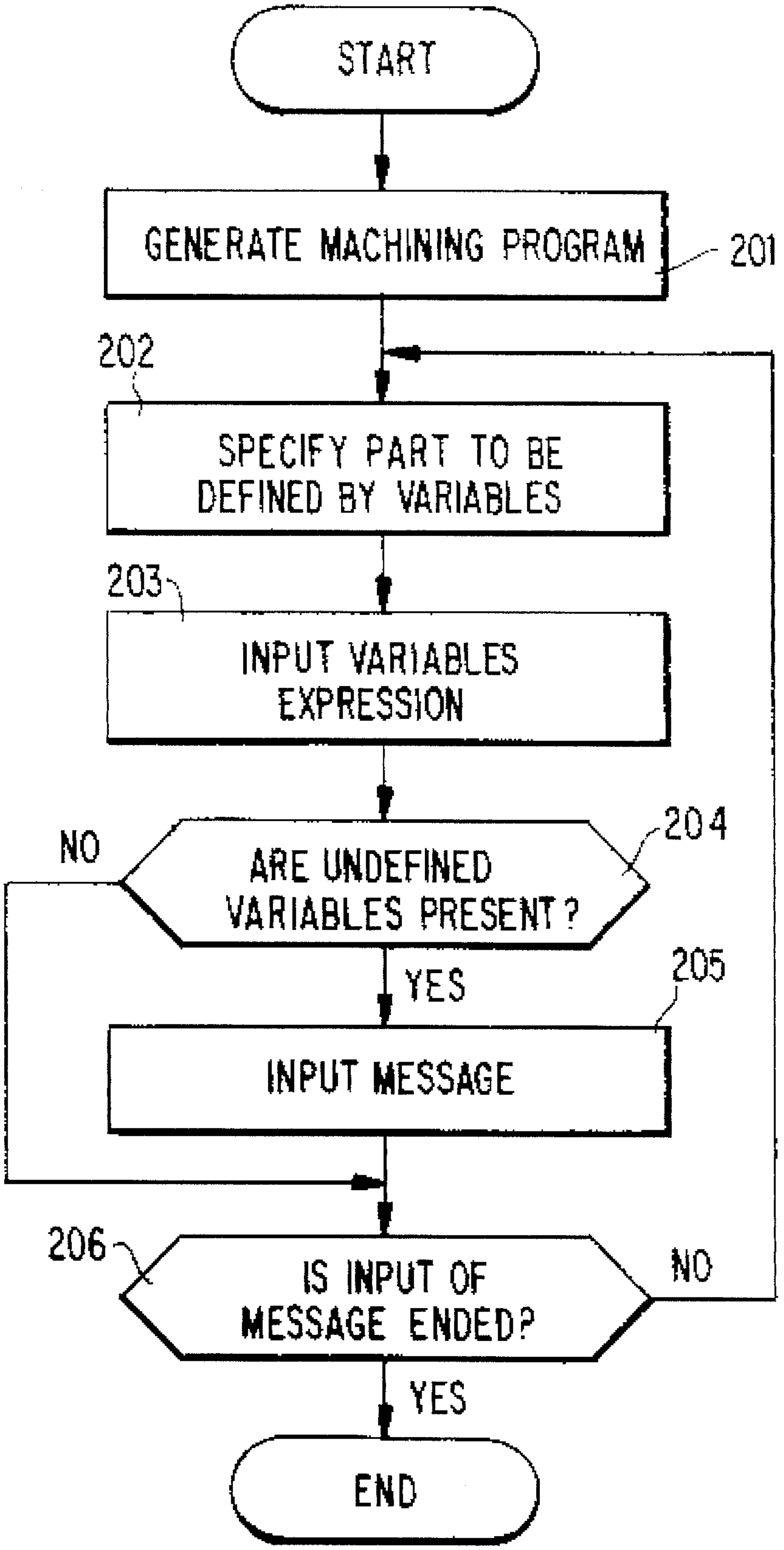
FIG. 24 shows a flow chart for converting a machining program into variables.

The flow chart of FIG. 24 explains the procedure for varying the lengths of two parts in the Z-axis direction, that is, to define the lengths of the parts LA and LB in FIG. 23B with variables.

First, a machining program is prepared (step 201) similarly to the preparation of a normal machining program of the automatic machining program type. FIG. 25 shows a screen in which the machining program prepared according to the machining diagram of FIG. 23A is displayed.

At step 202, the operator moves a cursor to the part of the screen to be defined by variables. When the cursor is brought to the desired position, the user selects the "VARIABLE DEFINE" box of the menu at the bottom of the screen in FIG. 25, to select the function "VARIABLE DEFINE", so as to define the variable. An item in the menu is selected by pressing the menu key corresponding to the menu display.

A variable expression is then inputted by the operator as step 203. The variable expression is a mathematical expression consisting of variables, actual numerical values, and operators (+, –, *, /, etc.). For example, in FIG. 25, LA is inputted at the position of the cursor 46. This would change the ending point Z designation from 20 (as shown in FIG. 23A) to LA (as shown in FIG. 23B). Thus, this value which was previously 20 is now defined as a variable.

Step 204 checks as to whether any undefined variable is found in the just-inputted variable expression. If not, step 206 is executed. If a variable is undefined, an input message is sent to the operator at step 205, to indicate to the operator that at least one of the variables used in the operator's expression is undefined. Once all variables are defined, the processing ends at step 206, as long as there are no more lengths to be defined as variables by the operator. If there are more lengths to be defined as variables, control loops back to step 202 where the operator can move the cursor 46 to a new position. In this way, the operator is allowed to change various values (i.e., corresponding to workpiece lengths) of the machining program to variables, which may be assigned different values for different workpieces.

FIG. 26 shows the screen display after all variables are defined, in which the parts defined by variables are highlighted (d1 through d4). The original value serves as a default value of the part defined by each variable. Therefore, as shown in FIG. 26, the highlighted values are the same as those shown in FIG. 25 (which shows the screen before the variables have been defined).

When the lengths in the Z-axis direction are defined by LA and LB as shown in FIG. 23B, it is necessary to set d1 through d4 as follows:

d1: LA d2: LA d3: LA+10 d4: LA+LB+10

Thus, to enter a machining program which is partially defined by variables, the function "ENTER" is selected in the menu in FIG. 25. Then, the part of the machining program to be entered is specified by the operator by moving the cursor 46. The range of the machining program to be entered is specified by moving the cursor 46 to the beginning of the part of the machining program to be entered, pressing the "INPUT" key, moving the cursor to the end of the part, and pressing the "INPUT" key again. In FIG. 27, the part 64 shown highlighted is the part to be changed, in accordance with the above description of FIGS. 25 and 26. A machining program with variables is entered together with a name and the entered machining program is called by that name.

Figure 28:
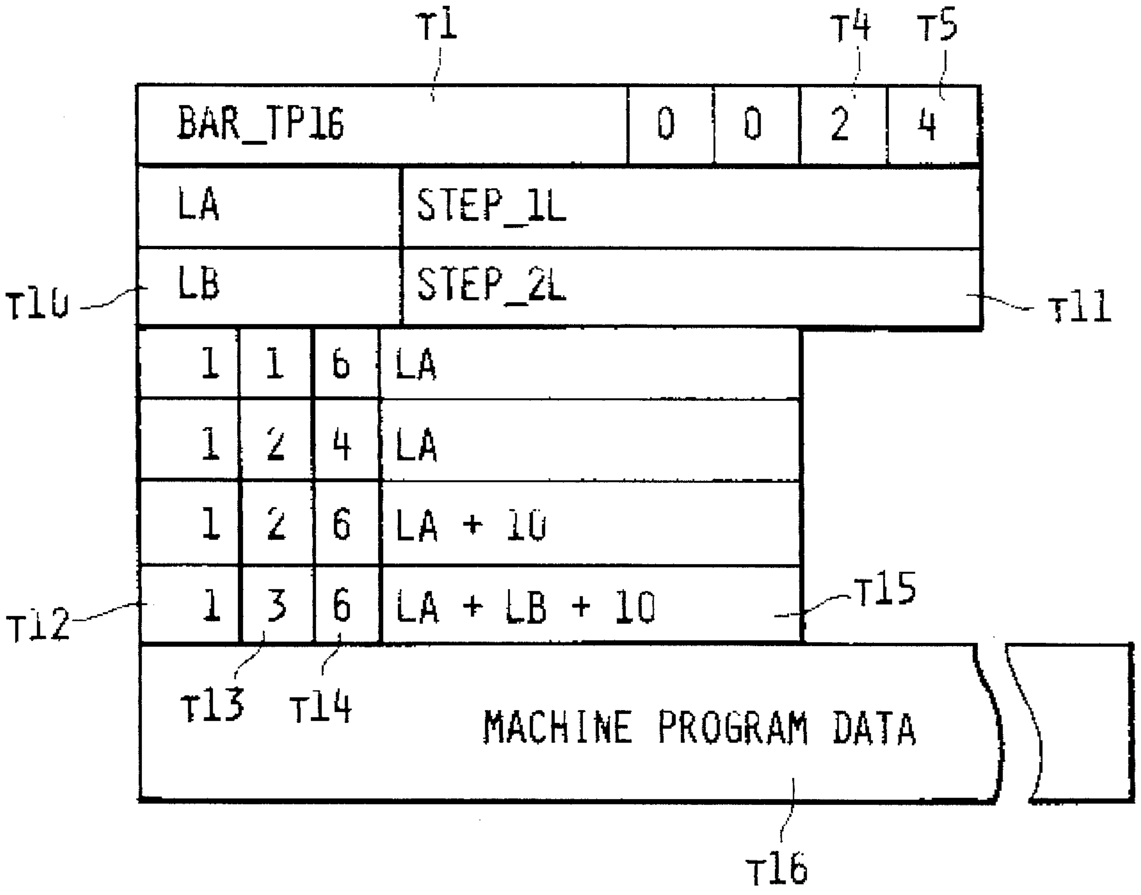
FIG. 28 shows the structure of entered data.

FIG. 28 shows the data structure of a machine program entered according to the above procedure. In FIG. 28, t1 is a name added by the operator for entry, indicating that "BAR_TP16" is defined. The block t4 is the number of variables used, indicating in this case that two variables are used, LA and LB. t5 is the number of parts defined by variables, indicating in this case that there are four parts defined by variables, d1 through d4. Alphanumeric t10 specifies the names of the variables, indicating here that there are two variables, and that the names LA and LB are used; t11 indicates the message data of each variable, indicating that the following messages correspond to the following variables.

LA: STEP_1L

LB: STEP_2L t12, t13 and t14 in FIG. 28 indicate the specific parts defined by the variables. Specifically, t12 indicates a process number, which is a part of the machining program, t13 indicates a sequence number, a plurality of sequence numbers can be included for each process number, and t14 indicates a data position within a particular sequence number. There are a plurality of data positions within a sequence number as shown, for example, in FIG. 27. The data position numbers are counted from the beginning of the sequence data for one row. These data values are displayed on the screen when they are prepared by a machining program. In FIG. 27, "P No." indicates a process number and "SEQ" indicates a sequence number. For the example in FIG. 27, the process number in which the variables are being defined is process number 1, and the sequence number within process number 1 for which variables are being defined is sequence numbers 1 through 3. The data positions within each sequence number represent the following with respect to the workpiece to be cut.

1: Shape

2: Front corner

3: Starting point X

4: Starting point Z

5: Ending point X

6: Ending point Z

For the example shown in FIG. 28, there are four parts defined by variables, which indicate the positions of d1 through d4. Each of the positions are shown as follows:

| | Process Number | Sequence Number | Data Position |
|---|---|---|---|
| d1 | 1 | 1 | 6 |
| d2 | 1 | 2 | 4 |
| d3 | 1 | 2 | 6 |
| d4 | 1 | 3 | 6 |

t15 shown in FIG. 28 is the variable expression defined by each part. t16 represents the highlighted portion 64, for example, of the screen shown in FIG. 27 which includes the original machining program before it is replaced with variables. The original machining program is directly stored so that it can be later retrieved if necessary.

To confirm a machining program defined by variables, the key "PRINT" in the menu in FIG. 25 is selected. Then, the entered machining program with variables is printed out as shown in FIG. 29. The part of the machining program defined by variables is shown by numerals inside of parentheses, as shown at the top of FIG. 29. The list of variables used and the variable expressions of the parts defined by variables are also printed out in order corresponding to the numbers in parentheses.

Figure 68:
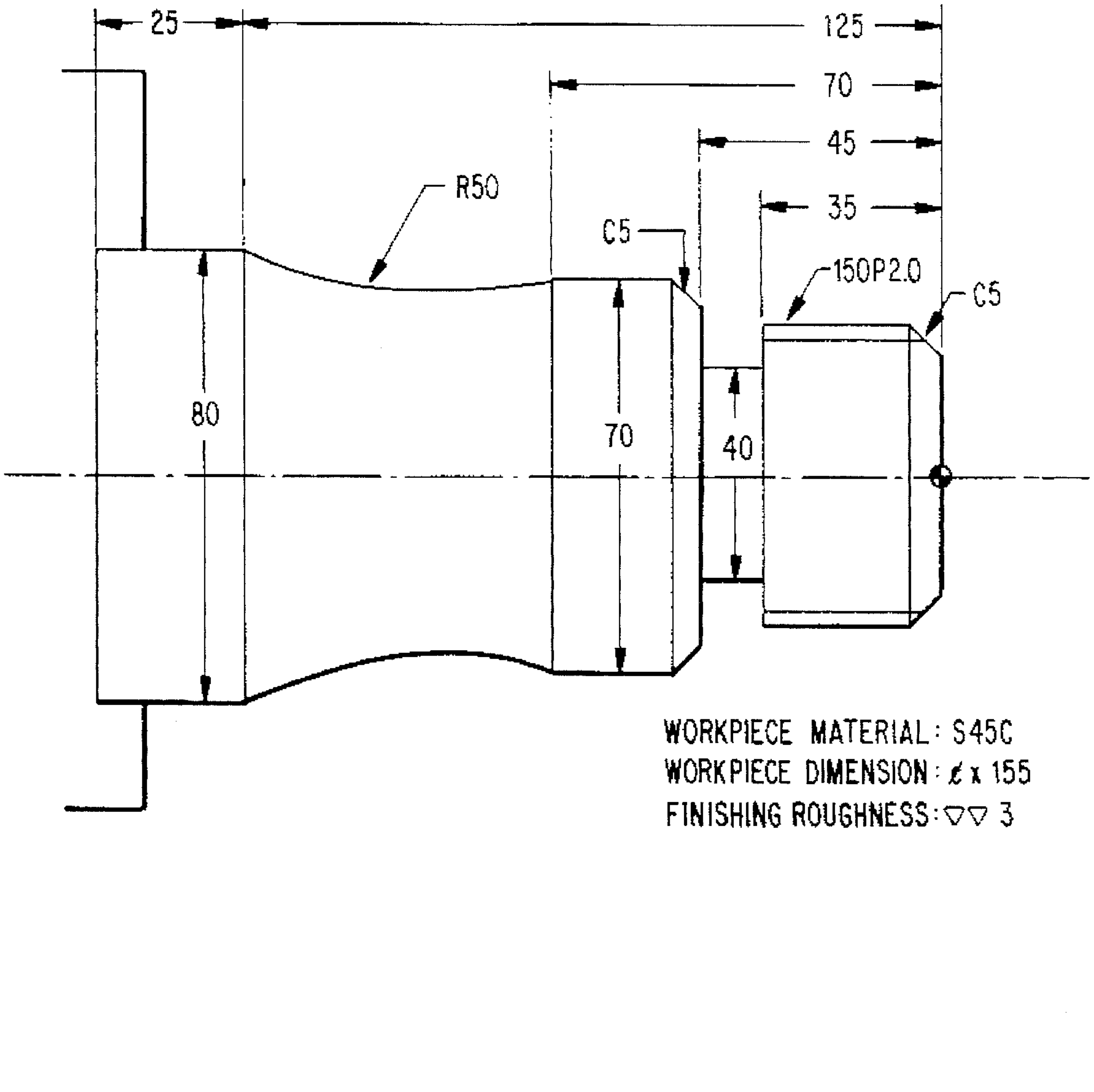
FIG. 68 shows a machining diagram.

In FIGS. 23A and 23B, an example is shown in which only the configuration defining part (sequence data) of a machining program is defined as variables. Specifically, in FIGS. 23A–B, only one process number is involved in the variable defining operation. However, in order to convert the variables L1 and L2 shown in FIG. 30 into variables in the machining diagram shown in FIG. 68, these variables must be defined with respect to a plurality of process numbers as shown in FIG. 31. As is clear from FIG. 31, variables are defined for a plurality of process numbers, six such variables being defined in FIG. 31(e.g., (1+10). Three of the variables are included in process number 2, two variables are included in process number 3 and 1 variable is defined in process number 4.

Figure 32:
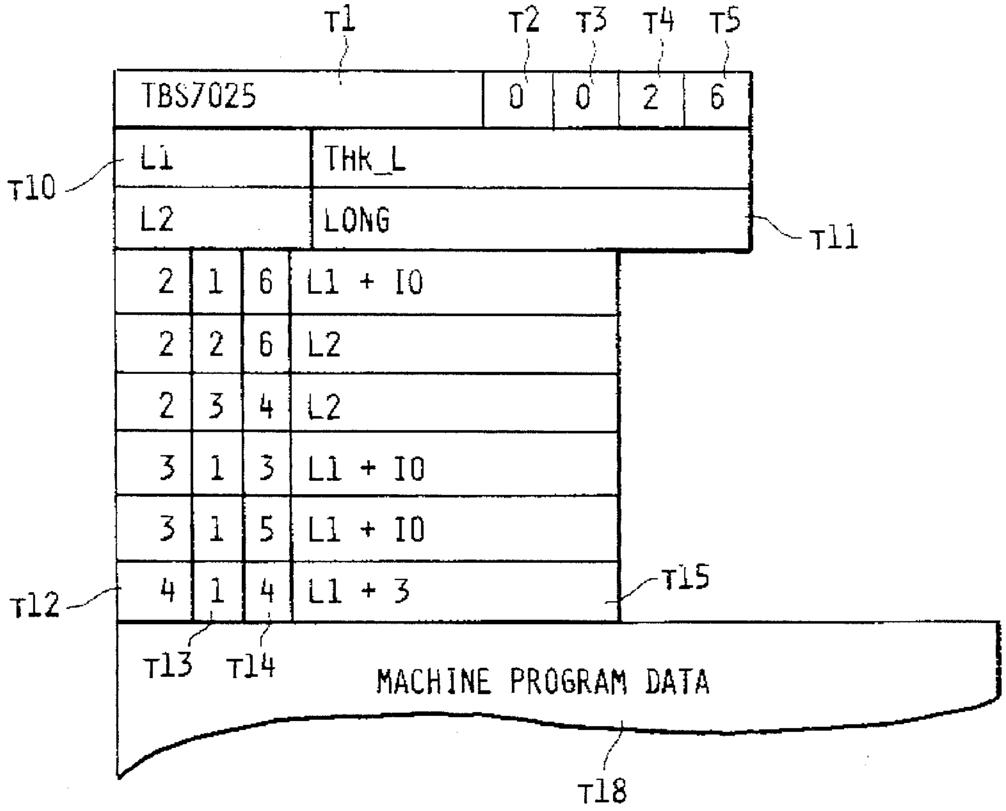
FIG. 32 shows the structure of entered data.

FIG. 32 shows the data structure of the example shown in FIG. 31. The data structure has the same format as explained above with respect to FIG. 28.

Figure 30:
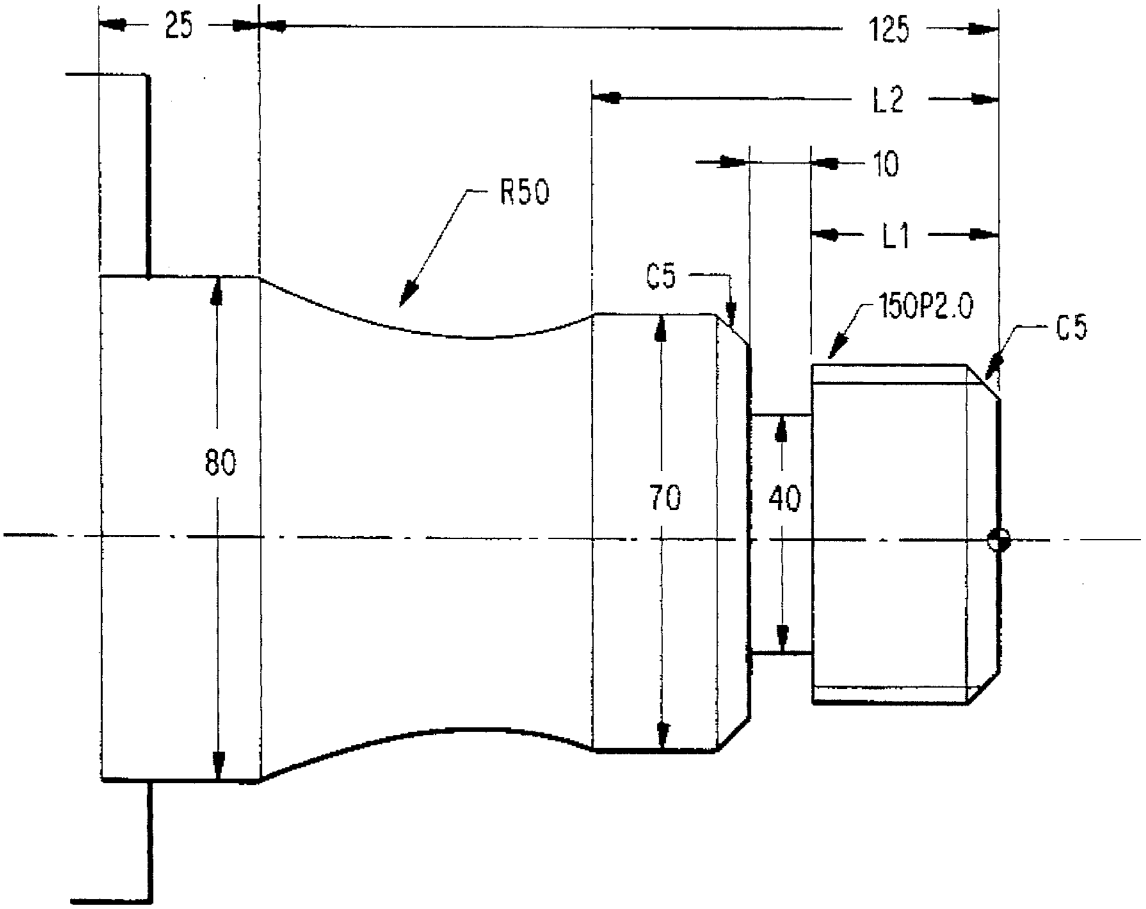
FIG. 30 shows a machining diagram.

As described above, it is possible to either enter part of a machining program, especially, only the sequence data as shown in FIG. 23B or enter the entire machining program by defining it by variables as shown in FIG. 30.

In the above discussion with respect to FIGS. 23 through 32, a situation was described in which certain parts of a machining program can be entered as variables so that the operator can manually adjust each variable to his liking, in accordance with the desired workpiece to be shaped so that an individual program need not be reentered for each new workpiece to be shaped in situations where a plurality of desired workpieces differ only in a small number of parameters. Once the operator defines variables, the machine will later prompt the operator to enter the actual values to be assigned to the variables for the particular machining operation taking place at that time.

Now, a modification will be described in which a user does not have to physically assign values to each variable. Instead, a user can define a group variable for a particular part of the program, instead of the regular variables discussed above with respect to FIGS. 23–32.

Each group variable has a plurality of values assigned to it, such values being the common values which the operator will most likely want to assign to the variable. The operator is thus able to select from a group of possible values to be assigned to the group variable, and therefore the user does not have to come up with the value of the variable himself. Many basic machining patterns are pre-registered, i.e., the values for a group variable which will lead to commonly machined workpieces are defined beforehand. The operator can look at the screen and see the pre-registered patterns and select one. This will be described specifically below.

Figure 33:
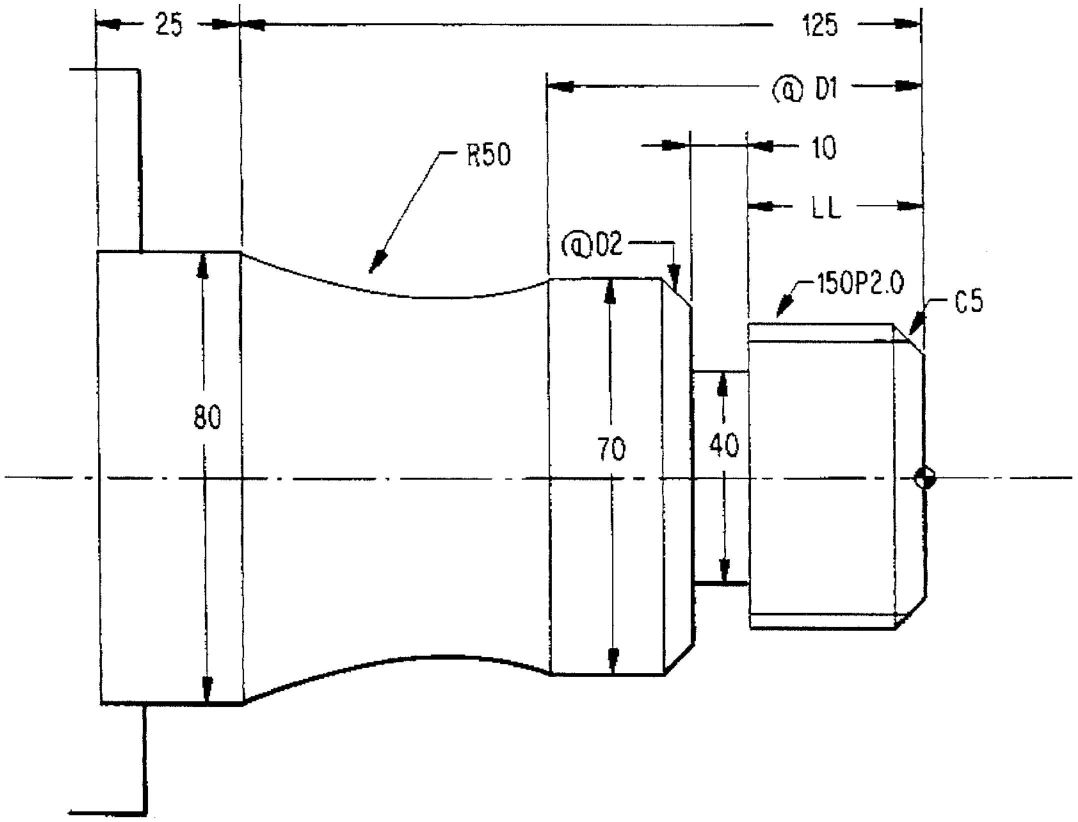
FIG. 33 shows a machining diagram.

As shown in FIG. 33, two of the variables are named @D1 and @D2. These are group variables and a predetermined group of values is assigned to these two group variables in order to generate commonly used machining programs. The variable LL is a regular variable, such as described above with respect to FIGS. 23–32.

Figures 35, 36:
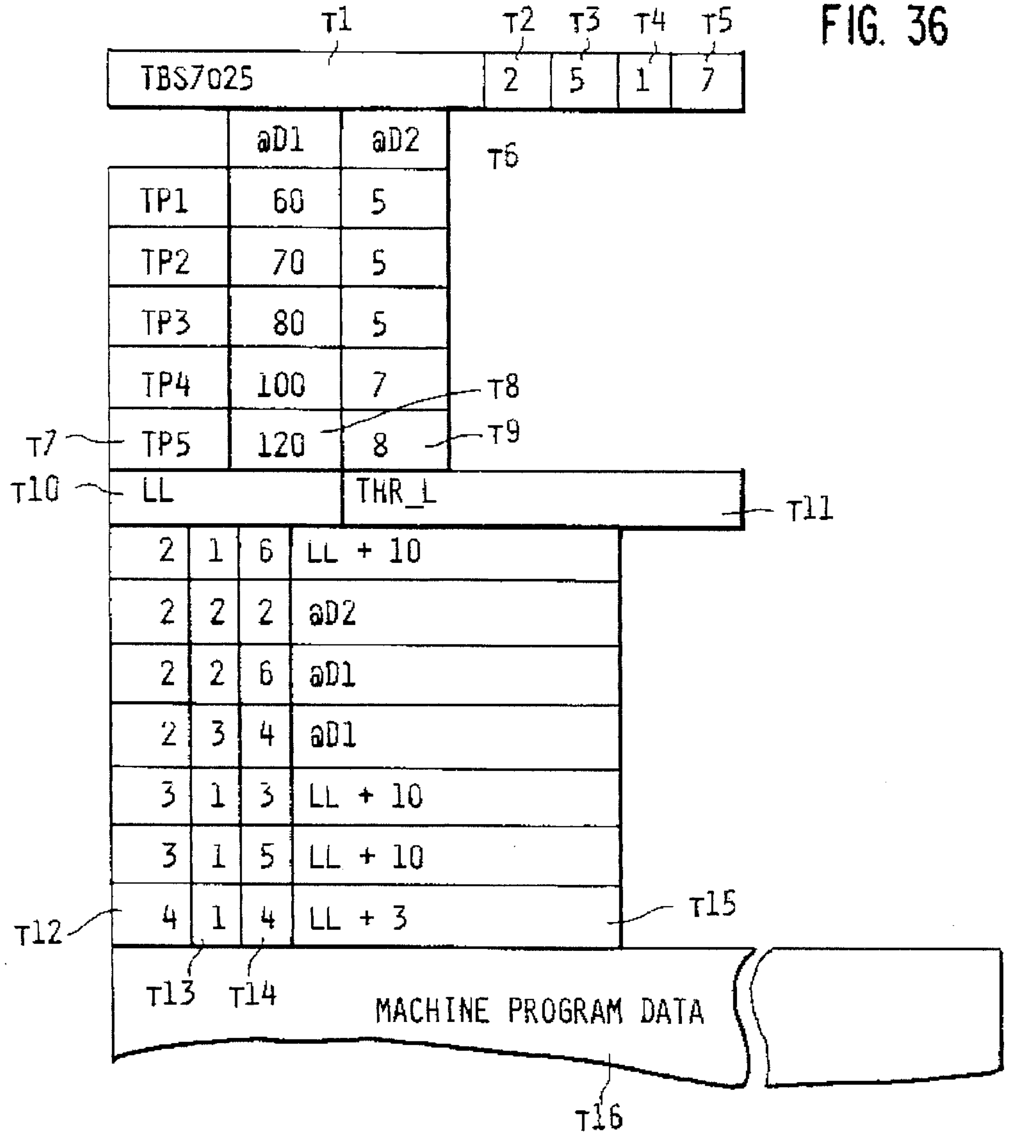
FIG. 35 shows a group-variable defining screen.
FIG. 36 shows the structure of entered data.

FIG. 34 shows a machining program made by defining the machining program in FIG. 33 by variables. Variables having an "@" at the beginning indicate group variables. FIG. 35 shows a screen for defining the group variables used. First, the non-group variables are defined as discussed above with respect to FIGS. 23–32. Then, the operator selects "GROUP" in the menu in FIG. 25. This indicates to the numerical control unit that the operator is now going to define group variables. In FIG. 35, t17 indicates a group variable name, i.e., @D1. t18 indicates a group name.

For the example shown in FIG. 35, five groups are defined, with respect to two group variables. The name and value of each group are shown below.

TP1: @D1=60, @D2=5

TP2: @D1=70, @D2=5

TP3:@D1=80, @D2=5

TP4: @D1 =100, @D2 =7

TP5:@D1=120, @D2=8

For example, when the operator selects the group TP3, the operator is actually specifying that the variable @D1 is to be 80 and the variable @D2 is to be 5. When the operator selects group TP3, the operator is selecting a common predetermined machining operation. In this way, the user does not have to know that one variable being 80 and the other variable being 5 will give a common machining operation. All the operator has to do is select the group TP3 and the numerical control unit will automatically assign the values 80 and 5 to the group variables @D1 and @D2, respectively.

FIG. 36 shows the data structure of FIG. 34, in which t2 is the number of group variables used and t3 is the number of groups involved. For the example in FIG. 34, the number of group variables t2 is 2 (@D1 and @D2) and the number of groups t3 is 5 (TP1 through TP4). t6 is a group variable name, t7 is a group name, t8 is the value of the group variable @D1 in each group, and t9 is the value of the group variable @D2 in each group. The other indicators in FIG. 36 are the same as those described with respect to FIG. 32.

Figure 37:
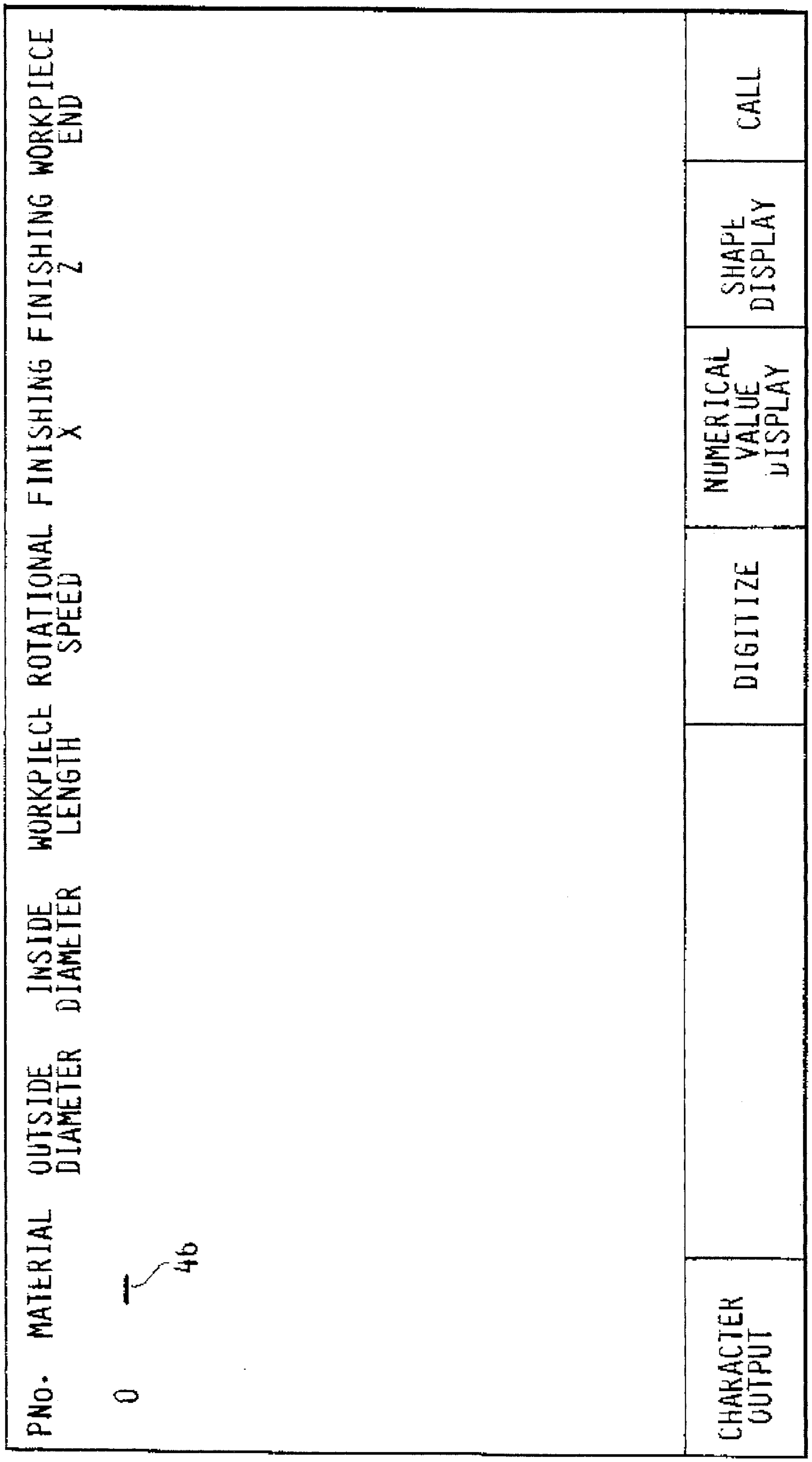
FIG. 37 shows a machining program defining screen.

The following is a description of a method for calling a machining program defined by variables by using the example for defining the machining in FIG. 33. FIG. 37 shows a screen display for defining a machining program. A normal machining program can be defined by inputting data through the keyboard 21 and the machining program shown in FIG. 43 is obtained by programming the machining diagram shown in FIG. 68.

Figure 38:
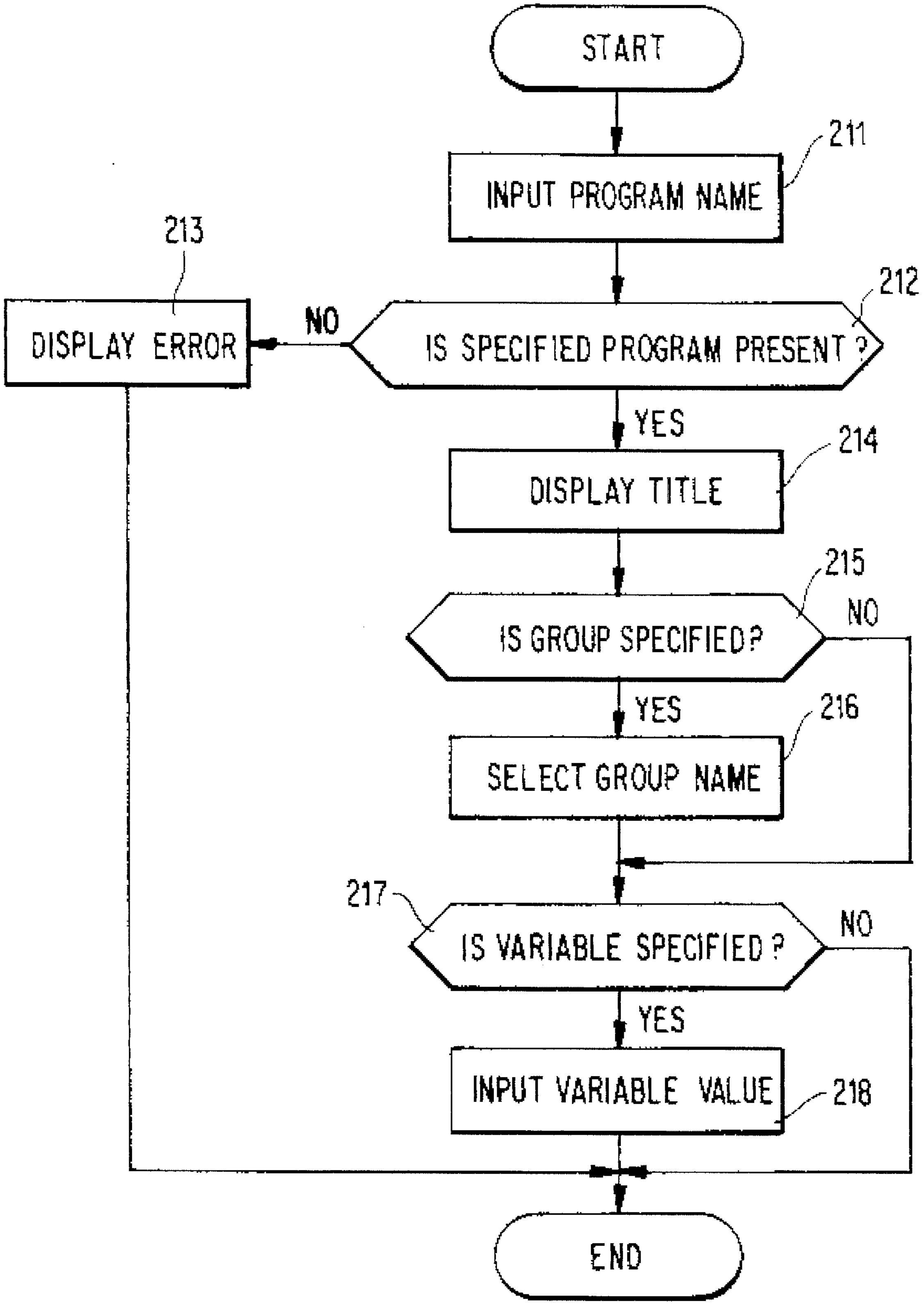
FIG. 38 shows a flow chart for defining a machining program.
Figure 39:
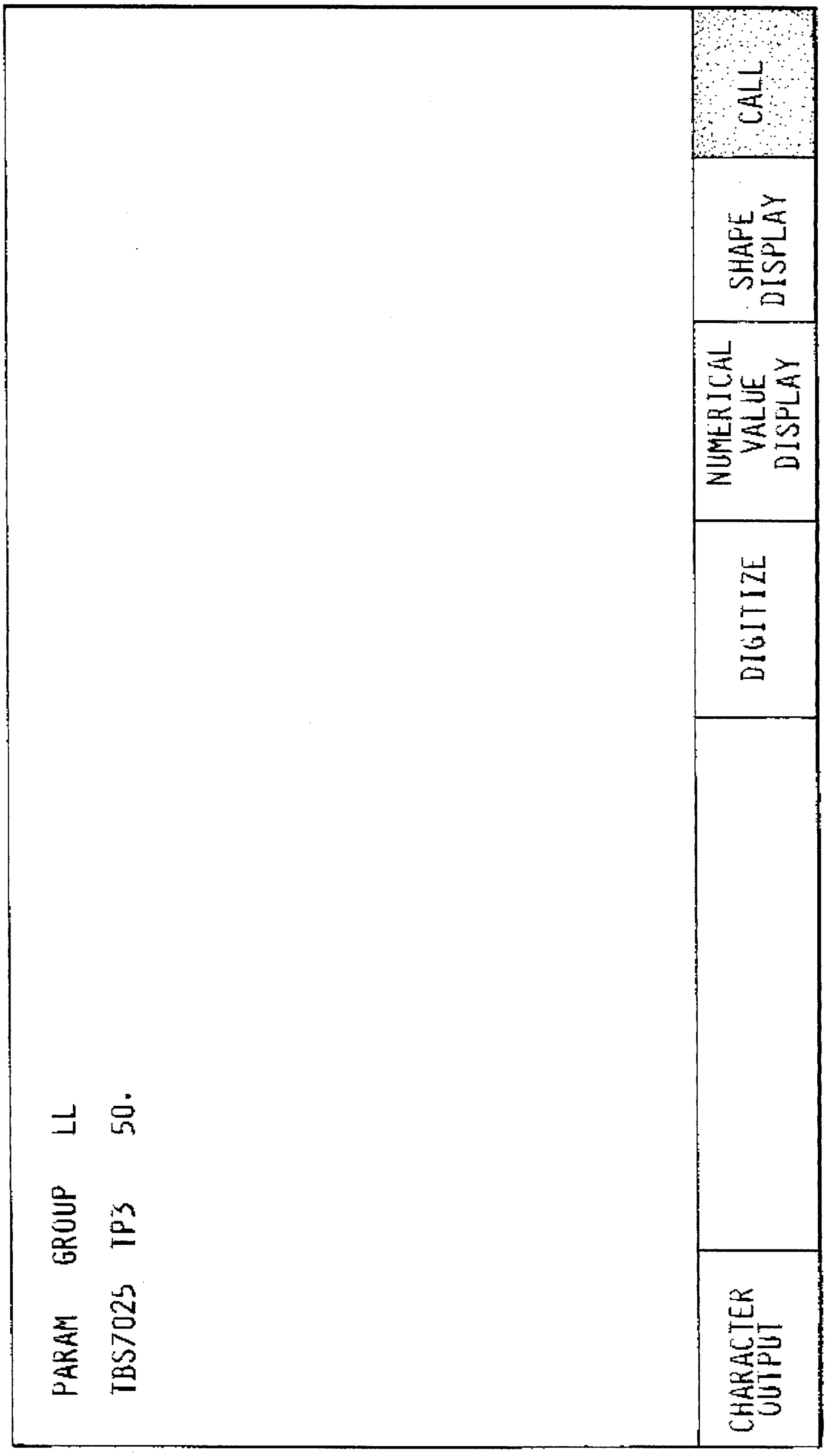
FIG. 39 shows an example of displaying a title.

To call a machining program defined by variables during preparation of a machining program, the key "CALL" is selected in the menu at the bottom of the screen in FIG. 37. FIG. 38 is a flow chart showing the processing for defining a variable-type machining program. First, a program name is inputted at step 211. Then, it is checked whether the specified program is present in step 212. If it is not, an error is displayed (step 213) and the processing ends. If the specified program is present, the title of the specified program is displayed at step 214. FIG. 39 shows an example of displaying a title "TBS7025". The display "PARAM" represents a variable-type machining program and the program name (title) is displayed under "PARAM". For the example in FIG. 34, because a group is defined, "GROUP" for defining the group names is displayed and non-group variable "LL" is also displayed.

Then, it is checked at step 215 whether the operator has specified a particular group name (one of TP1 through TP5 shown in FIG. 35). The operator would select a particular group name based on which of a group of common machining operations the user wishes to have performed. If a group name is specified, the group is selected at step 216. FIG. 39 shows that TP3 is selected by the operator. Then, at step 217, it is checked whether the operator has inputted a value for the non-group variable LL. If the operator has inputted a value, the value is inputted at step 218. When the value is inputted, the variable name (LL) is displayed and a message corresponding to each variable is also displayed on the screen. For example, when LL is displayed, the message defined by T11 in FIG. 36 is displayed as "THR_L" (not shown in FIG. 39). Therefore, the operator is able to confirm that the particular variable he has entered is the correct one.

Figure 40:
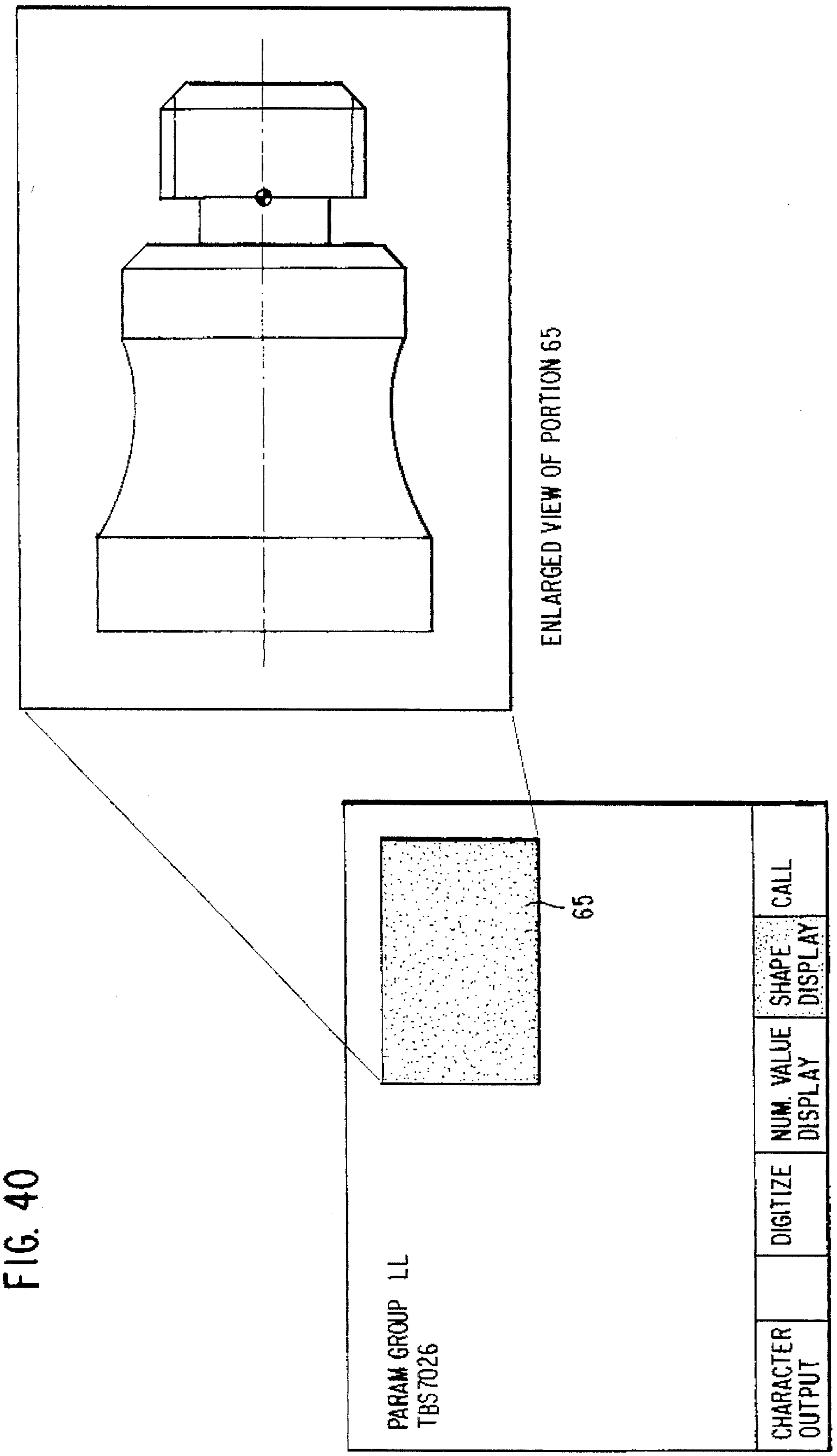
FIG. 40 shows an example of displaying a shape.

To confirm the contents of the variable-type machining program, "SHAPE DISPLAY" is selected in the menu in FIG. 37. Then, as shown in FIG. 40, the graphic display 65 of the configuration appears on the screen 40. Thus, it is easily checked whether the display shows a desired machining pattern.

The graphic display of a Configuration can be displayed with a default value without defining a variable value. Therefore, to call a variable-type machining program, it is possible to prepare a function for helping the operator in which the configurations of a plurality of entered variable-type machining programs are simultaneously displayed on the screen so the operator can select a desired variable-type machining program.

When "NUMERICAL VALUE DISPLAY" is selected in the menu in FIG. 37, the variable part of the variable-type machining program defined in FIG. 39 is converted into an actual value and displayed. FIG. 41 shows an example of converting and displaying the values defined in FIG. 39. In this case, the parts defined by variables are highlighted.

In this case, only the variable parts of the machining program are converted into actual values and displayed. However, when "DIGITIZE" is selected in the menu in FIG. 37, a program completely converted into actual numerical values is generated. That is, the machining program displayed in FIG. 41 is presented on the display with all of the values displayed. Therefore, a result is achieved equivalent to the case when the machining program in FIG. 41 is directly inputted through the keyboard 21. A machining program once converted in the above manner can freely be edited. Therefore, this is effective to correct parts other than those defined by variables.

When "CHARACTER OUTPUT" is selected in the menu in FIG. 37, a defined machining program is converted into character codes and outputted. FIG. 42 shows an example of the machining program in FIG. 69 thus outputted.

Automatic-program data is transferred to or from an external input/output unit 2 in the form of character codes. Each piece of data is separated by a comma for each row of the automatic program as shown in FIG. 42. The data to be outputted is the same as the data to be displayed on the screen. Therefore, the operator is able to clearly see the complete machining program on the screen. Further, there is no need for any conversion of the program data before it is sent out from the NC unit 1 to the external input/output unit 2.

In FIG. 42, "W1100" indicates the number of a machining program and the code "%" at the end indicates the end of data. The code ";" is added to the end of the data for each row of an automatic program and up to this position is the data for one record.

The process number (P No.) and sequence number (SEQ) in FIG. 69 are shown in FIG. 42 by P1, P2, P3, . . . and S1, S2, S3, . . . respectively.

Automatic program data includes a part where it is unnecessary to set data. Only a comma is added to these parts as shown in FIG. 42. When an automatic program uses a symbol such as a triangle mark showing surface roughness which cannot be expressed by character codes, such marks are substituted by predetermined character codes (for example, "Z3").

When data is not in numerical form, but is instead in character form, the data is shown by enclosing it by double quotation marks. For example, data S45C is described as "S45C" in FIG. 42.

The above examples show a format in which all pieces of data for one row of an automatic program must be outputted. However, it is also possible to output only certain pieces of data. The position of each piece of data is indicated as shown in FIG. 43. For the example in FIG. 43, the mark "@" indicates the position order of a piece of data among all pieces of data for one row of the automatic program. For example, it is shown that the second piece of data is "80.0", as follows:

@2=80.0

In this case, unnecessary data can be omitted. For example, when only the first, second, fifth, sixth and ninth pieces of data are to be outputted among all pieces of data for one row of the automatic program, it is shown as follows:

S1,@1="LIN", @2=5.0, @5=50.0, @6=45.0, @9="Z3";

As described above, the position of each piece of automatic program data can be specified by the process number t12, sequence number t13 and data position t14 as shown in FIG. 32. Therefore, a machining program can be inputted or outputted according to the format (character codes) shown in FIGS. 42 and 43 similarly to the processing of the internal data 32 described above.

Memo Data

Memo data relating to each piece of data stored in the NC unit 1 can be entered by the operator and displayed on the screen 19. The memo data includes data relating to the tolerance limits of each piece of data, a standard set value to which the data is usually set, a display symbol representing that piece of data, and a display message corresponding to each piece of data.

Figure 44:
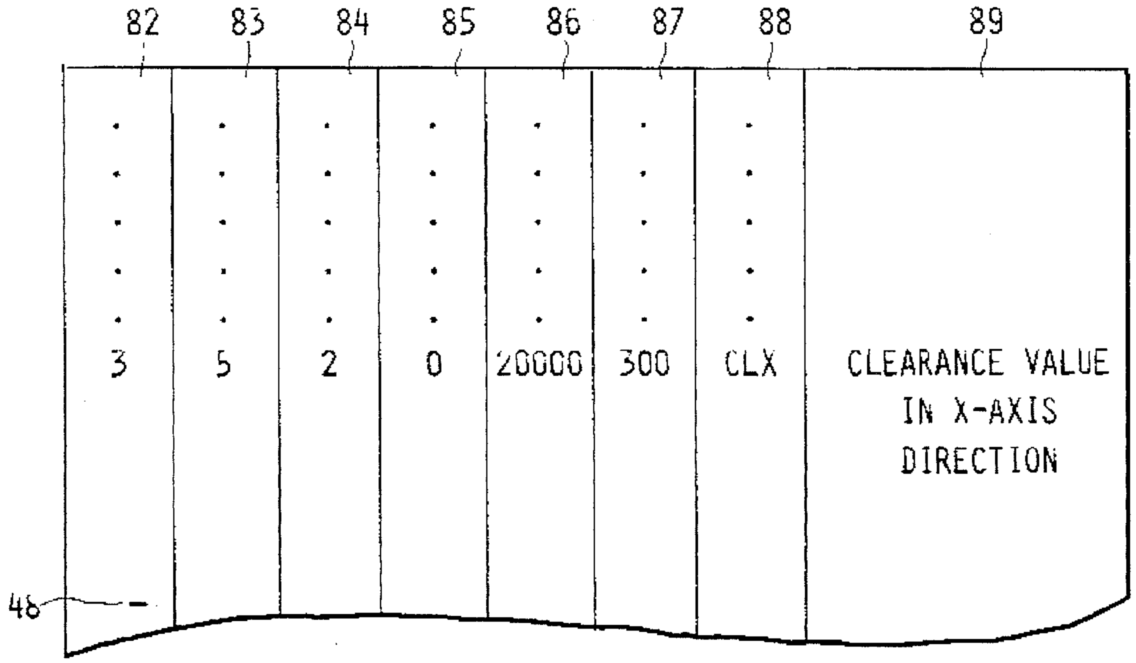
FIG. 44 shows a memo-data setting screen.

Memo data is set by the operator by inputting data to the table shown in FIG. 44 through the keyboard 21 when the table is displayed on the CRT 19. The data input position is specified by the operator by operating the cursor key 46 on the keyboard 21.

In FIG. 44, numeral 82 indicates a screen number, 83 indicates a row number and 84 indicates a column number. The corresponding data is uniquely specified by the numerals 82 through 84. Numeral 85 indicates the lower limit of the setting tolerance for a particular piece of NC data and 86 indicates the upper limit. Numeral 87 specifies the standard set value, 88 specifies a symbol for displaying the corresponding data on the CRT 19, and 89 specifies a message to be displayed on the CRT 19 when inputting the corresponding data.

For the example in FIG. 44, the memo data of the data at the fifth row and second column on the third screen is specified. The data setting tolerance limits range between 0 and 20000 and the standard set value is 300. The data is expressed by the symbol CLX on the CRT 19. This specific piece of NC data identified by the symbol CLX relates to the clearance value in the X-axis direction, as indicated by the message at reference numeral 89 in FIG. 44.

Figure 46:
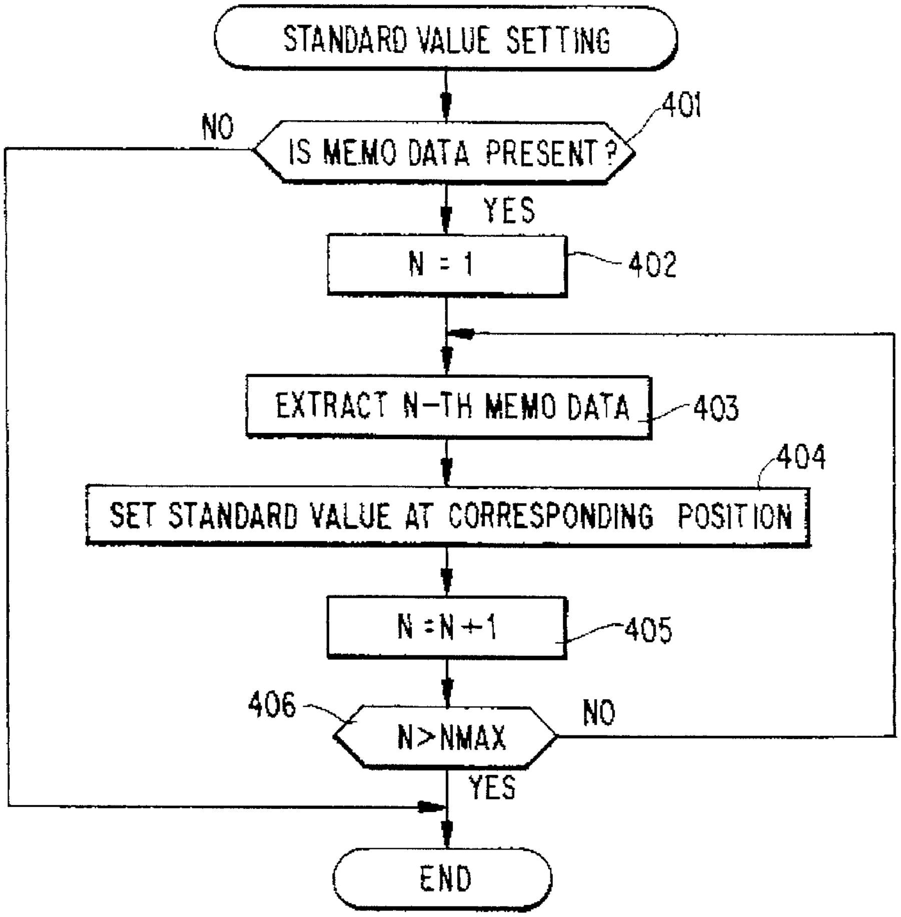
FIG. 46 shows a flow chart for the processing to be set by the standard set value.

When the NC unit 1 is initially set up, or in a situation where data has been lost, it is possible to set all pieces of data to the standard set value stored in the position in FIG. 44 referenced by numeral 87. FIG. 46 shows a flow chart for resetting all pieces of data which have been set according to the memo data format discussed above, with the standard set value. This is especially useful in situations when data is lost due to, for example, a power failure.

First, it is checked if memo data is specified at step 401. This step makes sure that all data being reset to the standard value is data which has been previously assigned values according to the memo data format of FIG. 44. If memo data is specified, a variable N is initialized to "1" at step 402. The variable N is used as an index. That is, N assumes the value of "1" at first, and this corresponds to the first piece of memo data. Then, the values of N will be increased by "1" so that it assumes the value "2", thus representing the second piece of memo data. This repeats until N achieves the value of NMAX, representing the last piece of memo data.

The N-th piece of memo data is extracted at step 403. The standard value 87 is set to the corresponding data positions at step 404 which are shown by numerals 82 through 84 in FIG. 44. The value of N is increased by "1" at step 405. At step 406, it is checked whether the value of N exceeds the value of NMAX at step 406. NMAX indicates the total number of pieces of memo data being reset to the standard value. If some pieces of memo data are left, the operation is repeated starting with step 403.

As described above, the standard value 87 can be set to all pieces of data specified by the memo data format of FIG. 44.

Figure 47:
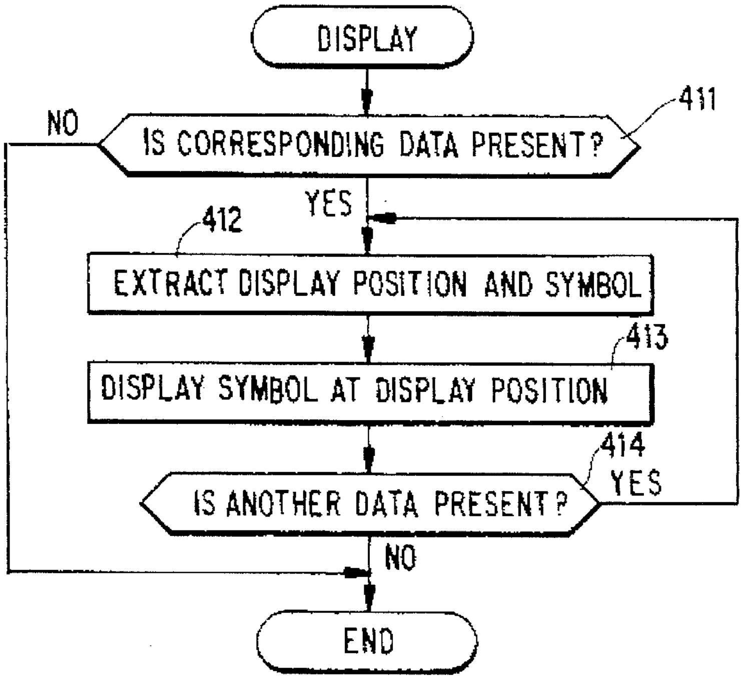
FIG. 47 shows a flow chart for displaying data.

The following is the description of the processing for displaying the data in the NC unit 1 on the CRT 19 using the symbol 88 in the memo data according to a flow chart as shown in FIG. 47. First, it is checked at step 411 whether memo data corresponding to the screen to be displayed is present. If so, display positions 83 and 84 and symbol 88 are extracted at step 412 from the corresponding memo data of FIG. 44. The symbol 88 is displayed at the display positions 83 and 84 at step 413. If there is more data left to be displayed, steps 412 and 413 are repeated by means of a decision taking place at step 414.

Figure 45:
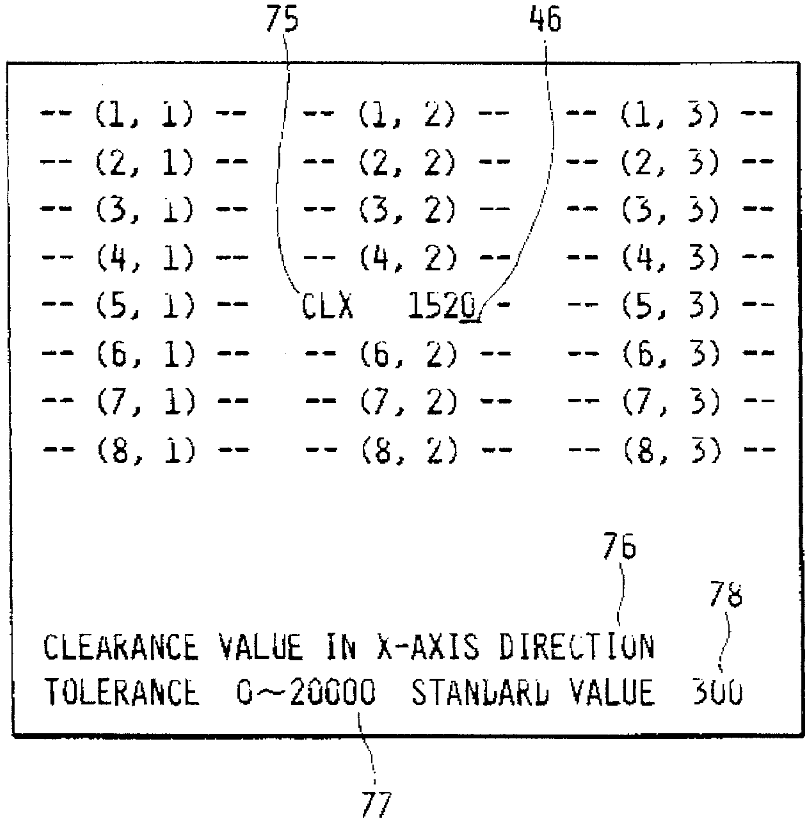
FIG. 45 shows an example of displaying memo data.

The above-described operation displays the symbol indicated at position 88 of FIG. 44 at the position indicated by the row number 83 and the column number 84. For the example in FIG. 44, the symbol CLX is displayed at the position of the fifth row and the second column as shown in FIG. 45 by reference numeral 75. From the example in FIG. 45, it is clear that the data at the position of "5,2" has the value of 1520. The symbol is used instead of a number to display data so that the meaning of the data will easily be understood by the operator.

In this way, data can be displayed on the screen of the CRT 19 by using the symbol 88 defined in the memo data screen of FIG. 44.

Figure 48:
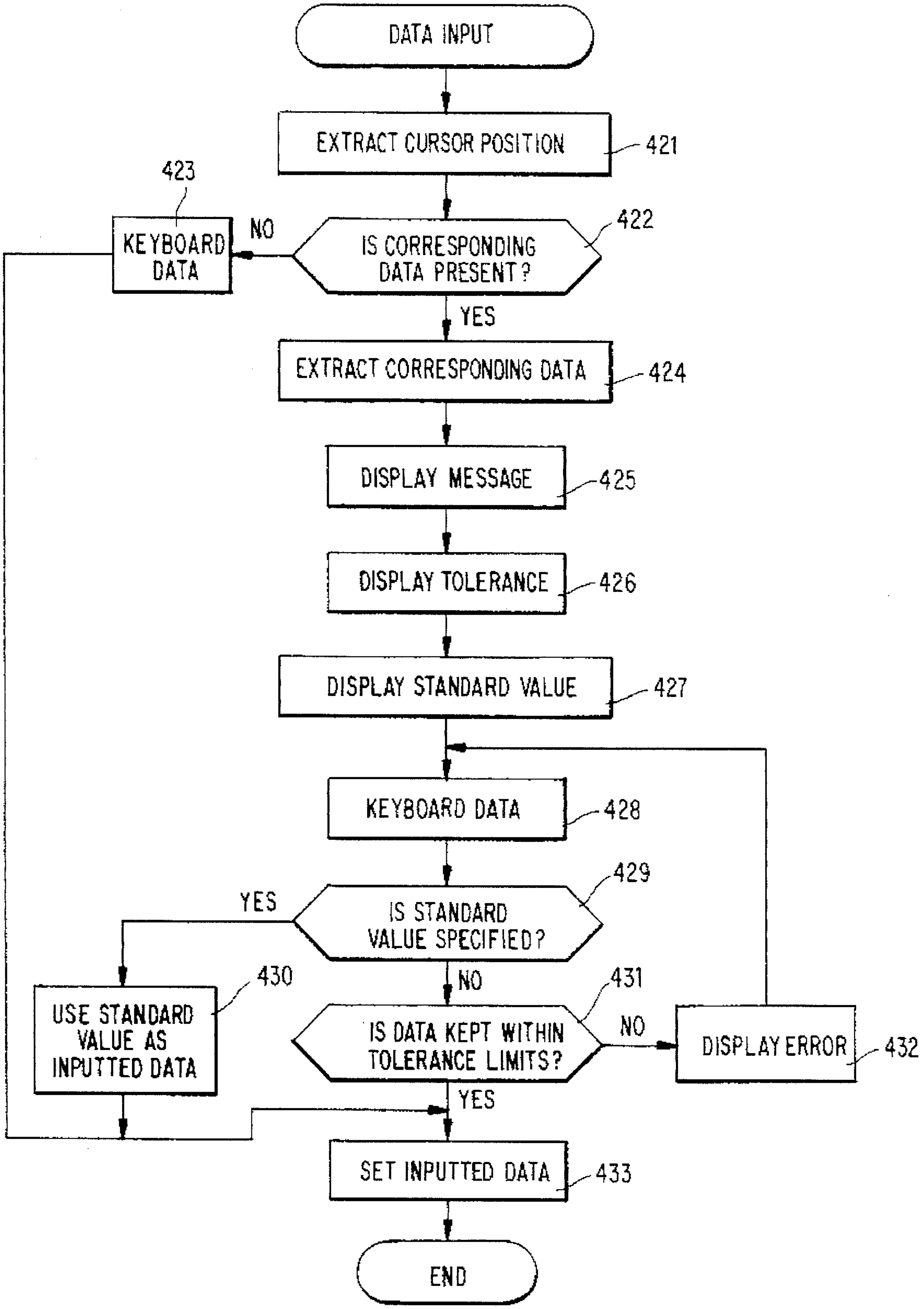
FIG. 48 shows a flow chart for setting data.

FIG. 48 is a flow chart showing the processing for setting the data in the NC unit 1. First, at step 421, a cursor 46 is placed at the position corresponding to the row and column number desired by the user. In FIG. 45, numeral 46 represents the cursor and the position of the cursor on the data is extracted. In FIG. 45, the cursor is located at the fifth row and second column.

It is next checked if any memo data corresponding to the cursor position is present at step 422. Such memo data would correspond to data previously input by an operator. In FIG. 45, the memo data represents data corresponding to the third screen, therefore, it is checked if the data at the fifth row and second column in the third screen is set to the memo data format of FIG. 44. If no corresponding data is present, the data is directly keyboarded by the operator at step 423 and the keyboarded data is directly stored in a memory at step 433. That is, if no memo data presently exists for the particular NC data involved, the operation consists of merely keyboarding the operator-desired data and the keyboarded data is stored in a memory.

If any corresponding data is present, that is, if any previously entered data is present, it is extracted from the memo data at step 424. A message is displayed on the screen of the CRT 19 by using the message data 89 of the extracted data. As shown in FIG. 44, if the message data "clearance value in the X-axis direction" is stored, it is displayed on the screen of the CRT 19 as shown by the numeral 76 in FIG. 45. Therefore, the operator can clearly understand the significance of the data being set.

Then, the tolerance limits are displayed on the screen of the CRT 19 by using the tolerance limits 85 and 86 of the extracted data at step 426. When the lower limit of the setting tolerance is 0 and the upper limit is 20000 as shown in FIG. 44, the tolerance limits are displayed as shown by the numeral 77 in FIG. 45.

Then, the standard value is displayed on the screen of the CRT 19 by using the standard value 87 of the extracted data at step 427. Numeral 78 in FIG. 45 indicates the displayed value. Then, at step 428, the operator inputs set data. At step 429, it is checked whether the operator wishes to use the standard value previously stored. This standard value is displayed on the screen as shown in FIG. 45 by reference numeral 78 as value 300. If the operator does wish to use the standard set value previously set, he would press a predetermined key, for example, the "@" key, in order to indicate that he wishes to use the previously set standard value. This occurs at step 430. The user need only press the predetermined key "@" instead of actually inputting the value 300.

For example, when "@" is inputted instead of an actual value in FIG. 45, this operation represents that "@" is considered to be equivalent to the standard value of 300 set through the keyboard 21. If the operator has not input the "@", it is checked at step 431 whether the operator-inputted data is a value within the tolerance limits previously stored. If not, an error is displayed on the screen of the CRT 19 at step 432 and control loops back to step 428 where data is inputted again by the operator. The out-of-tolerance-range data is not stored in the memory. If the inputted data is within the tolerance limits, it is stored in the memory at step 433. In this way, the operator is prevented from entering data which is out of the tolerance range. This provides a good safety measure.

Figure 49:
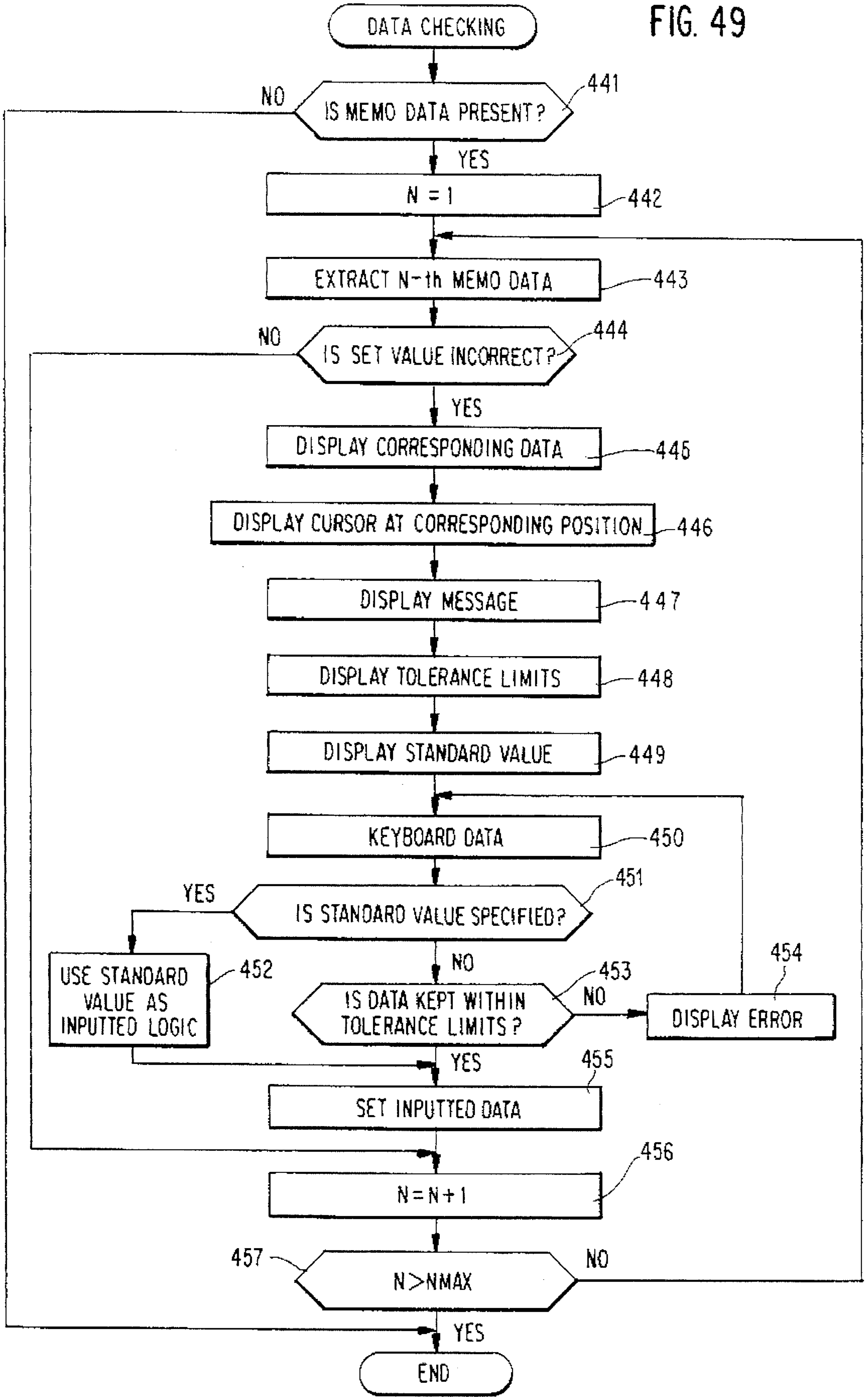
FIG. 49 shows a flow chart for checking data.
Figure 52A:
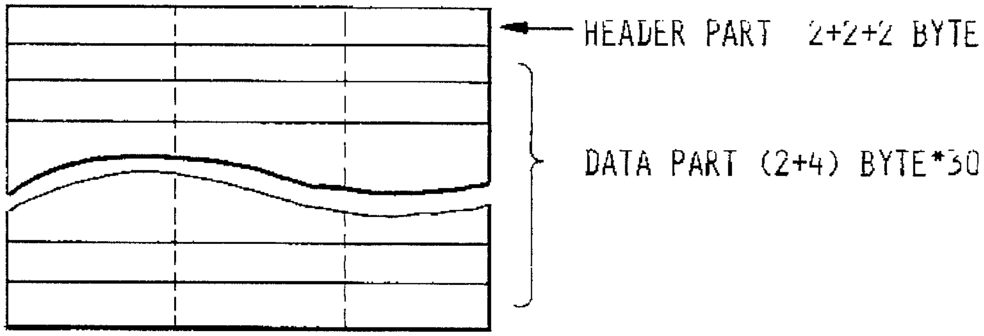
FIGS. 52A–52B show the data format in a data buffer.
Figure 52B:
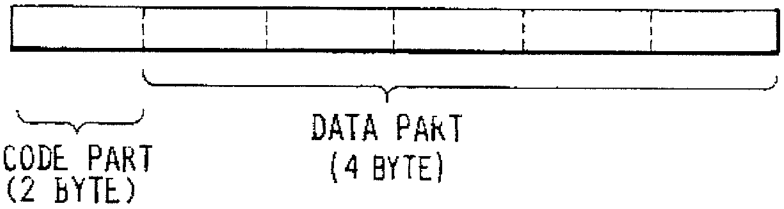

FIG. 49 is a flow chart for checking whether the data stored in memory is within the set tolerance limits. First, it is checked if any memo data is stored at step 441. If not, the processing ends. If some memo data is stored, a value of "1" is set to the index variable N at step 442. The N-th piece of memo data is extracted at step 443 to check if the data value at the specified positions 82 through 84 of the memo data are kept within the tolerance limits 85 and 86 of the memo data at step 444. If so, the next data is checked at step 456. If not, the processing for resetting data is started because the set data in the memory is incorrect.

First, a corresponding data screen is displayed at step 445. This corresponding data screen is a screen displayed with the screen number 82 of the memo data. Then, the cursor 46 is displayed at the position indicated by the row number 83 and the column number 84 of the memo data at step 446. Then, similarly to the operation described in FIG. 48, a message is displayed at step 447, tolerance limits are displayed at step 448, a standard value is displayed at step 449, and data is inputted again at step 450. At step 450, if the operator has inputted the predetermined key "@", the standard value is used as the inputted data at steps 451 and 452. If the operator has not used the predetermined key, the data which he has inputted is checked at step 453 in order to determine whether it is within the tolerance limits. If it is not, an error is displayed at step 454 and control loops back to step 450 so that the operator can input data again.

If the data is kept within the tolerance limits, the inputted data is stored in the memory at step 455. The value of N is increased by "1" at step 456 to check if the value of N exceeds NMAX at step 457. If not, the next memo data is checked by repeating the operation starting with step 443.

In the above processing, it is checked whether the data stored in the memory is correct. If it is not, the data is displayed so that the data can be reset.

The contents of memo data can be transferred to or from the external input/output unit 2 by converting them into the following character codes. In this way, it is possible to easily display and edit the contents of the memo data by an external system. The data in FIG. 44 is converted into character codes as shown below.

(3, 5, 2)=0, 20000, 300, "CLX",

"Clearance value in X-axis direction"

The three numerical values in parentheses indicate the screen number 82, row number 83 and column number 84. After the equals sign, the tolerance lower limit 85, the tolerance upper limit 86, the standard value 87, the symbol 88, and the message 89 are converted into character codes in order. Because 85 through 87 are numerical data, they are converted into decimal numbers. Because 88 and 89 are character data, they are converted by enclosing them with double quotation marks. A comma is put between pieces of data.

FIG. 50 shows memo data outputted in the form of character codes. The terminology "*MEMO, 176;" at the beginning of the data indicates that the data is memo data, and the number "176" indicates the number of pieces of memo data total. The terminology "*END;" indicates the end of data.

Though the types of memo data are shown in FIG. 44, they are not restricted to these types. It is possible to add other information according to necessity and erase unnecessary information.

The corresponding data is indicated by the screen number 82, row number 83 and column number 84. However, it is possible to indicate the data by another method. The output format of memo data is not restricted to the format of FIG. 50.

Further, every time the NC unit is powered up, the range check described above can be made. In this way, the NC unit is protected against corrupted data.

Removing the Program Analyzer From Inside the NC Unit

In the prior art, the input program is analyzed by an analysis circuit inside of the NC unit and the analyzed output is stored in a buffer. The output of the buffer is sent to a machining control section for controlling the motors of a tool to shape a workpiece. If the buffer becomes empty, machining stops. In situations where the program is complicated and movements are small, the instructions can be exhausted from the buffer faster than the analysis section can keep up. Therefore, the machining will often stop, causing cumbersome operation.

This situation often occurs when the input is from a CAM system and the shape of the device to be worked is complicated, such as a mold. The CAM system uses circular interpolation so that a curve results in a series of small lines and each line requires an instruction that takes a predetermined amount of time to execute. Since there is so much information present, the analysis system cannot keep up with the buffer and the buffer eventually sends all of its data out while the analysis section is still processing the data relating to the tiny lines making up the curve.

According to the present invention, the CAM system (external input/output unit 2) sends program data to the NC unit 1 and the data is stored in the NC unit 1. This data is later readout to the buffer without going through the analysis section. In situations where much data is present, the data can be read in straight from the CAM system to the buffer of the NC unit without storing it in the NC unit. The data is fed into the buffer using binary conversion. The data is sent in from the CAM system in character data format. Conversion to binary is performed in the NC unit by software. Data coming from the CAM system, in this case, is approximately equal to the data that would come through the analyzer. The advantage to not using the analyzer is that less memory is required and better control is obtained. The details will now be explained with respect to FIGS. 51 through 59.

FIG. 51 is a block diagram showing the outline of the machining program processing of the NC unit 1 according to the present invention. In FIG. 51, numeral 47 is an external memory such as a floppy disk or hard disk. Numeral 48 is an off-line CAM system or the like. The normal processing is the same as the processing according to the prior art in FIG. 70 except for the fact that the data in the data buffer 24 is stored according to the format shown in FIG. 52A.

That is, the analysis results stored in the buffer 24 for one block of data assumes the following fixed length format:

| Header part: | | data part |
|---|---|---|
| (2 + 2 + 2) | + | ((2 + 4)*30) = 186 (bytes) |

The header part consists of one piece of 6-byte data, in which the information for indicating the type of the block data is stored. The data part consists of 30 pieces of 6-byte data, each piece (see FIG. 52B) consisting of a code part (2 bytes) and a data part (4 bytes). The header part also consists of a code part (2 bytes) and a data part (4 bytes).

Figure 53A:
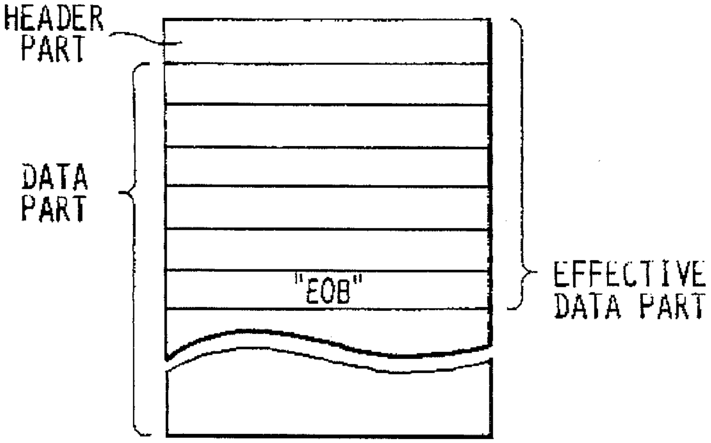
FIGS. 53A–53B show the data format in a data buffer.
Figure 53B:
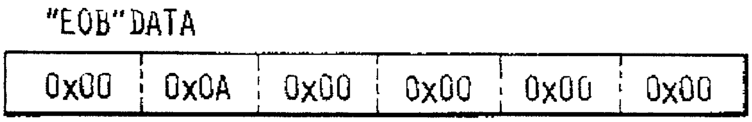

As shown in FIG. 53A, "EOB" data, indicating the end of a block, is always added to the end of a data part. Data after "EOB" data is considered ineffective. "EOB" data is data with a fixed pattern as shown in FIG. 53B. Every 4-byte data part must be expressed by an integer with a symbol.

The two-byte code part of the data part consists of a one-byte flag part and a one-byte identification code as shown in FIG. 54A. The configuration of the flag part is shown in FIG. 54B. The flag part classifies the identification code into ASCII code or special code and the data contents in the code part. When the most significant bit of the flag part is on, it indicates that the identification code is a special code. When the most significant bit is off, it indicates that the identification code is an ASCII code.

FIG. 55 shows an ASCII code list and FIGS. 56A–B show a special code list. For example, when the analysis result shown in FIG. 57A is obtained, the data in FIG. 57B is generated.

The invention not only analyzes a machining program and controls a machine tool according to the analysis results but has a compile mode function. The compile mode function is a method for storing analysis results of a machining program in a memory area and directly using the data in the memory area when actually controlling a machine.

Figure 58:
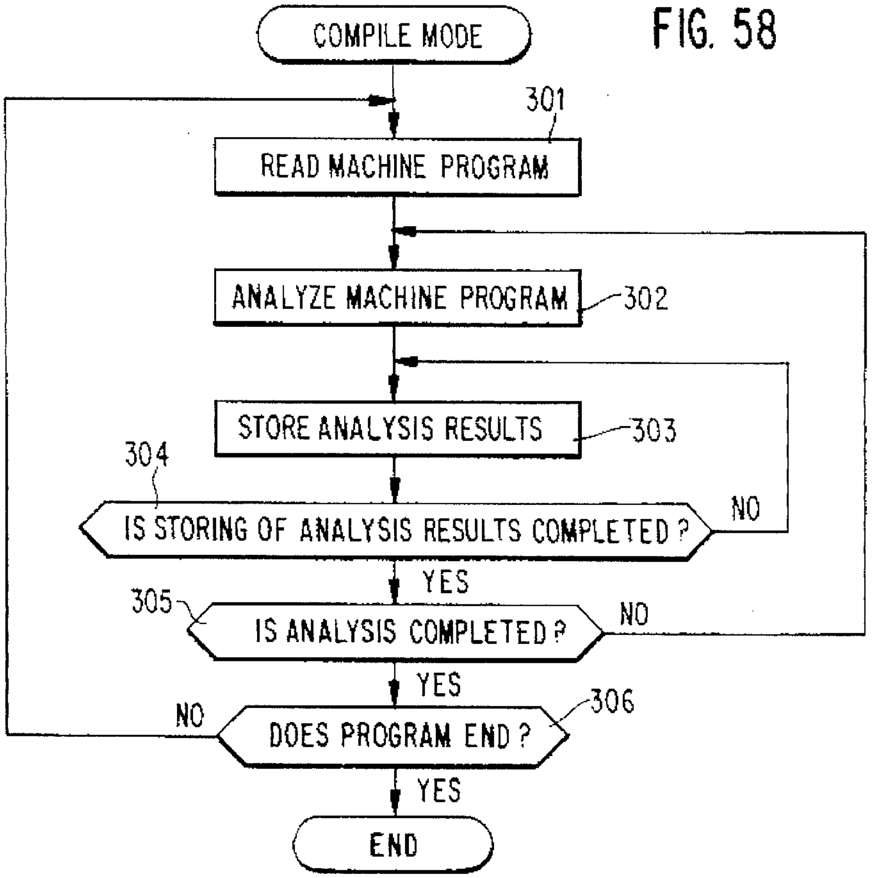
FIG. 58 shows a flow chart for compile processing.

FIG. 58 is a flow chart showing a compile method. First, a machining program is read out at step 301. The machining program can be read out of the memory 16 in the NC unit 1 or received while being input through an input/output control unit 22 in the NC unit 1. Then, the machining program is analyzed at step 302. This analysis takes place by means of the analysis section 23. The output of the analysis section 23 is sent back to the input/output control unit 22 for storage. The analysis results are stored in a memory area at step 303. It is possible to store the results in the internal memory (15 or 16) of the NC unit 1 if it has an adequate memory area capacity, or in the external memory 47 through the input/output control unit 22. When storing of data is completed (this is checked at step 304), it is further checked at step 305 whether analysis is completed. If so, it is checked whether the program analysis is completed at step 306. If so, the processing ends. Thus, all analysis results of the machining program are stored in the memory area at this point.

Figure 59:
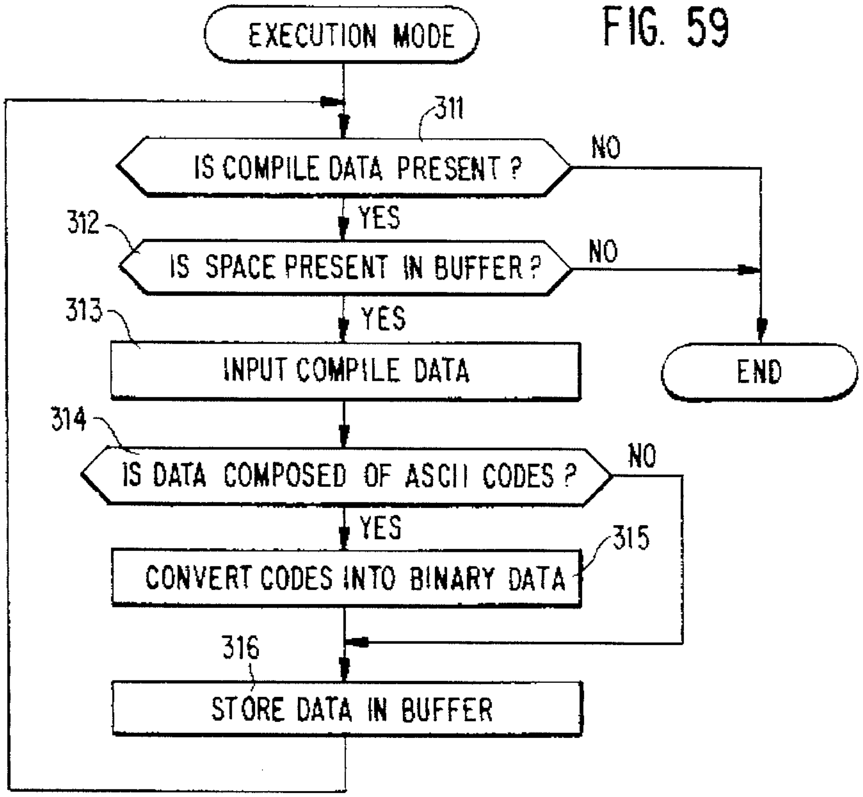
FIG. 59 shows a flow chart for the compile data execution method.

The following is the description of the processing for executing the compiled analysis results according to the flow chart in FIG. 59. First, it is checked whether any compiled data is present at step 311. If so, it is checked if any data not transferred to the data buffer 24 is left in the data for the machining program analysis results. If so, it is checked if any space is present in the data buffer 24 at step 312. If the data buffer 24 can only store the data for one block, it is checked if the contents of the buffer is already filled. When the data buffer can store the data for more than one block, it is checked whether previously used data or an empty area is present. If any space is present in the buffer, compiled data is inputted at step 313.

Compiled data is inputted by reading the data for one block out of the memory area storing the analysis results of a machining program as shown in FIG. 58. In this case, the data stored in the internal memory 15 or 16 of the NC unit 1 or external memory 47 is read. When the CAM system 48 can generate the data identical to the analysis results according to the present invention, it is also possible to read the data from the input/output control unit 22 directly through the external input/output unit 2. When the data is generated by the CAM system 48 is to be used, it is also possible to read the data when necessary by storing it in the external memory 47.

It is checked if compiled data consists of ASCII codes (step 314). The compiled data is normally binary data according to the data format shown in FIG. 57B. However, to output the data to an external unit from the NC unit 1, it is possible to output it in the form of ASCII codes expressing binary codes by hexa-codes as shown in FIG. 57C. In FIG. 57C, the last symbol ";" indicates the end of the data for one block and the numeral 48 before the symbol indicates the value of the check sum obtained by summing all of the hexa-codes for each byte before the numeral 48.

For the example in FIG. 57C, the value of "0×80+0×04+ . . . +0 x 00" is expressed as "0×648". Therefore, "48" which is the low-order two digits of "648" is determined as the check sum. The character-code converting section 31 in FIG. 51 outputs the analysis result shown in FIG. 57B by converting them into the character codes shown in FIG. 57C. Thus, it is possible to input the analysis results of a machining program in the form of the binary data shown in FIG. 57B or the character codes shown in FIG. 57C. When the inputted compiled data consists of ASCII codes, it is converted into binary codes by the character-code converting section 31 at step 315 and stored in the data buffer 24 at step 316.

As described above, the analysis results of the stored machining program are sequentially read out and stored in the buffer 24. The machine controlling section 25 reads the data, according to its normal processing operation, to control a machine. In this case, because it is unnecessary to use the machining program analyzing section 23 during real-time machining, no time is required for machining program analysis while the machining is taking place. Further, there is no danger that there will be no more data left in the data buffer 24, therefore, the machining will not stop unexpectedly.

When data is read from an external unit in the form of ASCII codes, the data to be inputted is expressed in the form of hexa-codes. Therefore, it can be converted much faster than the data expressed in the form of normal decimal numbers.

For this embodiment, the format of the machining program analysis results uses the format shown in FIGS. 52 through 57. However, the format is not restricted to that in FIGS. 52 through 57. Also, the output format is not restricted to that in FIG. 57C. It is possible to change the format according to necessity.

The above-described embodiment of the present invention makes it possible to directly input the analysis results of a machining program. Therefore, the analysis time of the machining program is unnecessary and high-speed processing is realized. Thus, this embodiment can execute machining including continuous micro-blocks and requiring a high feed speed which cannot be executed by the conventional NC unit.

It is also possible to use character codes as well as an exclusive binary format as the input format. Therefore, it is possible to easily handle inputted data from the external CAM system 48 or the like. Moreover, it is possible to generate the data corresponding to analysis results by the external CAM system or the like because the format for analysis results is similar to the machining program (EIA) of normal NC units. Data requiring no machining program analyzing section 23 of FIG. 51 can be generated by changing the post-processor of the external CAM system so that it can be outputted by the format according to the present invention (the format of FIGS. 52 through 57). Thus, it is possible to realize on-line high-speed machining in which the machine data generated by the CAM system is directly transferred to the NC unit 1 and the NC unit 1 directly sends the data to the machine controlling section 25 shown in FIG. 51 to execute it.

What is claimed is:

1. A method for storing operation data used to operate a numerical control unit having a screen display comprising the steps of:

formatting the operation data in an array data format of at least one dimension by formatting the operation data in accordance with a screen number, a row number and a column number, in such a manner that the array data format corresponds to a display format utilized by the numerical control unit to display the data on the screen display; and storing the data formatted in accordance with the screen number, the row number and the column number in a memory of the numerical control unit in accordance with the array data format.

2. A method according to claim 1 wherein the array data format includes a header part and a data part, and the header part contains (a) the screen number indicating a particular screen, the particular screen corresponding to the data stored in the data part;

(b) the row number indicating the number of display format rows of data included in the data part; and (c) the column number indicating the number of display format columns included in the data part.

3. A method according to claim 2, the header part further comprising:

(d) a data type indicator indicating the type of data stored in the data part.

4. A method according to claim 1, further comprising the steps of outputting the data to a character code converting unit for conversion into character code format and outputting the converted data to an external input/output unit.

5. A method of editing data for use in a numerical control unit used for automatically machining a workpiece comprising the steps of:

while executing data relating to a present machining job, retrieving stored data pertaining to a future machining job from an internal data store of the numerical control unit;

inputting data edit information for editing the stored data determining whether editing of the retrieved data is currently forbidden;

if the editing is not forbidden, directly editing the retrieved data with the data edit information;

if the editing is forbidden, converting the data edit information to character codes, storing the character codes, determining when the editing of the retrieved data is no longer forbidden, and thereafter editing the retrieved data with the data edit information.

6. A method according to claim 5 further comprising the steps of: displaying the retrieved data and the data edit information on a screen and highlighting the data edit information to distinguish the data edit information from the retrieved data.

7. A method according to claim 5 wherein the data edit information for correcting the retrieved data relating to a future machining job is input to the unit through an external input/output device and is converted from character code format to machine code format once the edit information is input to the unit from the input/output device.

8. A method according to claim 5 further comprising the step of: storing history data relating to a plurality of previously performed editing steps in a storage area.

9. A unit according to claim 8 wherein the history data is structured according to an array structure, corresponding to a display format of a display unit.

10. A unit according to claim 9 wherein the array structure includes a header part and a data part, said header part containing:

(a) a screen number indicating a particular screen, the particular screen corresponding to the data stored in the data part;

(b) a row number indicating the number of display format rows of data included in the data part; and (c) a column number indicating the number of display format columns included in the data part.

11. A unit according to claim 8 further comprising the steps of: retrieving the stored history data and editing the retrieved history data.

12. A unit according to claim 11, wherein said step of editing the retrieved history data comprises: copying specified areas of a storage area storing the history data into a correction area and performing said step of editing the retrieved data pertaining to a future machining job by utilizing the copied areas.

13. A unit according to claim 5 further comprising the steps of: confirming the data edit information by:

confirming input of the data edit information;

displaying a screen corresponding to the retrieved data;

displaying the data edit information; and confirming substitution of the data edit information into the retrieved data.

14. A method for editing data for use in a numerical control unit comprising the steps of:

storing an original program comprising a list of instructions for performing a desired machining of a workpiece in a memory of the numerical control unit;

creating a backup version of the original program when the original program is to be edited; and editing the backup version while the original program is being executed by the numerical control unit;

wherein the backup version has a first extension code type and the original program has a second extension code type; and further comprising the steps of:

once said step of editing the backup version is performed, replacing the first extension code type of the edited backup version with the second extension code type; and replacing the second extension code type of the original program with a third extension code type;

wherein the third extension code type can assume a plurality of values so that a corresponding plurality of original programs may be stored.

15. A numerical control unit comprising:

machining program generating means for generating a machining program in which all values in the program relating to machining operations are actual numerical values;

specifying means for specifying certain ones of the values to be described by variables instead of by the actual numerical values;

defining means for defining the variables; and replacing means for replacing the certain ones of the values specified by said specifying means with the variables defined using said defining means, wherein at least a portion of the variables are mathematical expressions containing variable components and operators.

16. A unit according to claim 15 further comprising a value assigning means for assigning actual values to the variables inserted by said replacing means.

17. A unit according to claim 16 further comprising default value generating means for generating a default value for each of the inserted variables, the default value being the actual numerical value generated by said machining program generating means.

18. A unit according to claim 16, wherein defining means includes message defining means for defining a message corresponding to each of the variables so that the message can be used as a guidepost when a user is assigning an actual value to a variable using said assigning means.

19. A unit according to claim 16 further comprising undefined variable checking means for checking whether said assigning means has assigned an actual value to each of the variables.

20. A unit according to claim 16, wherein said value assigning means includes means for assigning a group of possible values to any of the variables.

21. A unit according to claim 20, further comprising a display means, including a screen, for displaying pictorial representations of machined workpieces resulting from the use of the possible values; and selection means allowing a user to select one of the possible values from the group by choosing a corresponding one of the pictorial representations.

22. A unit according to claim 16, further comprising:

a means for obtaining calculated values from the mathematical expressions by performing operations defined by the variable components and the operators; and a display means, including a screen for displaying the calculated values assigned to a variable.

23. A unit according to claim 15 wherein any of the variables can include a mathematical expression.

24. A unit according to claim 15, wherein operation of said replacing means produces a defined program, further comprising:

a converting means for converting the defined program into character codes for output to an external input/output apparatus.

25. A method of supplementing operation data used for driving a numerical control unit comprising the steps of:

storing the operation data in a storage means of the unit;

inputting memo data corresponding to tolerance limits of the operation data into the storage means;

displaying the memo data;

inputting standard values for the operation data, wherein the standard values indicate values to which the operation data are set in a standard operation of the numerical control unit; and setting each piece of the operation data to a corresponding one of the standard values upon initial power-up to the unit or when the stored operation data has been lost.

26. A method of supplementing operation data used for driving a numerical control unit comprising the steps of:

storing the operation data in a storage means of the unit;

inputting memo data corresponding to tolerance limits of the operation data into the storage means; and displaying the memo data; wherein, in said displaying step, the operation data are displayed in addition to the memo data and are displayed as a two dimensional array of pieces of the operation data and at least one selected piece of the operation data in the array is omitted from the display in favor of displaying a piece of the memo data corresponding to the omitted piece of the operation data.

* * * * *